US008756511B2

(12) United States Patent
Heo et al.

(10) Patent No.: US 8,756,511 B2
(45) Date of Patent: Jun. 17, 2014

(54) GESTURE BASED UNLOCKING OF A MOBILE TERMINAL

(75) Inventors: Jeongyun Heo, Gyeonggi-Do (KR); Daesung Kim, Gyeonggi-Do (KR); Minsoo Park, Seoul (KR); Seungeun Lee, Seoul (KR); Jihye Ham, Gyeonggi-Do (KR); Kihyun Park, Seoul (KR); Sangsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/342,737

(22) Filed: Jan. 3, 2012

(65) Prior Publication Data

US 2013/0174094 A1    Jul. 4, 2013

(51) Int. Cl.
*G06F 3/048*  (2013.01)
*G06F 3/033*  (2013.01)

(52) U.S. Cl.
USPC .......................................... 715/741; 715/863

(58) Field of Classification Search
CPC ................................. G06F 3/048; G06F 3/033
USPC .................................................. 715/863, 741
See application file for complete search history.

(56) References Cited

U.S. PATENT DOCUMENTS

| | | | |
|---|---|---|---|
| 2009/0006991 A1 | 1/2009 | Lindberg et al. | |
| 2009/0083850 A1* | 3/2009 | Fadell et al. | 726/19 |
| 2009/0210939 A1* | 8/2009 | Xu et al. | 726/19 |
| 2009/0241072 A1* | 9/2009 | Chaudhri et al. | 715/863 |
| 2009/0264159 A1 | 10/2009 | Hsieh et al. | |
| 2010/0269040 A1 | 10/2010 | Lee | |
| 2010/0306718 A1* | 12/2010 | Shim et al. | 715/863 |
| 2011/0187497 A1 | 8/2011 | Chin | |
| 2011/0252381 A1* | 10/2011 | Chaudhri | 715/838 |
| 2011/0271181 A1* | 11/2011 | Tsai et al. | 715/702 |
| 2012/0036485 A1* | 2/2012 | Watkins et al. | 715/863 |
| 2012/0066650 A1* | 3/2012 | Tirpak et al. | 715/863 |
| 2012/0098639 A1 | 4/2012 | Ijas | |

FOREIGN PATENT DOCUMENTS

| | | | |
|---|---|---|---|
| EP | 2 060 970 A1 | 5/2009 | |
| EP | 2 256 610 A1 | 12/2010 | |

* cited by examiner

*Primary Examiner* — Doon Chow
*Assistant Examiner* — Le Nguyen
(74) *Attorney, Agent, or Firm* — Birch, Stewart, Kolasch & Birch, LLP

(57) ABSTRACT

A method, system, and device for controlling a mobile device with a touch screen are disclosed. According to one embodiment, the mobile terminal includes a touch screen and a controller configured to display a uniform image of a first enclosure and an unlock image of a second enclosure bounded by the uniform image of the first enclosure on the touch screen in response to detection of a contact on the touch screen while the mobile terminal is in a lock state. The controller is further configured to enlarge the unlock image of the second enclosure in accordance with movement of the contact away from an initial position of the contact while the contact on the touch screen is maintained, and to unlock the mobile terminal in response to a release of the contact when the unlock image of the second enclosure is enlarged to reach or exceed the uniform image of the first enclosure.

20 Claims, 51 Drawing Sheets

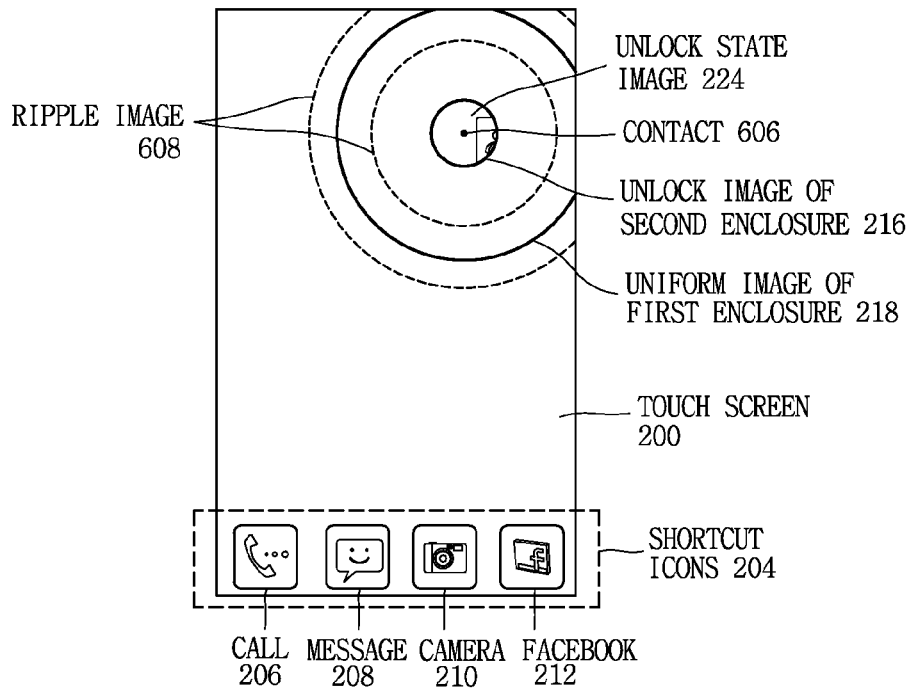
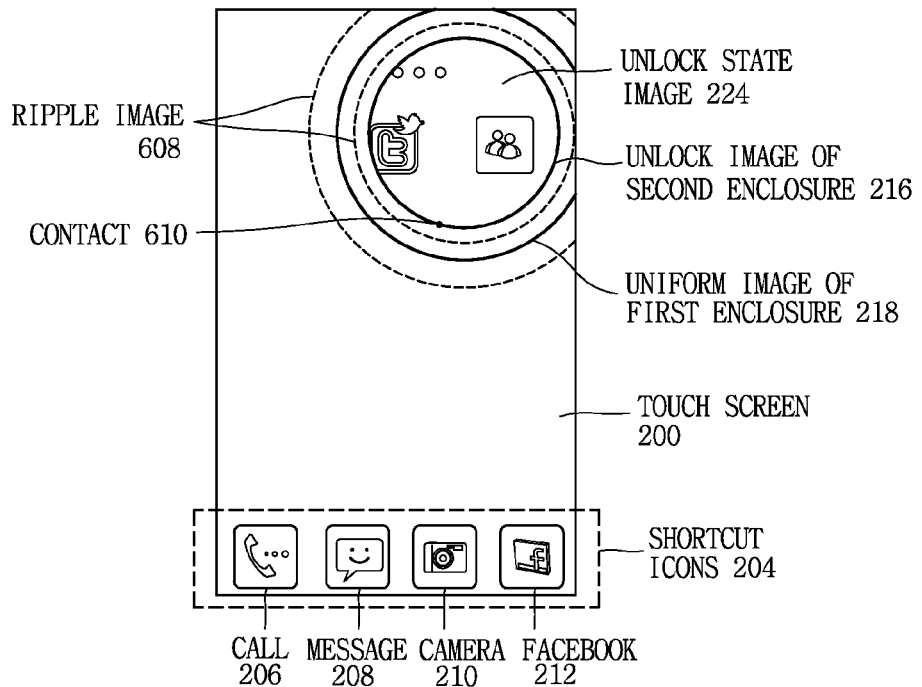

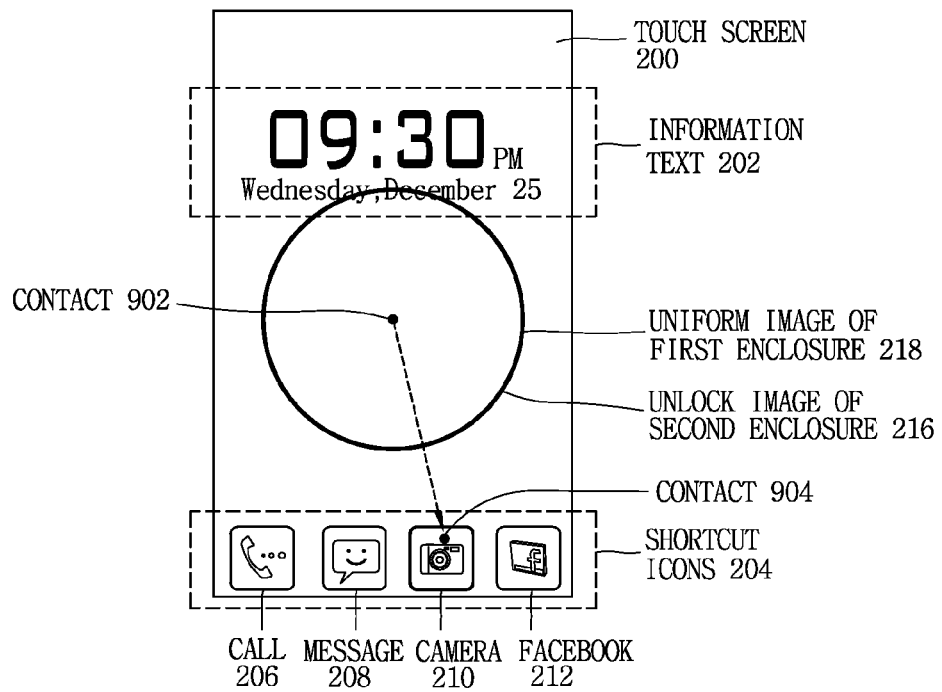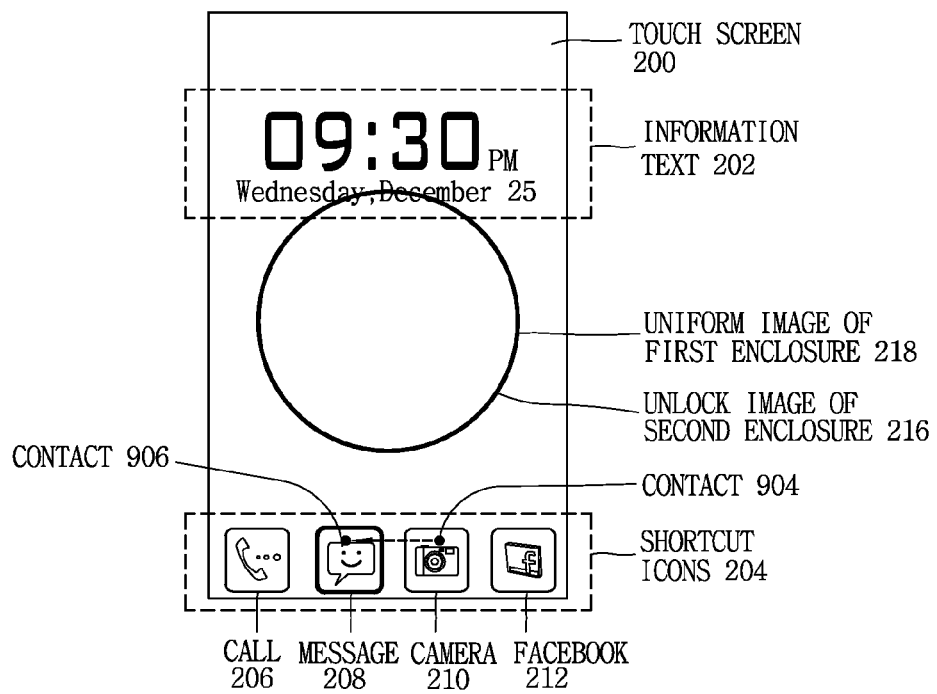

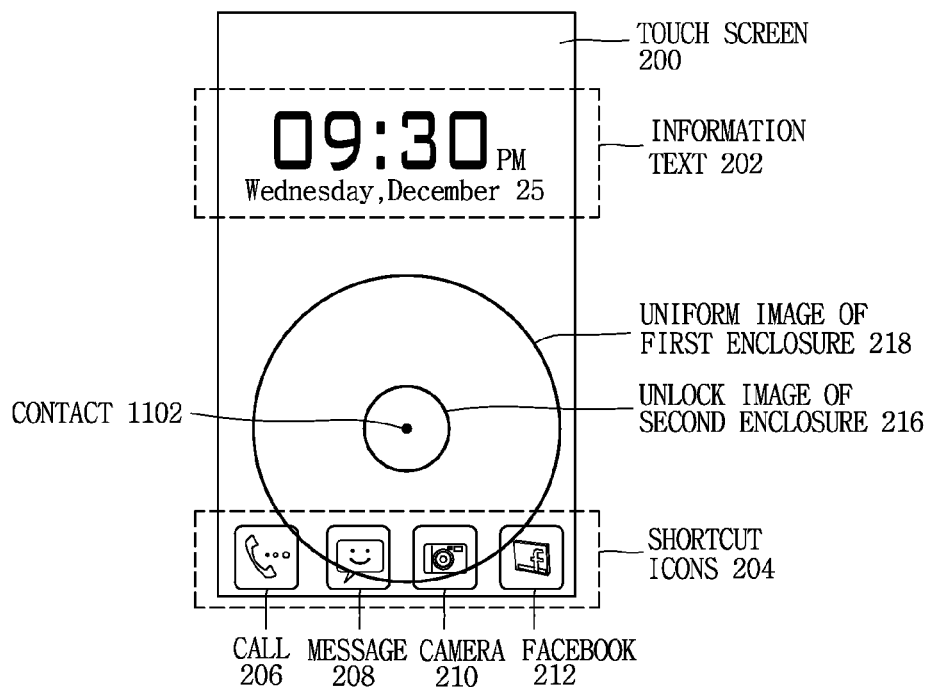
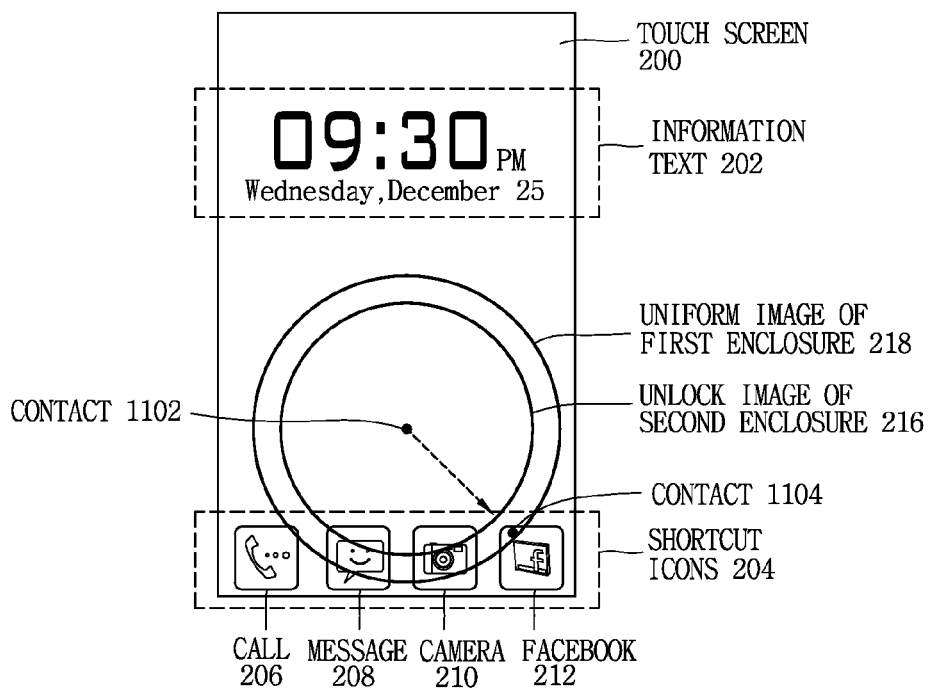

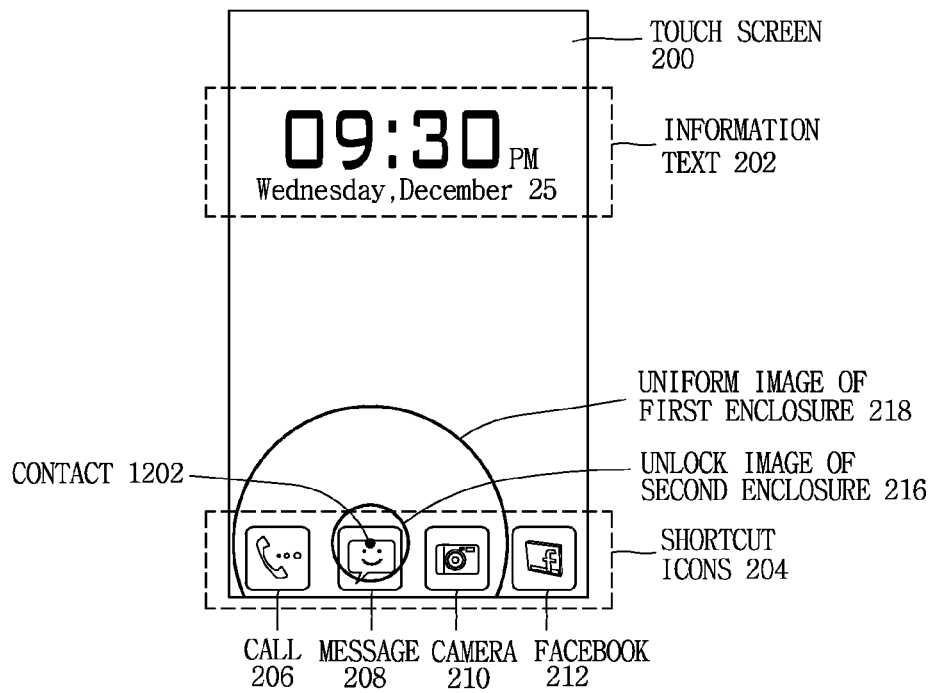
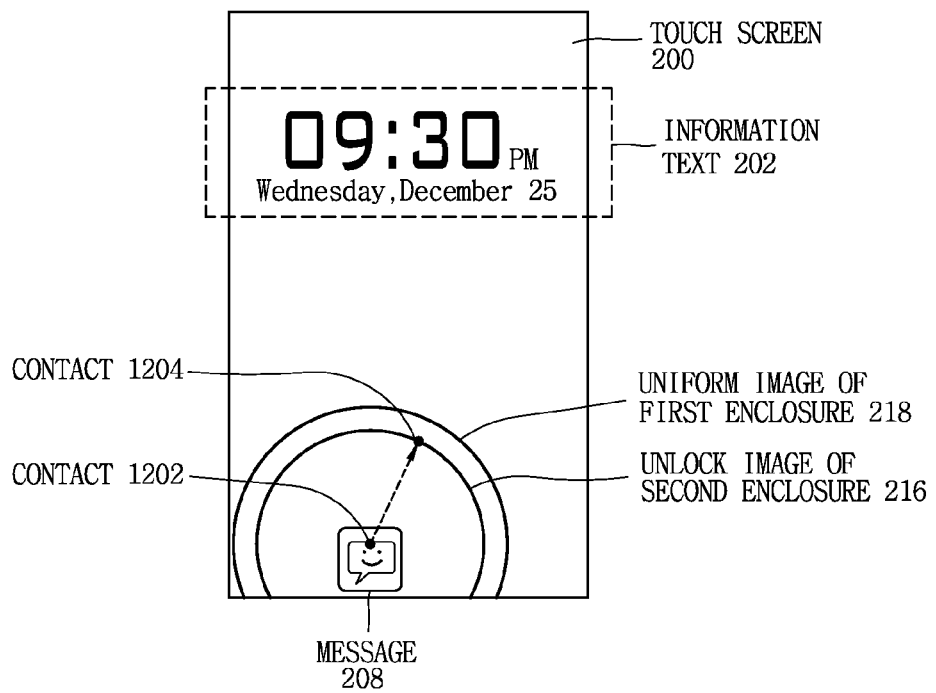

QUICK MESSAGE

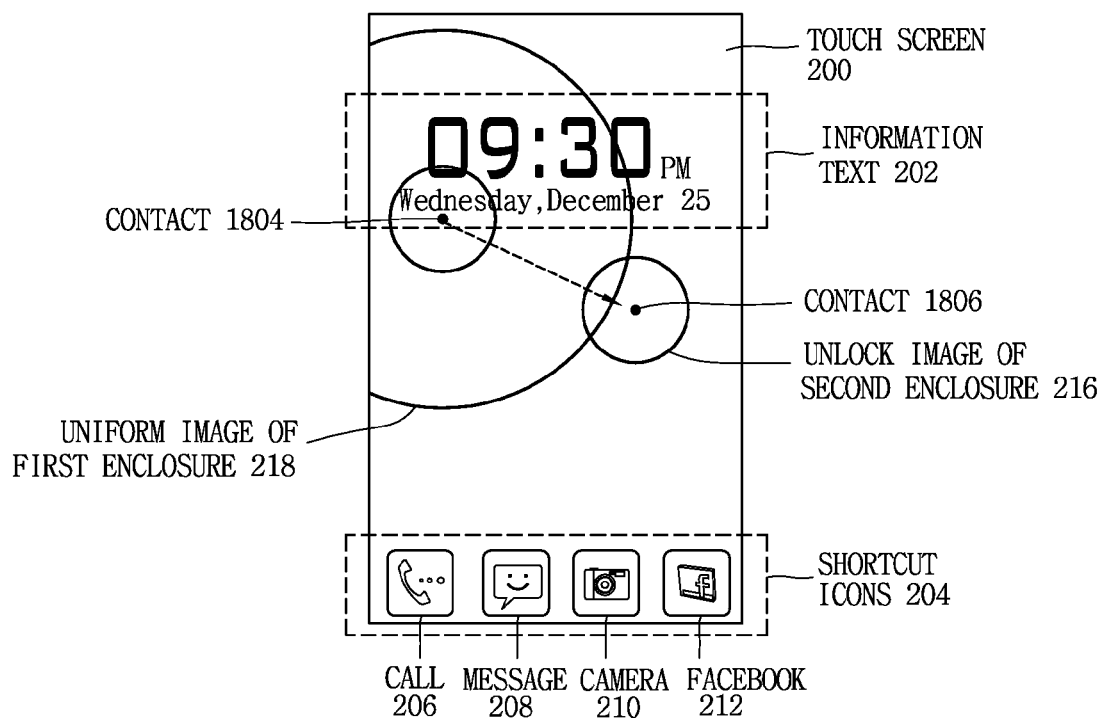

GESTURE BASED UNLOCKING OF A MOBILE TERMINAL

TECHNICAL FIELD

Embodiments of the disclosure generally relate to the field of electronics, and more particularly to control methods and systems of mobile devices.

BACKGROUND

A mobile terminal is a pocket-sized computing device, typically having a display screen with touch input and/or a miniature keyboard. Some of the types of the mobile terminal include a mobile phone, a personal digital assistant (PDA), a tablet computer, a laptop, a media player, etc. To prevent a function being performed on the mobile terminal unattended or in error, a lock screen may be implemented. Although the mobile terminal is powered on and operational, the lock screen may disregard most, if not all, user input applied through the input device of the mobile terminal, such as a touch screen, until the lock screen is unlocked. Accordingly, the user may be spared of the hassle or inconvenience of undoing the input or function processed by the mobile terminal had the mobile terminal been left unlocked and/or unattended.

In order to perform a function or feature available on the mobile terminal, the lock screen may need to be unlocked. Unlocking of the mobile terminal may be performed by the user performing a predefined gesture with respect to an unlock image displayed on the touch screen. On the market, there may be a number of different user interfaces for the lock screen as well as the mechanism to unlock it. In most smart phones available on the market, the typical mechanism to unlock may detect a gesture, determine whether the gesture is matching the predefined gesture, and if so, unlock the lock screen. Although the user interfaces and the unlock mechanisms associated with the lock screen may share many similarities, they may appeal to different user groups based on their individual aesthetic and functional aspects.

SUMMARY

This summary is provided to comply with 37 C.F.R. §1.73, requiring a summary of the disclosure briefly indicating the nature and substance of the disclosure. It is submitted with the understanding that it will not be used to interpret or limit the scope or meaning of the claims.

Methods, systems, and devices for controlling a mobile device with a touch screen are disclosed. In one aspect, a method of controlling a mobile terminal with a touch screen comprises displaying a uniform image of a first enclosure and an unlock image of a second enclosure bounded by the uniform image of the first enclosure on the touch screen in response to detection of a contact on the touch screen while the mobile terminal is in a lock state. The method also comprises enlarging the unlock image of the second enclosure in accordance with movement of the contact away from an initial position of the contact on the touch screen while the contact on the touch screen is maintained during the movement. Further, the method comprises unlocking the mobile terminal in response to a release of the contact when the unlock image of the second enclosure is enlarged to reach or exceed the uniform image of the first enclosure.

Other features of the embodiments will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIGS. 6A-6J illustrate an exemplary implementation of unlocking the mobile terminal as illustrated in FIGS. 5A-5D, according to one embodiment.

FIGS. 9A and 9B illustrate an exemplary view of selecting a shortcut icon, according to one embodiment.

FIGS. 11A-11D is an exemplary view of unlocking the mobile terminal when a contact is initially made on the second area of the touch screen, according to one embodiment.

FIGS. 12A-12D illustrate an exemplary view of executing an application when a contact is initially made on the third area of the touch screen, according to one embodiment.

FIGS. 18A-18C illustrate a second exemplary view of unlocking the mobile terminal by moving the unlock image, according to one embodiment.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, device and/or system for controlling a mobile terminal with a touch screen. According to embodiments of this disclosure, a method of unlocking a mobile terminal may include presenting a lock screen when the mobile terminal is turned on or remains idle for a predetermined amount of time. When a touch or contact is detected by the touch screen, two concentric enclosures may be generated on the touch screen, where the smaller enclosure may be formed surrounding the contact made by the user's finger, stylus, or so on. As the contact is dragged away from its initial position toward the larger or outer enclosure, the size of the smaller enclosure expands in accordance with the movement of the contact. Further, once the smaller enclosure expands to reach the outer enclosure according to the movement of the contact touching a spot on the outer enclosure, the lock screen may be unlocked upon the release of the contact. Further, an application may be executed simultaneously with the unlocking of the mobile terminal if the contact is released while the contact is touching a shortcut icon of the application displayed on the touch screen. Thus, the embodiments include aesthetically and functionally sound methods, systems, and devices for managing the lock and unlock features of the mobile terminal.

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present disclosure.

Figure 1:
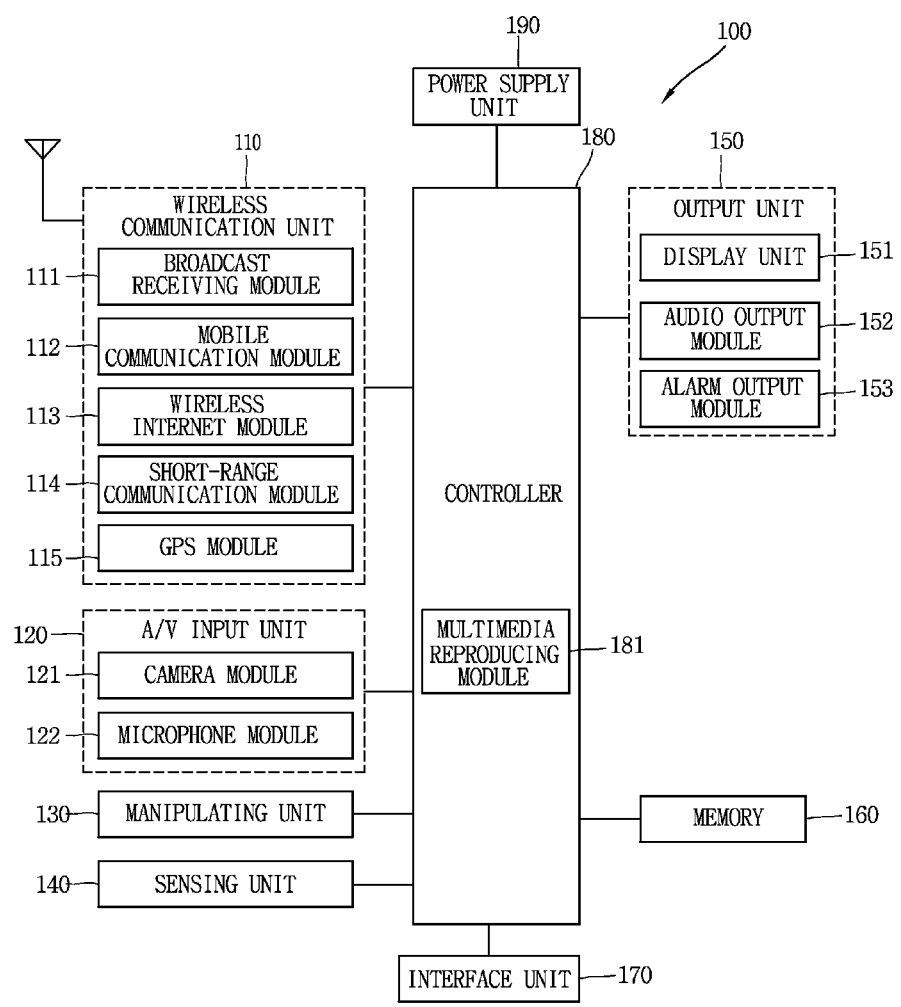
FIG. 1 illustrates a schematic block diagram of a mobile terminal according to one embodiment.

FIG. 1 illustrates a schematic block diagram of a mobile terminal 100 according to one embodiment. In FIG. 1, the mobile terminal 100 may be implemented in various configurations or form factors. Examples of such terminals include mobile phones, smart phones, notebook computers, navigation devices, digital broadcast terminals, personal digital assistants (PDAs), tablet computer, or portable multimedia players (PMP). The mobile terminal 100 may include a wireless communication unit 110, an A/V (Audio/Video) input unit 120, a manipulating unit 130, a sensing unit 140, an output unit 150, a memory 160, an interface unit 170, a controller 180 or a processor, and a power supply unit 190, etc. Greater or fewer components may alternatively be implemented.

For example, the wireless communication unit 110 may include a broadcast receiving module 111, a mobile communication module 112, a wireless Internet module 113, a short-range communication module 114, and a GPS module 115. The broadcast receiving module 111 receives a broadcast signal and/or broadcast associated information from an external broadcast management server via a broadcast channel. The broadcast channel may include a satellite channel and a terrestrial channel. The broadcast managing server may refer to a system that generates and transmits a broadcast signal and/or broadcast associated information or a server that receives a previously generated broadcast signal and/or broadcast associated information and transmits the same to a terminal.

Examples of the broadcast associated information may include information regarding a broadcast channel, a broadcast program, a broadcast service provider, etc. The broadcast signal may include a TV broadcast signal, a radio broadcast signal, and a data broadcast signal, among others. If desired, the broadcast signal may further include a broadcast signal combined with a TV or radio broadcast signal. The broadcast associated information may be provided also via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), etc.

The broadcast receiving module 111 may be configured to receive broadcast signals by using various types of broadcast systems. In particular, the broadcast receiving module 111 may receive a digital broadcast signal by using a digital broadcast system such as multimedia broadcasting-terrestrial (DMB-T), digital multimedia broadcasting-satellite (DMB-S), digital video broadcast-handheld (DVB-H), the data broadcasting system known as media forward link (MediaFLO®), integrated services digital broadcast-terrestrial (ISDB-T), etc. The broadcast receiving module 111 is configured to be suitable for every broadcast system that provides a broadcast signal as well as the above-mentioned digital broadcast systems. Broadcast signal and/or broadcast-associated information received via the broadcast receiving module 111 may be stored in the memory 160 or another form of storage devices.

The mobile communication module 112 transmits/receives radio signals to/from at least one of a base station, an external terminal and a server in a mobile communication network. Such radio signals may include a voice call signal, a video call signal or various types of data according to text/multimedia message transmission/reception. The wireless Internet module 113 supports Internet access for the mobile terminal 100, and may be internally or externally coupled to the mobile terminal 100. The short-range communication module 114 refers to a module for supporting short range communications. Some examples of short-range communication technology include Bluetooth™, Radio Frequency IDentification (RFID), Infrared Data Association (IrDA), Ultra-WideBand (UWB), ZigBee™, and the functional or structural equivalents.

The GPS module 115 is a module receives location information from a plurality of artificial satellites. A/V input unit 120 is configured to input an audio or video signal. The A/V input unit 120 may include a camera module 121 and a microphone module 122. The camera module 121 processes image frames of still pictures or videos obtained by an image sensor in a video capturing mode or an image capturing mode. The processed image frames may be displayed on a display module 151. The image frames processed by the camera module 121 may be stored in the memory 160 or transmitted via the wireless communication unit 110. Two or more camera modules 121 may be provided according to the configuration of the mobile terminal 100.

The microphone module 122 may receive sounds (e.g., audible data) via a microphone in a phone call mode, a recording mode, a voice recognition mode, and the like, and process it into electrical voice data. The processed audio (voice) data may be converted for output into a format transmittable to a mobile communication base station via the mobile communication module 112 in case of the phone call mode. The microphone module 122 may include various types of noise canceling (or suppression) algorithms to cancel (or suppress) noise generated in the course of receiving and transmitting audio signals.

The manipulating unit 130 may generate key input data inputted by a user to control various operations of the mobile terminal 100. The manipulating unit 130 may include a keypad, a dome switch, a touch pad (e.g., a touch sensitive member that detects changes in resistance, pressure, capacitance, etc.), a jog wheel, a jog switch, and the like. In particular, when the touch pad is overlaid on the display module 151 in a layered manner, it may be called a touch screen. The touch screen and its controller may detect a contact and any movement thereof using one of many touch sensitive techniques which include capacitive, resistive, infrared, and surface acoustic wave technologies, proximate sensor technologies, etc.

The sensing unit 140 detects a current status (or state) of the mobile terminal 100 such as an open/close state of the mobile terminal 100, a location of the mobile terminal 100, a presence or absence of user contact with the mobile terminal 100, and/or generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface with at least one external device connected with the mobile terminal 100. For example, the external devices may include wired/wireless headset ports, external power charger ports, wired/wireless data ports, memory card ports, ports for connecting a device having an identification module (e.g., SIM/UIM/UICC card), audio input/output (I/O) ports, video I/O ports, earphone ports, or the like. The interface unit 170 may be used to receive inputs (e.g., data, information, power, etc.) from an external device and transfer the received inputs to one or more elements within the mobile terminal 100 or may be used to transfer data from the mobile terminal 100 to an external device.

The output unit 150 is configured to output an audio signal, a video signal or an alarm signal. The output unit 150 may include the display module 151, an audio output module 152, an alarm output module 153, and the like. The display unit 151 may output information processed in the mobile terminal 100. For example, when the mobile terminal 100 is in the phone call mode, the display unit 151 may display a User Interface (UI) or a Graphic User Interface (GUI) associated with a call or other communication. When the mobile terminal 100 is in the video call mode or the image capturing mode, the display unit 151 may display a captured and/or received image, a UI, a GUI, and the like.

When the display module 151 and the touch pad are overlaid in a layered manner to form a touch screen, the touch screen may function as both an input device and an output device. The display module 151 may include at least one of a Liquid Crystal Display (LCD), a Thin Film Transistor-LCD (TFT-LCD), an Organic Light Emitting Diode (OLED), a flexible display, a three-dimensional (3D) display, for example. The mobile terminal 100 may include two or more display modules (or other display means) according to its embodiment. For example, the mobile terminal 100 may include an external display unit (not shown) and an internal display unit (not shown).

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile terminal 100. The audio output module 152 may include a speaker, a buzzer, or the like. The alarm output module 153 may provide outputs to inform about an occurrence of an event of the mobile terminal 100. Typical events may include a call signal reception, a message reception, a key signal input, etc. In addition to audio or video outputs, the alarm output module 153 may provide outputs in a different manner to inform about an occurrence of an event.

For example, the alarm output module 153 may provide outputs in the form of vibrations (or other tactile means). When a call signal, a message, or some other incoming communication is received, the alarm output module 153 may provide tactile outputs (i.e., vibrations) to inform the user. By providing tactile outputs, the user can recognize the occurrence of various events. Outputs informing about the occurrence of an event may be also provided via the display unit 151 or the audio output module 152. The memory 160 may store software programs or the like used for the processing and controlling performed by the controller 180, or may temporarily store inputted/outputted data (e.g., a phonebook, messages, still images, video, etc.).

The memory 160 may include at least one type of storage medium including a flash memory type, a hard disk type, a multimedia card type, a card-type memory (e.g., SD or DX memory, etc), a Random Access Memory (RAM), a Static Random Access Memory (SRAM), a Read-Memory (ROM), and the like. Also, the mobile terminal 100 may cooperate with a network storage device that performs the storage function of the memory 160 over a network connection. The controller 180 typically controls the general operations of the mobile terminal 100. For example, the controller 180 performs controlling and processing associated with voice calls, data communications, video calls, and the like. In addition, the controller 180 may include a multimedia reproducing module 181 for reproducing (or playing back) multimedia data. The multimedia reproducing module 181 may be configured within the controller 180 or may be configured to be separated from the controller 180.

The power supply unit 190 receives external or internal power and supplies power required for the operations of the respective elements under the control of the controller 180. Mobile terminal 100 may be implemented in a variety of different configurations. Examples of such configurations include folder-type, bar-type, swing-type and slide type combinations thereof. For clarity, further disclosure will primarily relate to the bar-type smart mobile terminal. However such teachings apply equally to other types of terminals.

Figure 2A:
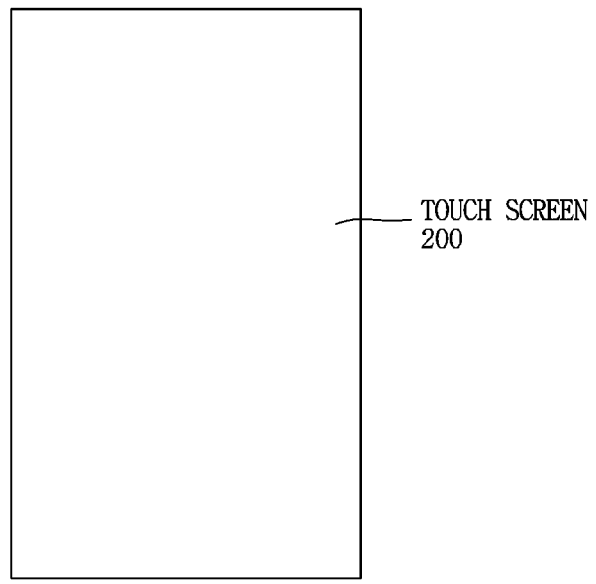
FIGS. 2A-2F illustrate an exemplary view of unlocking the mobile terminal in FIG. 1 by enlarging an unlock image, according to one embodiment.
Figure 2B:
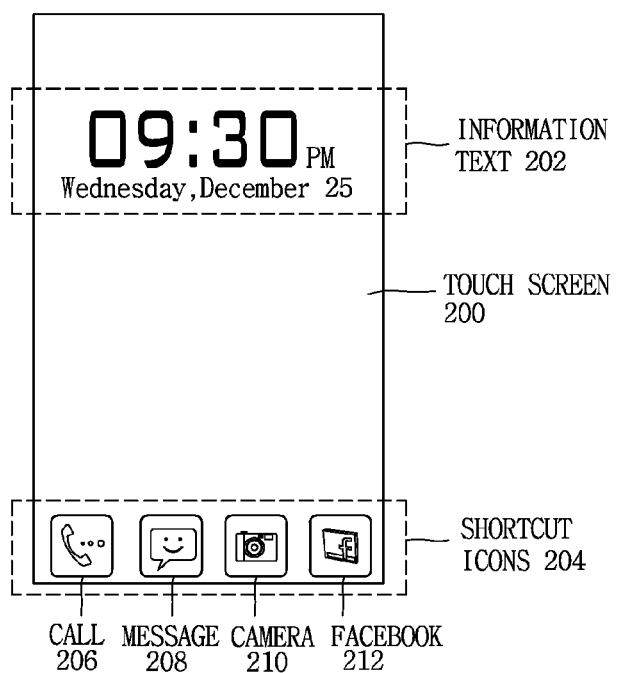
Figure 2C:
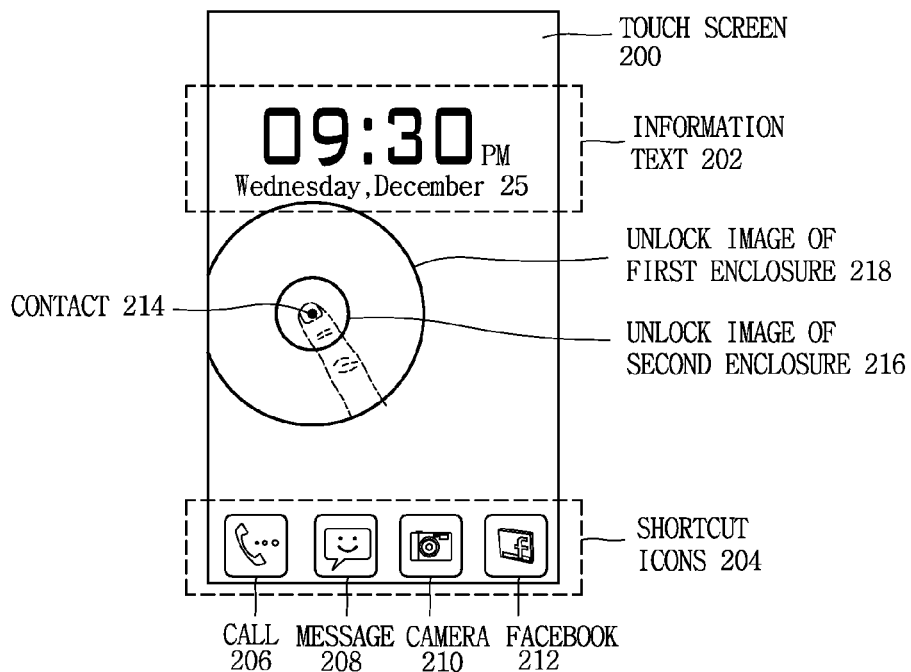
Figure 2D:
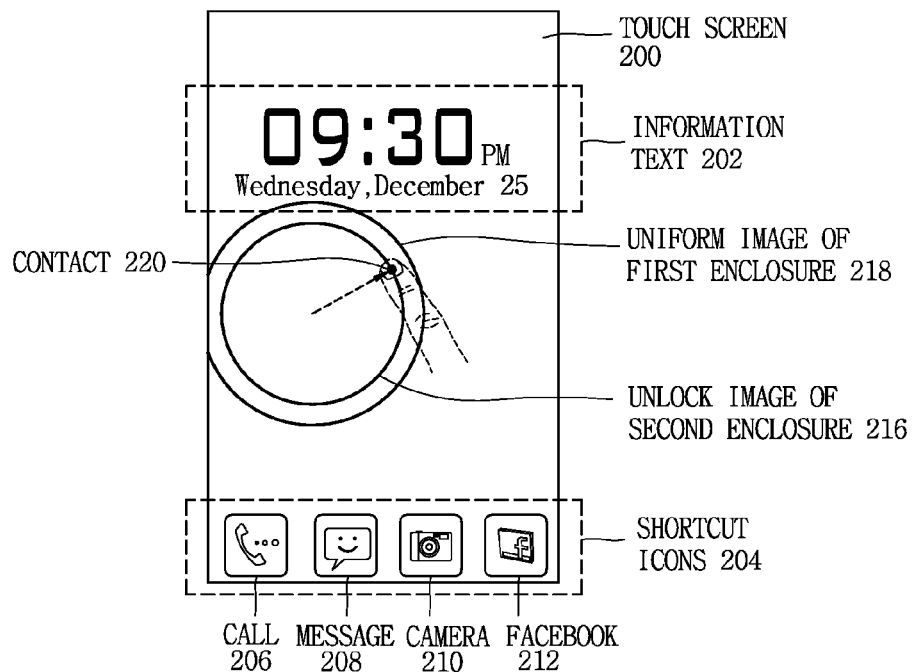

FIGS. 2A-2F illustrate an exemplary view of unlocking the mobile terminal 100 in FIG. 1 by enlarging an unlock image, according to one embodiment. FIG. 2A illustrates a touch screen 200 in a sleep or deep sleep state. In one exemplary implementation, the touch screen is blacked out when it is in the sleep or deep sleep state. FIGS. 2B-2D illustrate the touch screen displaying lock state images. In FIG. 2B, the touch screen 200 displays information text 202 and shortcut icons 204 upon sensing a touch or any other form of input. It is appreciated that each of the shortcut icons 204 may contain a target URI or GUID to an object, or the name of a target program file that the shortcut represents. In FIG. 2B, the shortcut icons 204 are located at the bottom area of the touch screen 200, and include call 206, message 208, camera 210, and Facebook 212.

In FIG. 2C, when a contact (e.g., contact 214) made by a finger, a stylus, or any touching object is detected by the touch screen 200, an unlock image of a second enclosure 216 and a uniform image of a first enclosure 218 are displayed on the touch screen 200. In one embodiment, the unlock image of the second enclosure 216 is bounded by the uniform image of the first enclosure 218. In addition, the unlock image of the second enclosure 216 is formed to surround the initial position of the contact, i.e., the contact 214. In one exemplary implementation, the size of the unlock image may be little larger than the normal size of an adult user's index fingertip. In one embodiment, the uniform image of the first enclosure 218 takes a shape similar to a shape of the unlock image of the second enclosure 216. For example, the unlock image of the second enclosure 216 is a circle, and the uniform image of the first enclosure 218 is a circle concentrically enclosing the unlock image of the second enclosure 216 as illustrated in FIG. 2C. However, the shapes of the unlock image of the second enclosure 216 and the uniform image of the first enclosure 218 may be any of polygon shapes or any other types of enclosures, such as a layout of a house, an outline of a human, etc.

Figure 2E:
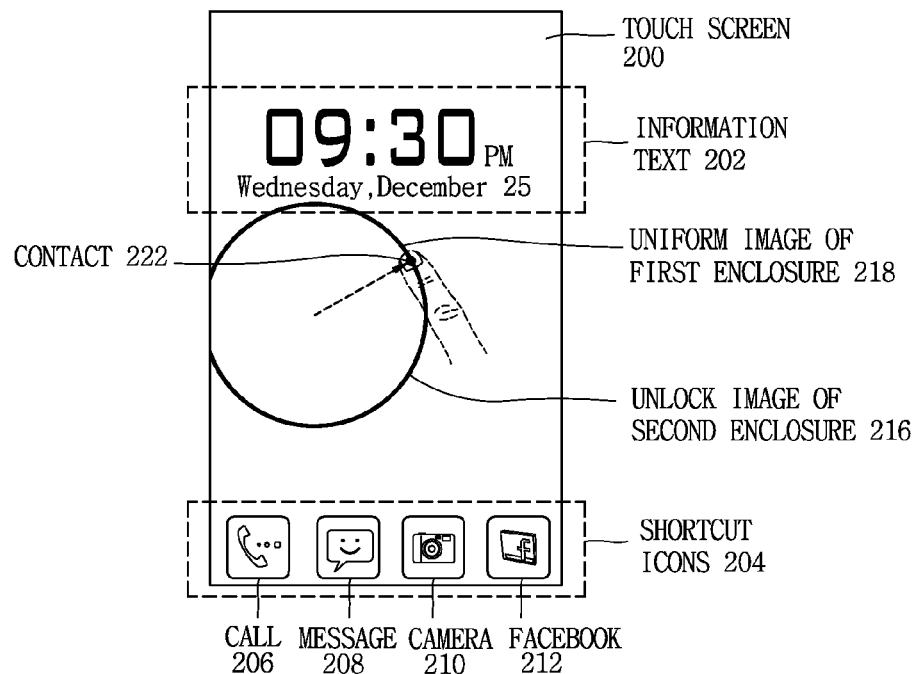
Figure 2F:
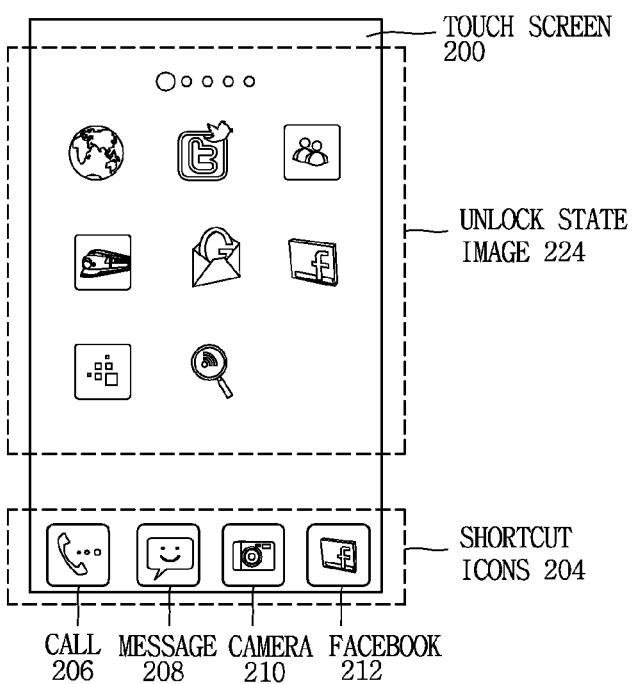

In FIG. 2D, the unlock image of the second enclosure 216 is enlarged according to movement of a contact (e.g., a contact 220) away from an initial position of the contact (e.g., 214) while the contact on the touch screen 200 is maintained throughout the movement. While the size of the unlock image of the second enclosure 216 is altered as illustrated in the figure, the size of the uniform image of the first enclosure 218 remains constant. In FIG. 2E, the unlock image of the second enclosure 216 is enlarged enough to completely overlap (e.g., by coinciding or exceeding the boundary of the uniform image of the first enclosure 218) with the uniform image of the first enclosure 218. In that instance, if the contact (e.g., a contact 222) is released, the mobile terminal 100 is unlocked to display an unlock state image 224, as illustrated in FIG. 2F.

Figure 3:
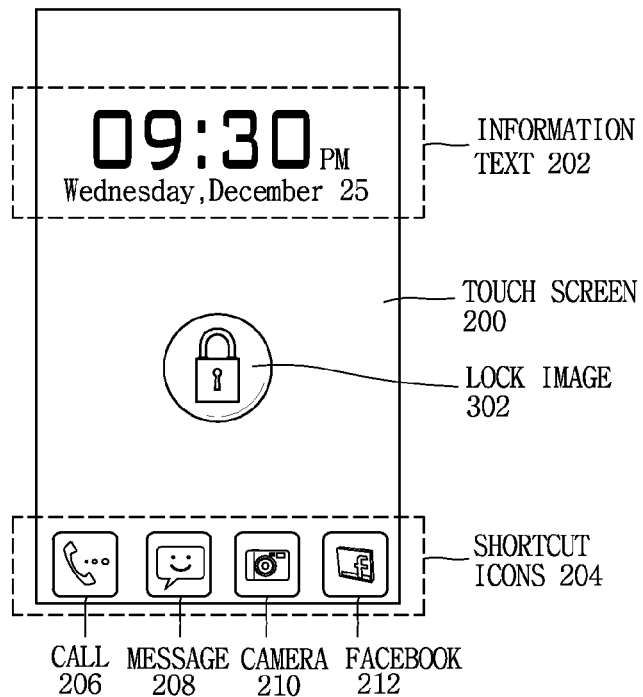
FIG. 3 illustrates an exemplary view of the touch screen with a lock image, according one embodiment.

FIG. 3 illustrates an exemplary view of the touch screen 200 with a lock image 302, according one embodiment. When a backlight of the touch screen 200 is turned on as in FIG. 2B, the lock image 302 may be displayed to inform the locked state of the mobile terminal 100. In one exemplary implementation, the lock image 302 is provided for a short duration of time (e.g., a few seconds) and disappears from the touch screen 200. In an alternative implementation, the lock image 302 needs to be touched to have it disappear.

Figure 4:
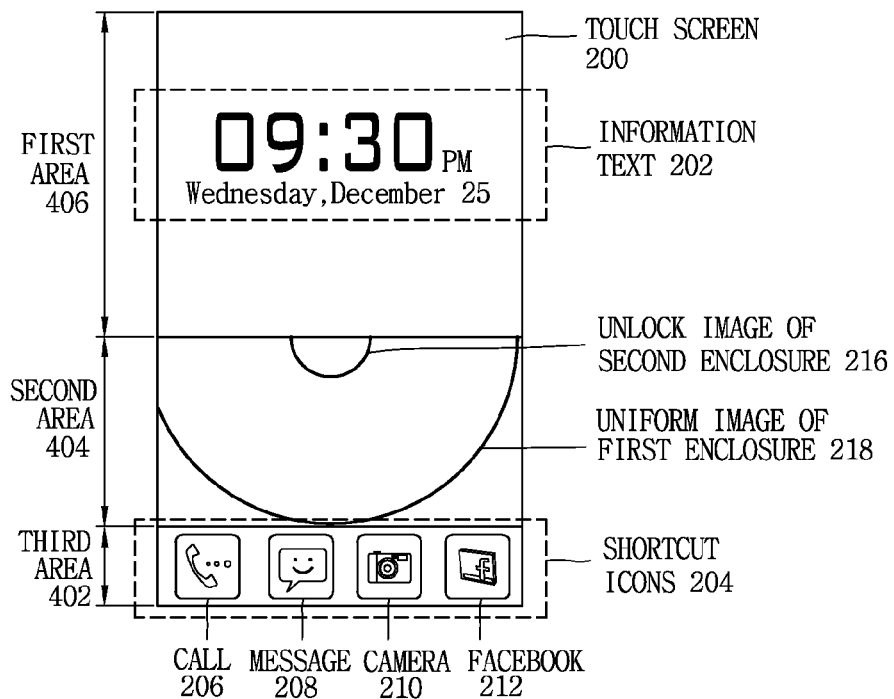
FIG. 4 illustrates an exemplary view of the touch screen divided into three areas, according to one embodiment.

FIG. 4 illustrates an exemplary view of the touch screen 200 divided into three areas, according to one embodiment. In one embodiment, the touch screen 200 is divided into a first area 406, a second area 404, and a third area 402. As illustrated in FIG. 4, the third area 402 substantially covers a region whose length is a width of the touch screen 200 and whose width is set to include the set of shortcut icons 204. In addition, the second area 404 covers a region whose length is the width of the touch screen 200 and whose width extending from a top end of the third area 402 toward an upper end of the touch screen 200 by a radius of the uniform image of the first enclosure 218. Further, the first area covers a region whose length is the width of the touch screen 200 and whose width starting from a top end of the second area 404 to a top end of the touch screen 200. It is appreciated that the division of the touch screen into the three areas is based on the shape of the unlock image of the second enclosure 216 and the uniform image of the first enclosure 218 being a circle. It is further appreciated that a different approach may be employed to divide the touch screen 200 if a different shape of the unlock image of the second enclosure 216 and/or the uniform image of the first enclosure 218 is used.

Figure 5A:
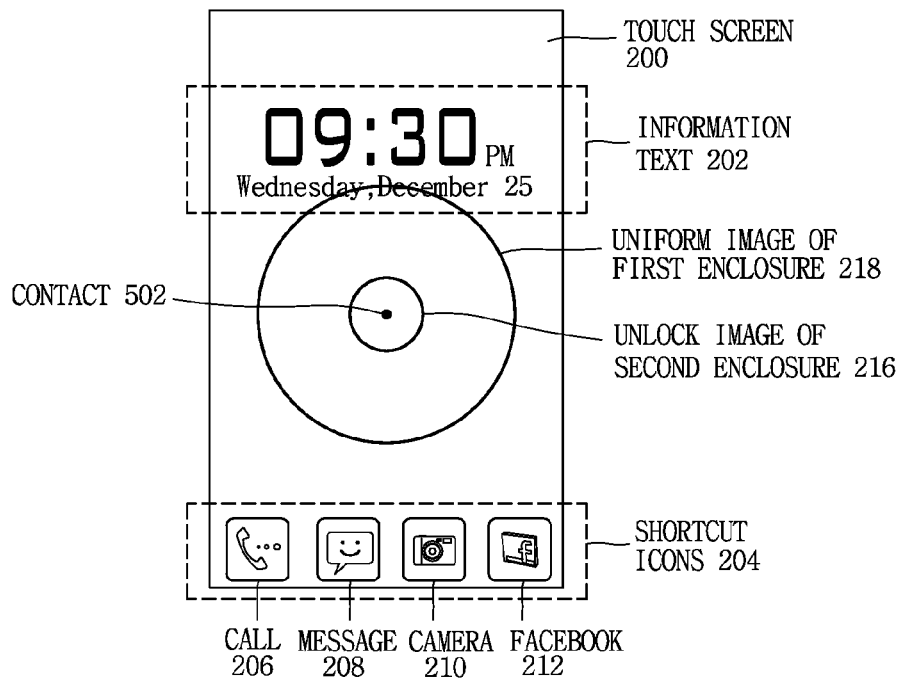
FIGS. 5A-5D illustrate an exemplary view of unlocking the mobile terminal when a contact is initially made on the first area of the touch screen, according to one embodiment.
Figure 5B:
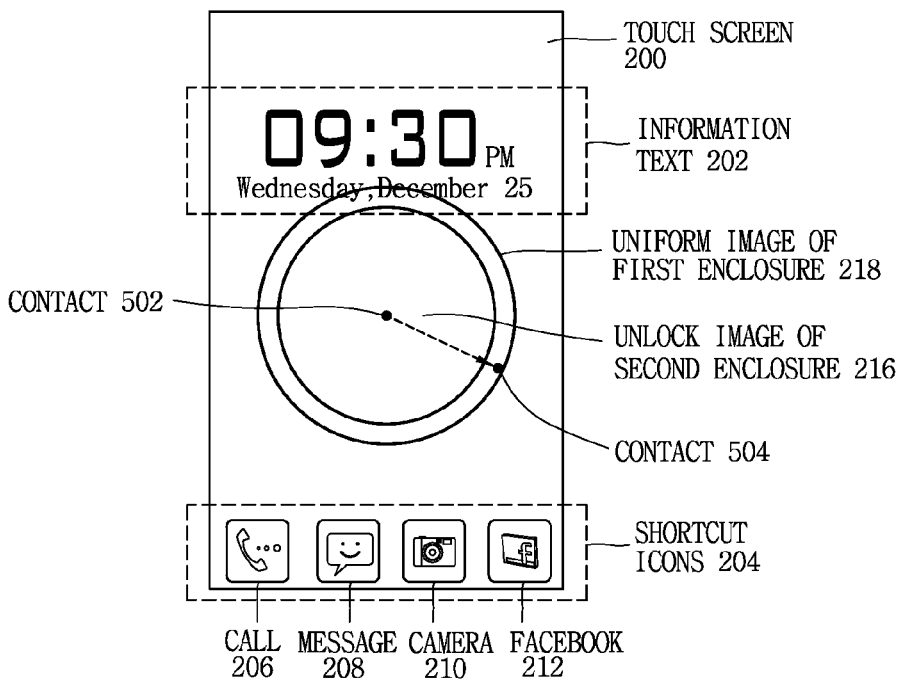
Figure 5C:
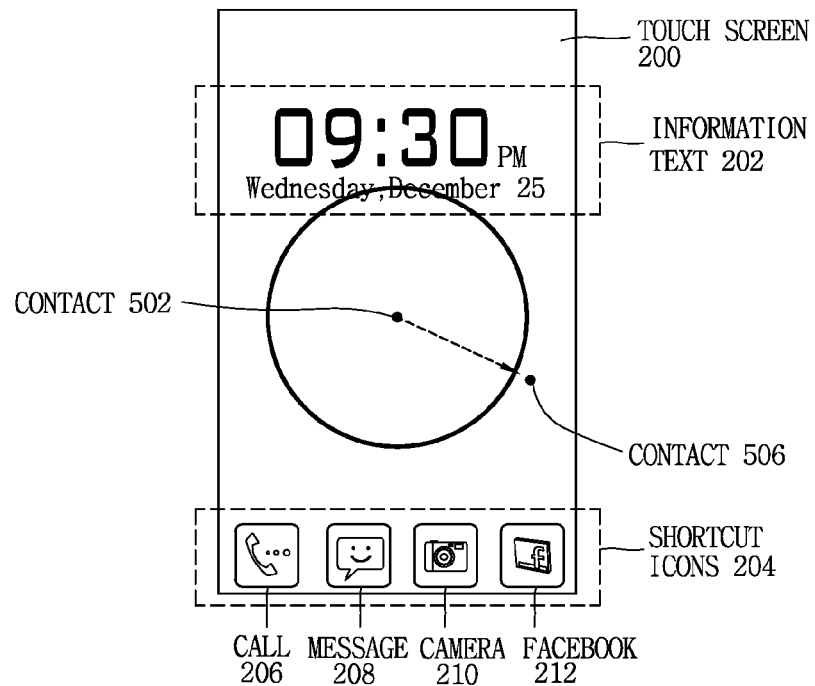
Figure 5D:
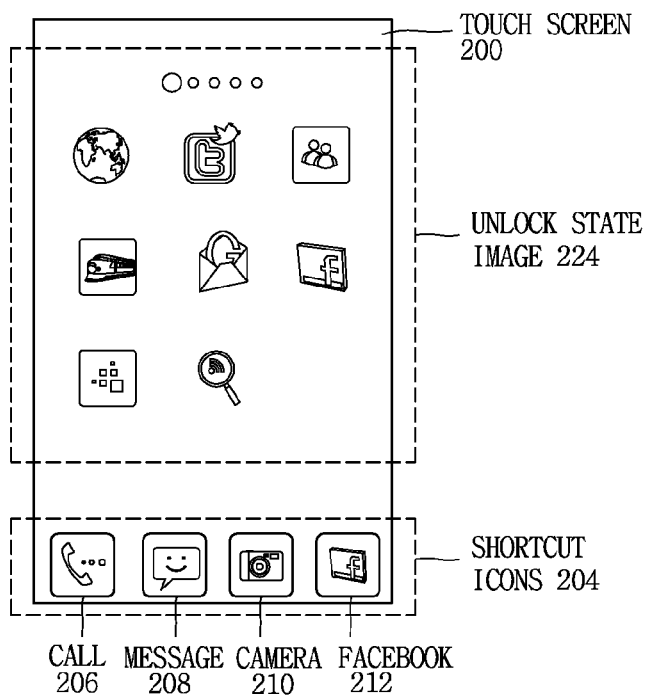

FIGS. 5A-5D illustrate an exemplary view of unlocking the mobile terminal 100 when a contact is initially made on the first area 406 of the touch screen 200, according to one embodiment. In FIG. 5A, a contact (e.g., a contact 502) is made on the first area 406 of the touch screen 200. In response to the contact, the unlock image of the second enclosure 216 and the uniform image of the first enclosure 218 are displayed on the touch screen 200. As the contact is moved (e.g., dragged) from the initial position (e.g., the contact 502) to a position close to the uniform image of the first enclosure 218 (e.g., contact 504) in FIG. 5B, and is moved beyond the uniform image of the first enclosure 218 to a position outside of the uniform image of the first enclosure 218 (e.g., a contact 506) as in FIG. 5C, the unlock state image 224 is generated on the touch screen 200 upon release of the contact, as shown in FIG. 5D. In one embodiment, the unlock state image 224 may be a home screen or a last visited screen which was saved from the previous active session of the mobile terminal 100.

In one embodiment, as illustrated in FIG. 5C, the unlock image of the second enclosure 216 is enlarged up to the size of the uniform image of the first enclosure 218 even though the contact moves beyond the boundary of the uniform image of the first enclosure 218 (e.g., as in the case of the contact 506). Alternatively, the unlock image of the second enclosure 216 may be enlarged beyond the size of the uniform image of the first enclosure 218 according to the movement of the contact. In one embodiment, the home screen or the last visited screen may be displayed within the unlock image of the second enclosure 916 while the movement of the contact is being made. In another embodiment, the text information 202 may alter its optical intensity, which may be based on one or more combinations of color, hue, color saturation, brightness, contrast, transparency, etc., during the movement of the contact.

Figure 6A:
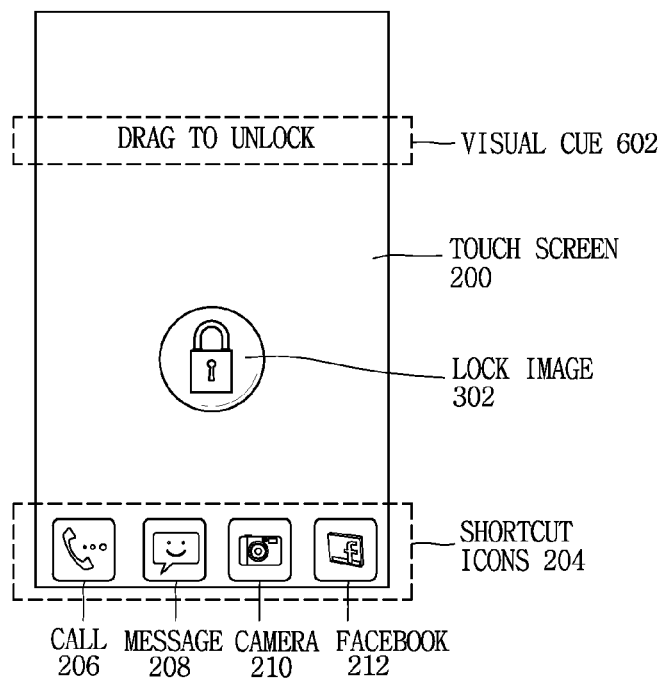
Figure 6B:
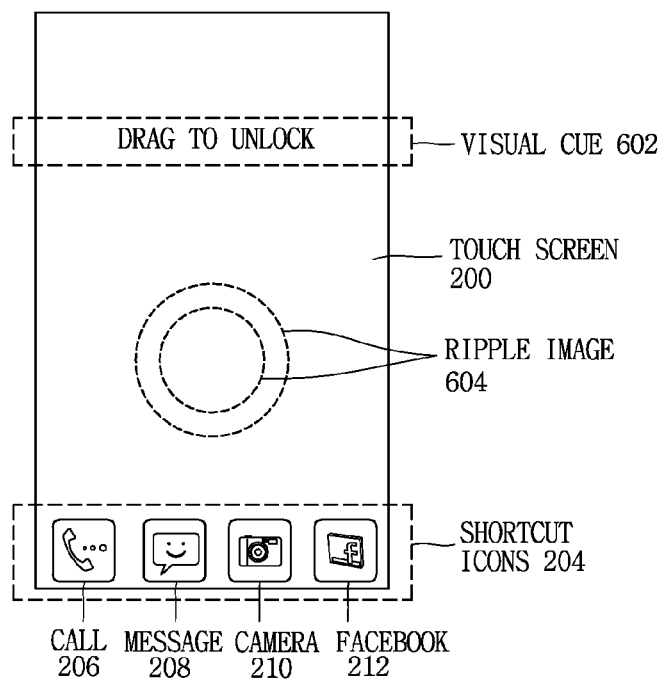
Figure 6C:
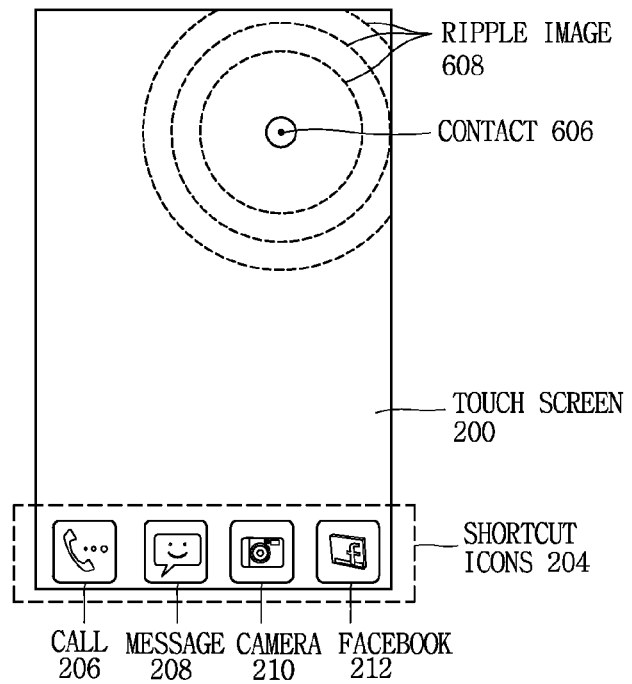
Figure 6D:
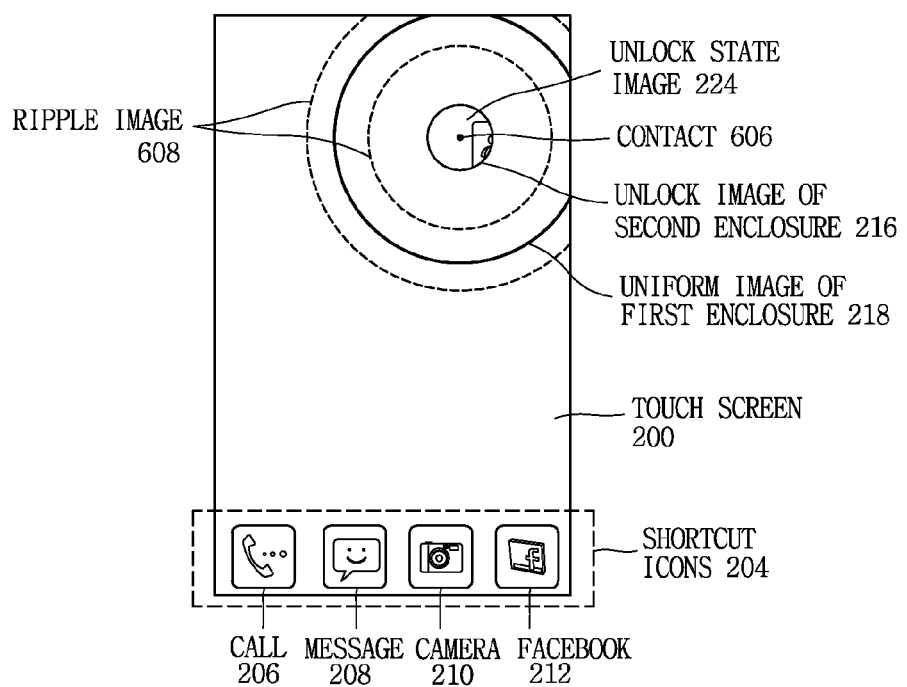

FIGS. 6A-6J illustrate an exemplary implementation of unlocking the mobile terminal 100 as illustrated in FIGS. 5A-5D, according to one embodiment. In FIG. 6A, the lock image 302 appears on the touch screen 200 to indicate the locked state of the mobile terminal 100. Further, a visual cue 602 is displayed to provide a user of the mobile terminal 100 a clue to unlock the mobile terminal 100. In FIG. 6B, the lock image 302 is displayed for a brief period of time, such as two seconds, and a ripple image 604 is presented on the area of the touch screen 200 where the lock image 302 used to be displayed. In FIG. 6C, when a touch, such as a contact 606, is applied on a region of the touch screen 200, a ripple image 608 is formed around the contact 606. It is appreciated that the ripple image 608 may take after a series of waves formed on the surface of water when an object is thrown into the water. Further, in FIG. 6D, the unlock image of the second enclosure 216 and the uniform image of the first enclosure 218 are formed around the contact 606. Further, the unlock state image 224 is provided on the region inside the unlock image of the second enclosure 216, thus providing a glimpse of the unlock state image 224 had the mobile terminal 100 been unlocked. In one embodiment, the unlock image of the second enclosure 216 and the uniform image of the first enclosure 218 may be the same color (e.g., white). In an alternative embodiment, the unlock image of the second enclosure 216 and the uniform image of the first enclosure 21R may be different colors (e.g., white color for the unlock image of the second enclosure 216 and red color for the uniform image of the first enclosure 218).

Figure 6G:
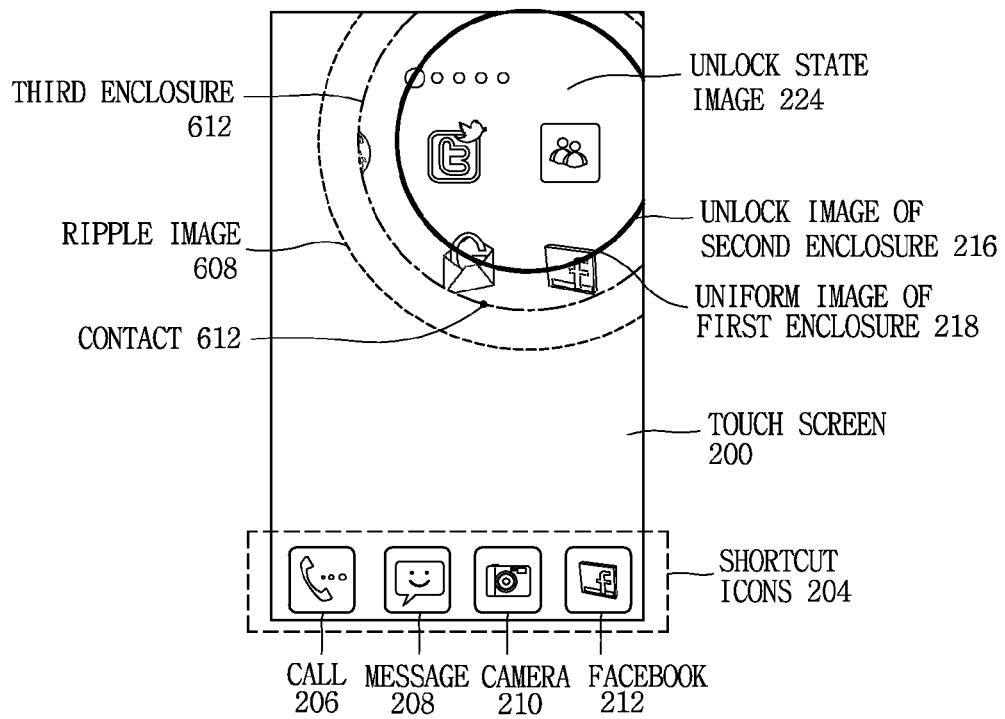
Figure 6H:
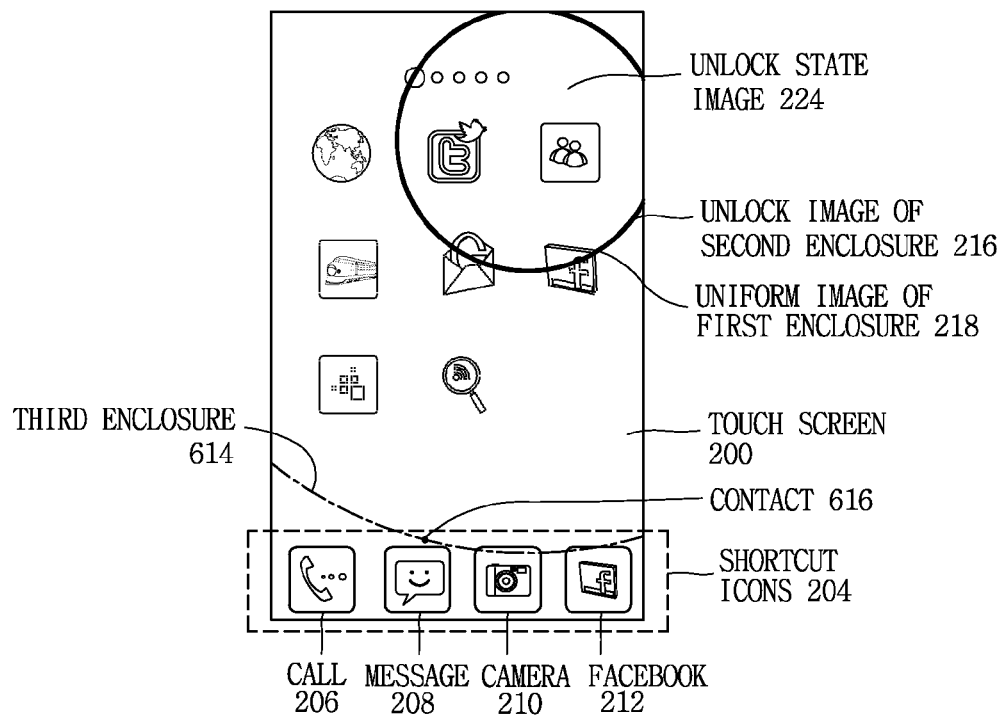
Figure 6I:
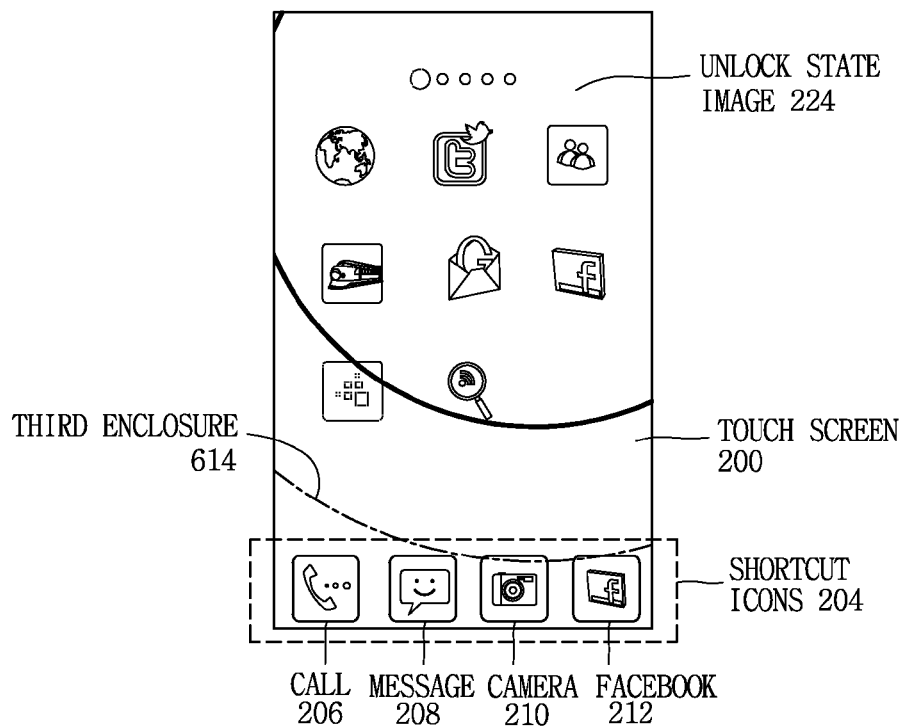
Figure 6J:
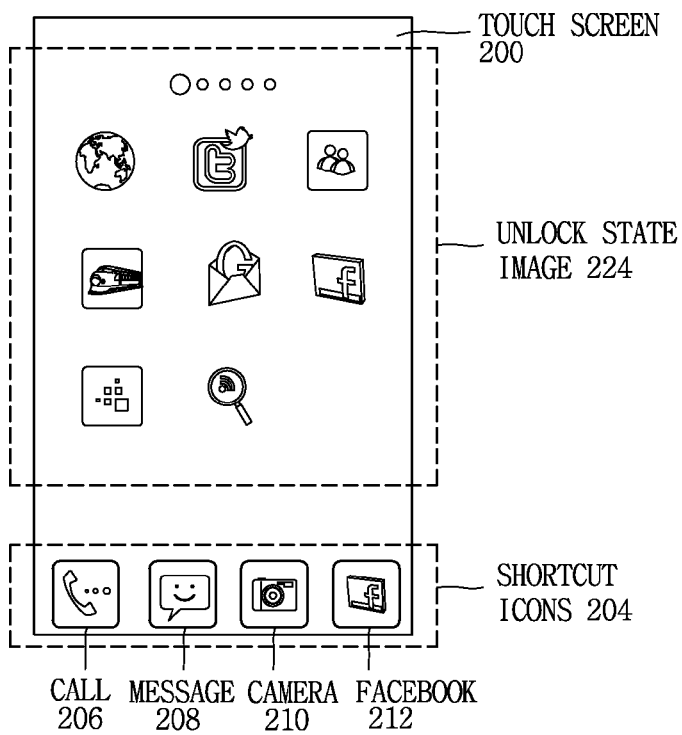

In FIG. 6E, the feature of the unlock image of the second enclosure 216 becomes distinctive. For example, the circle which forms the unlock image of the second enclosure 216 may become bolder or thicker as it becomes overlapped with the uniform image of the first enclosure 218. In FIG. 6F, as the unlock image of the second enclosure 216 is dragged to a new location (e.g., a contact 610), the ripple image 608 is propagated along the direction of the dragging, in this instance, outward. Further, as the unlock image of the second enclosure 216 gets bigger, more of the unlock state image 224 is seen through it. In FIG. 6G, as the contact is dragged to a location outside of the uniform image of the first enclosure 218 (e.g., a contact 612) on the touch screen 200, a third enclosure 614 is formed. In FIG. 6G, the unlock image of the second 218 remains within the boundary of the uniform image of the first enclosure 218 even though the contact is dragged beyond the boundary of the uniform image of the first enclosure 218. In one exemplary implementation, the region between the unlock image of the second enclosure 216 and the third enclosure 614 may be semi-transparent so that the images of objects (e.g., shortcut icons) underneath the region may be partially seen. Further, the ripple image 608 may be moved further out in response to the outward dragging of the contact (e.g., the contact 612). In FIG. 6H, as the contact is dragged further out to a location of the touch screen (e.g., a contact 616), more objects on the touch screen 200 are seen via the semi-transparent region. As the contact is released as illustrated in FIG. 6I, the unlock state image 224 is presented to its entirety as illustrated in FIG. 6J.

Figure 7A:
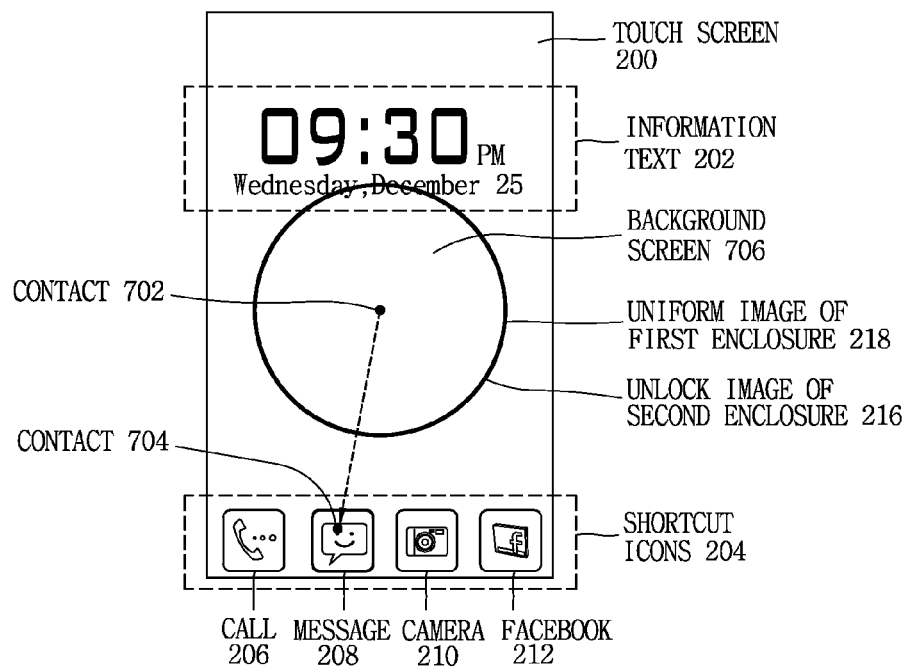
FIGS. 7A and 7B illustrate an exemplary view of simultaneously executing an application and unlocking the mobile terminal, according to one embodiment.
Figure 7B:
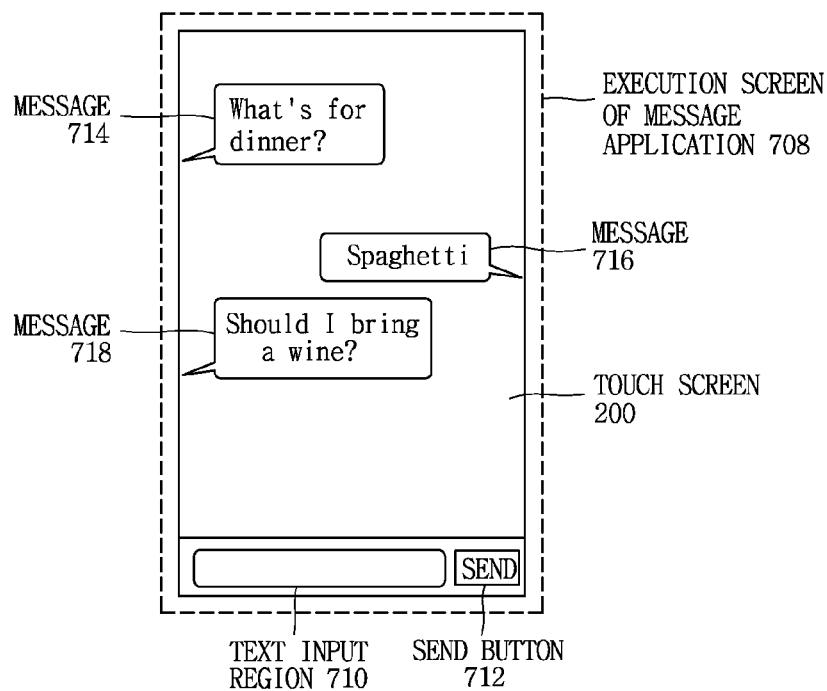

FIGS. 7A and 7B illustrate an exemplary view of simultaneously executing an application and unlocking the mobile terminal 100, according to one embodiment. As illustrated in FIG. 5A, the unlock image of the second enclosure 216 and the uniform image of the first enclosure 218 are displayed on the touch screen 200 when a contact (e.g., a contact 702) is made on the first area 406 of the touch screen 200. In one embodiment, as the unlock image of the second enclosure 216 is enlarged, the home screen of the last visited screen may be displayed through the unlock image of the second enclosure 216.

In FIG. 7A, as the contact (e.g., a contact 704) moves beyond the uniform image of the first enclosure 218 and touches the message 208 or message icon to select the message 208, the message icon may be highlighted to inform the selection. In one exemplary implementation, the message icon may move closer to the uniform image of the first enclosure 218 when it is detected by the mobile terminal 100 that the movement of the contact heads toward the direction of the message 208. In one embodiment, the background screen 706 may be altered to display an image associated with the message icon. In another exemplary implementation, an optical intensity of the text information 202 may be altered (e.g., blurred, dimmed, etc.) during the movement of the contact.

When the contact (e.g., the contact 704) is released, an execution screen of an application (e.g., or a website) associated with the selected icon (e.g., the message 208) is launched as illustrated in FIG. 7B. In FIG. 7B, the execution screen of message application 708 (or the execution screen of the message service associated with the message 208) comprises a text input region 710 and a send button 712. Further, on the touch screen 200, there appear three messages (e.g., a message 714, a message 716, and a message 718) that have been exchanged between the mobile device 100 and its counterpart device. For example, the message 714 may be a message that were forwarded by the counterpart device during the previous session of message exchange, and the message 716 may be a message sent by the mobile device 100 in response. Further, the message 718 may be a message forwarded by the counterpart mobile device that has been received the mobile terminal 100 but that has not been viewed by the user of the mobile device 100. With the launching of the application, the mobile terminal 100 is unlocked. Accordingly, once the execution of the application (e.g., the message 208) is completed, the touch screen 200 may be occupied with the home screen or the last visited screen.

Figure 8A:
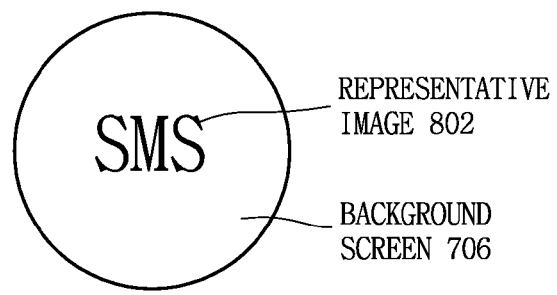
FIGS. 8A-8C illustrate exemplary views of the background screen displayed within the unlock image, according to one embodiment.
Figure 8B:
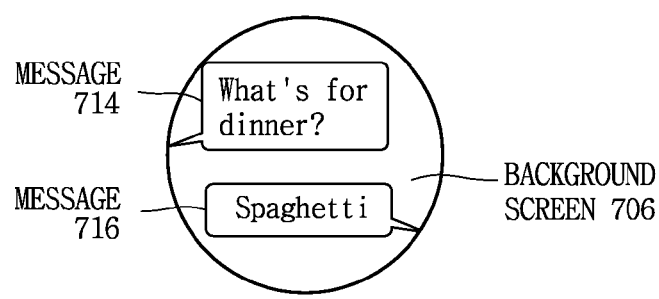
Figure 8C:
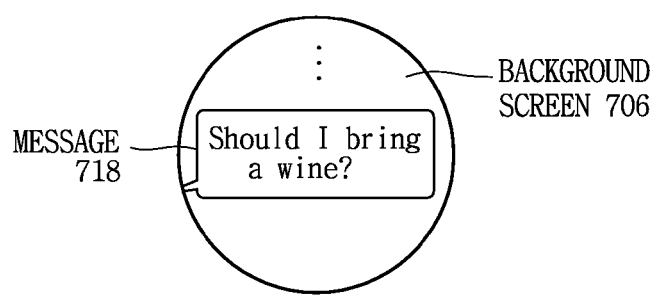

FIGS. 8A-8C illustrate exemplary views of the background screen 706 displayed within the unlock image of the second enclosure 216, according to one embodiment. As was described in FIG. 7A, when it is detected by the mobile terminal 100 that the movement of the contact is in the direction of the message 208, the background screen 706 may display an image associated with the message 208. In one embodiment, the background screen 706 may comprise a representative image of the shortcut icon (e.g., the message 208) as in FIG. 8A, a last saved image of data associated with the shortcut icon (e.g., the message 714 and the message 716 which were saved from the most recent session of the message service) as in FIG. 8B, or an updated image of the data (e.g., the list of the messages that include the message 718 which has just been received by the mobile terminal 100 but has not viewed by the user of the mobile device 100, yet) as in FIG. 8C, FIGS. 9A and 9B illustrate an exemplary view of selecting a shortcut icon, according to one embodiment. In FIG. 9A, a camera 210 or a camera icon is selected as the contact moves from the initial position (e.g., a contact 902) to a position touching on the camera 210 (e.g., a contact 904). If the contact is not released at this point, the application of the camera 210 may not be launched or executed. Subsequently, the contact is moved to the message 208 and the contact is released as illustrated in FIG. 9B, the application of the message 208 (e.g., a SMS service) may be launched. In one exemplary implementation, as the unlock image of the second enclosure 216 is enlarged, the home screen of the last visited screen may be displayed through or within the unlock image of the second enclosure 216. However, once the touch screen 200 detects that the contact is in the direction of the message 208, the image associated with the message 208 may be displayed within the unlock image of the second enclosure 216. In another exemplary implementation, an optical intensity of the text information 202 may be altered (e.g., blurred, dimmed, etc.) during the movement of the contact.

Figure 10A:
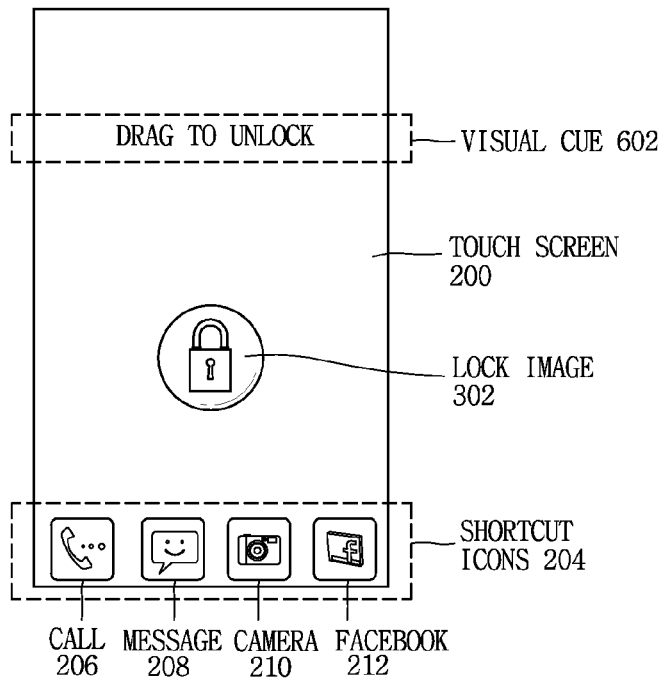
FIGS. 10A-10K illustrate an exemplary implementation of simultaneously executing an application and unlocking the mobile terminal as illustrated in FIGS. 7A and 7B, according to one embodiment.
Figure 10B:
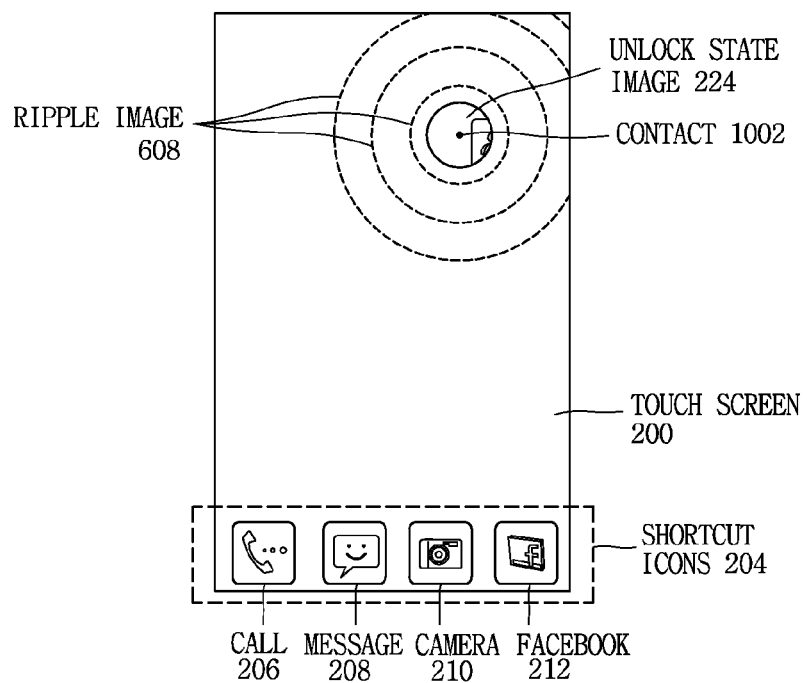

FIGS. 10A-10K illustrate an exemplary implementation of simultaneously executing an application and unlocking the mobile terminal 100 as illustrated in FIGS. 7A and 7B, according to one embodiment. In FIG. 10A, the lock image 302 appears on the touch screen 200 to indicate the locked state of the mobile terminal 100. Further, the visual cue 602 is displayed to provide a user of the mobile terminal 100 a clue to unlock the mobile terminal 100. The lock image 302 may be displayed for a brief period of time, such as two seconds, and the ripple image 604 is presented on the area of the touch screen 200 where the lock image 302 used to be displayed. In FIG. 10B, when a touch, such as a contact 1002, is applied on a region of the touch screen 200, the ripple image 608 is formed around the contact 1002. Further, in FIG. 10C, the unlock image of the second enclosure 216 and the uniform image of the first enclosure 218 are formed around the contact 1002. Further, the unlock state image 224 is provided on the region inside the unlock image of the second enclosure 216, thus providing a glimpse of the unlock state image 224 had the mobile terminal 100 been unlocked.

Figure 10C:
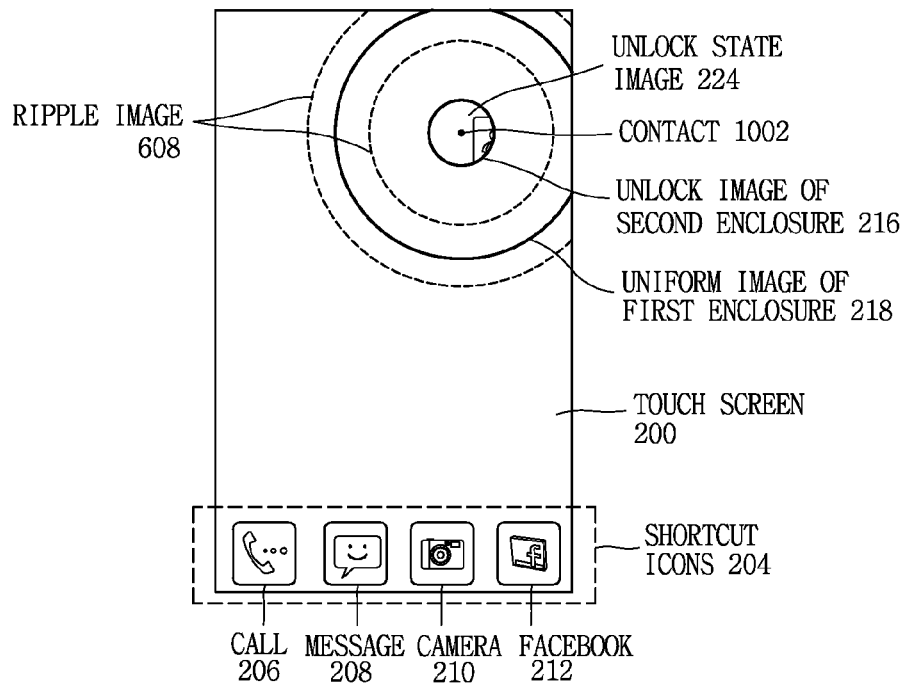
Figure 10D:
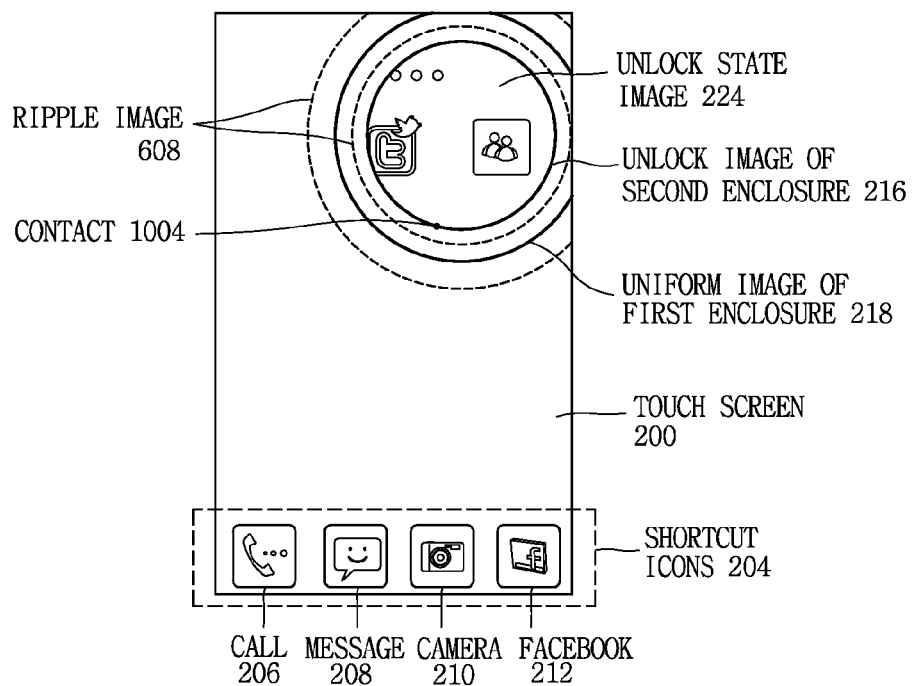
Figure 10E:
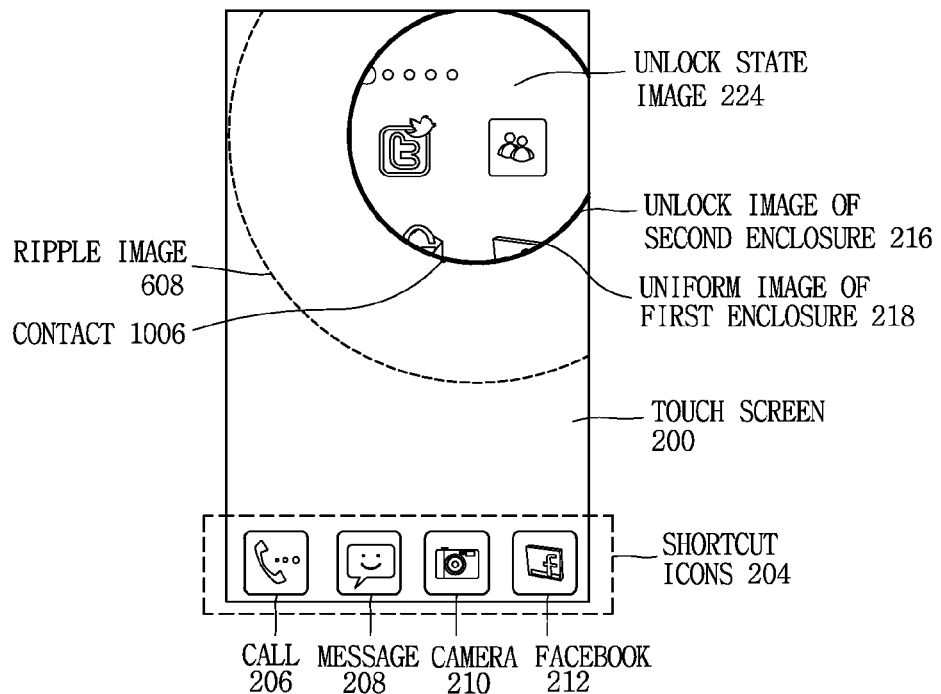
Figure 10F:
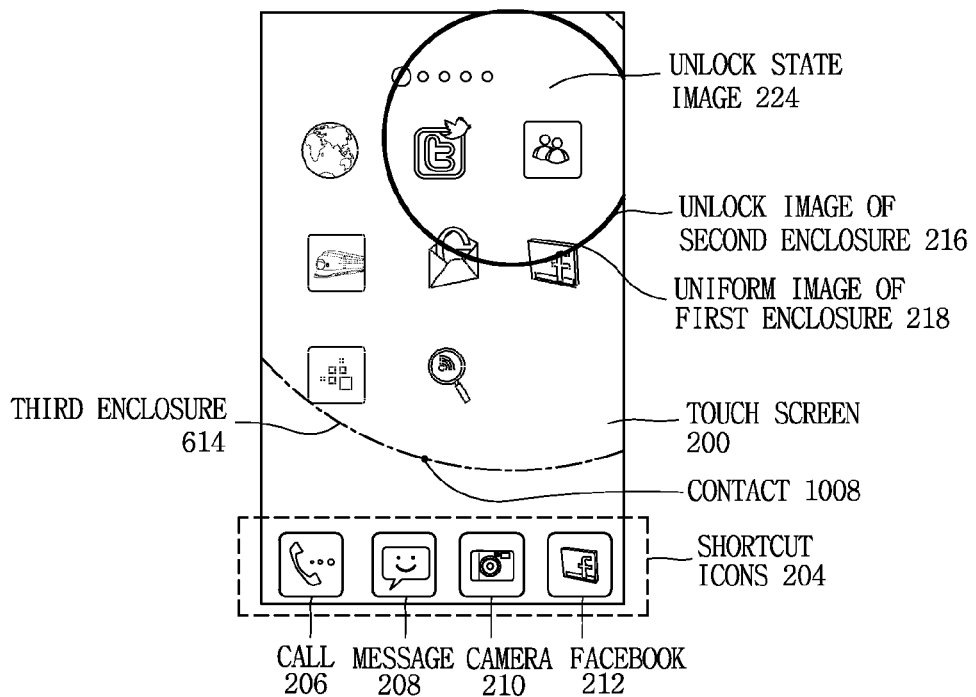

In FIG. 10C, the feature of the unlock image of the second enclosure 216 becomes distinctive. For example, the circle which forms the unlock image of the second enclosure 216 may become bolder or thicker. In FIG. 10D, as the unlock image of the second enclosure 216 is dragged to a new location (e.g., a contact 1004), the ripple image 608 is propagated along the direction of the dragging, in this instance, outward. Further, as the unlock image of the second enclosure 216 gets bigger, more of the unlock state image 224 is seen through it. In FIG. 10E, as the contact is dragged to a location on the uniform image of the first enclosure 218 (e.g., a contact 1006) on the touch screen 200, the ripple image 606 is propagated further out. In FIG. 10F, as the contact is dragged even further outside of the uniform image of the first enclosure 218 to a location (e.g., a contact 1008) on the touch screen 200, a semi-transparent region is formed between the unlock image of the second enclosure 216 and the third enclosure 614. The region may be semi-transparent so that the images of objects (e.g., shortcut icons) underneath the region may be partially seen.

Figure 10G:
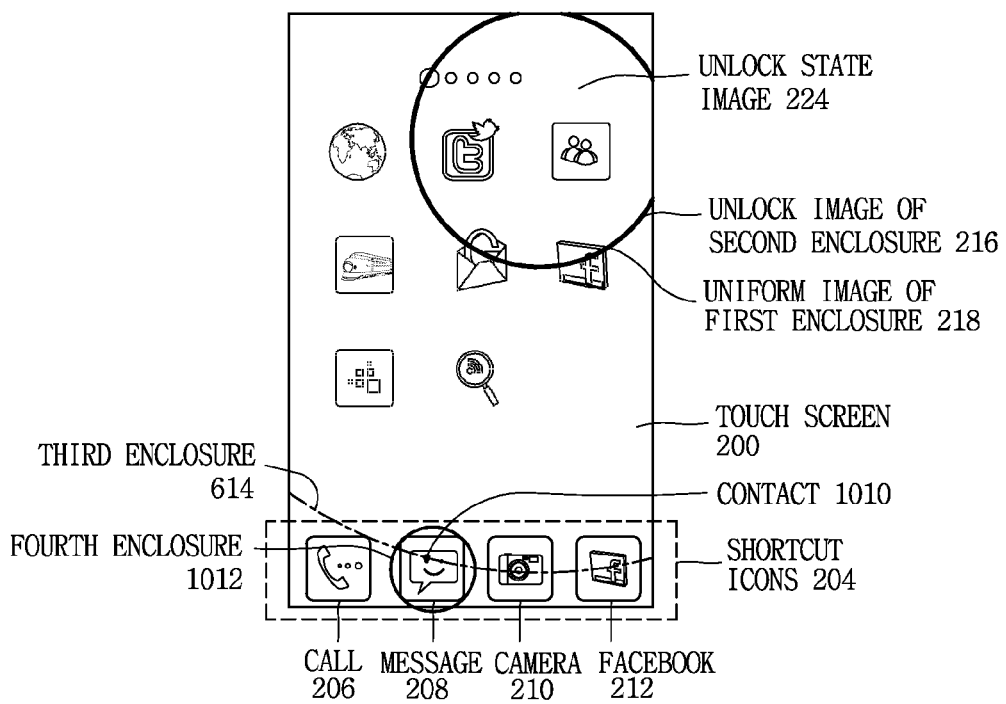
Figure 10H:
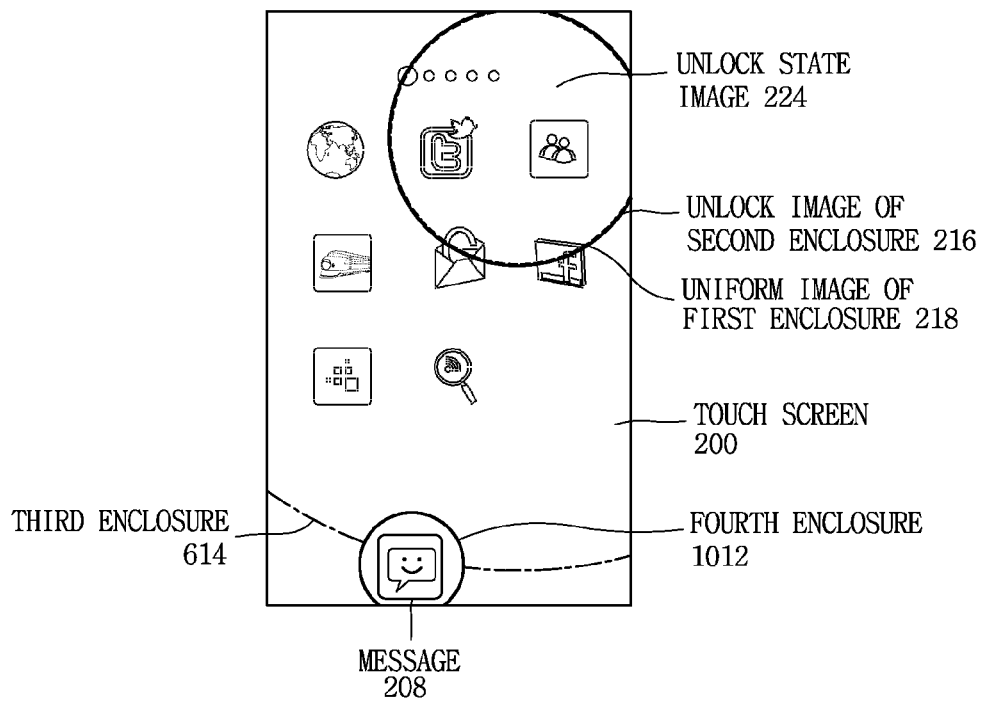
Figure 10I:
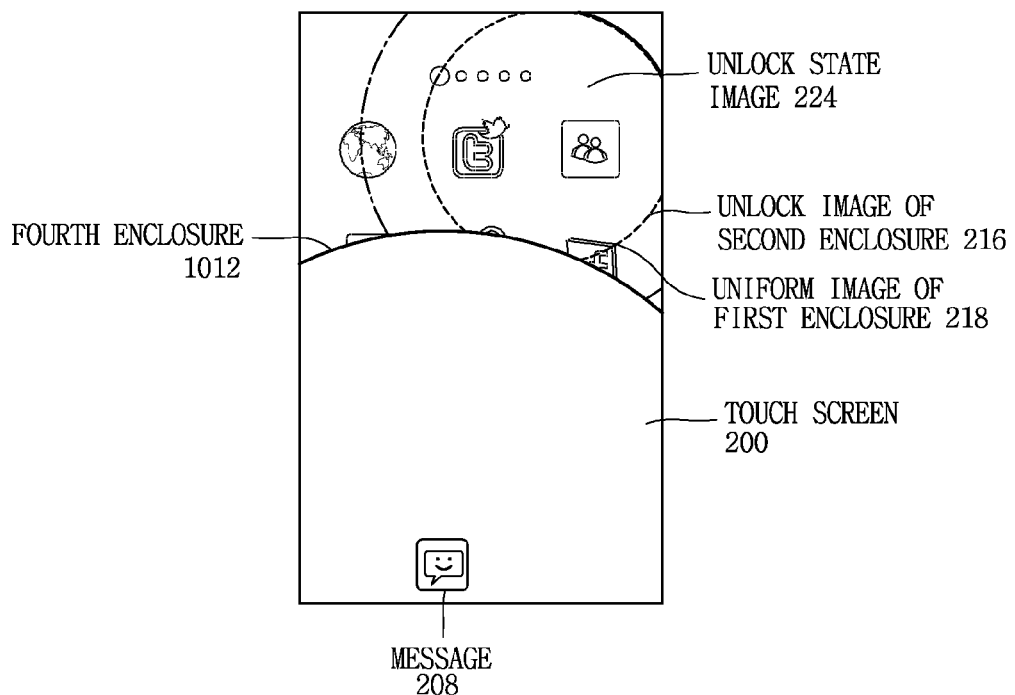
Figure 10J:
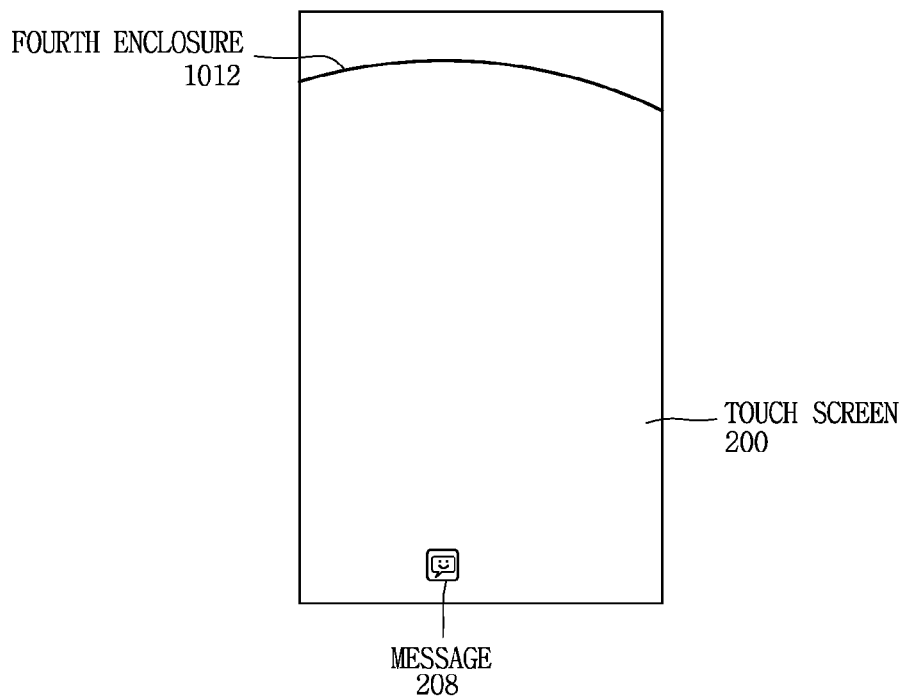
Figure 10K:
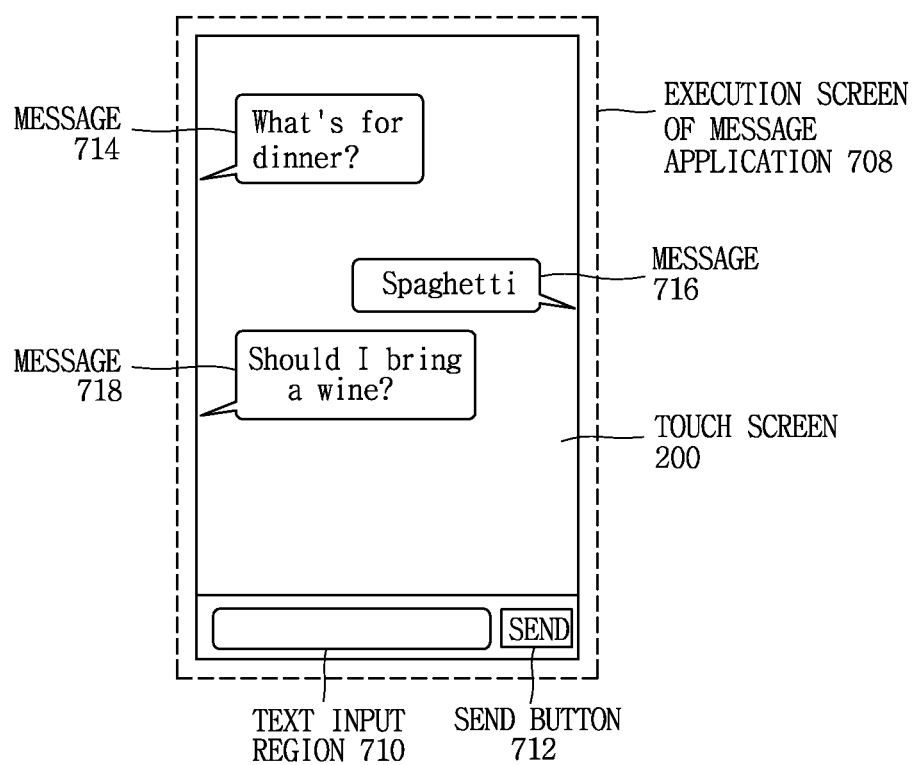

In FIG. 10G, as the contact touches on the message 208 or any other shortcut icons, a fourth enclosure 1012 is formed around the message 208 to indicate the selection thereof. Then, as illustrated in FIGS. 10H-J, as the contact is released, the fourth enclosure 1012 gradually expands while the size of the message 208 shrinks to its minimum. Further, the portion of the touch screen 200 which is not part of the fourth enclosure 1012 becomes semi-transparent or blurred. Moreover, in FIG. 10K, the application of the message 208 is executed when the fourth enclosure 1012 completes its expansion. In one exemplary implementation, there may be a blackout of the touch screen 200 between the complete expansion of the fourth enclosure 1012 and the execution of the application.

FIGS. 11A-11D is an exemplary view of unlocking the mobile terminal 100 when a contact is initially made on the second area 404 of the touch screen 200, according to one embodiment. As the contact (e.g., a contact 1102) is made on the touch screen 200, the unlock image of the second enclosure 216 and the uniform image of the first enclosure 218 are displayed on the touch screen 200. Since the contact is made on the second area 404 of the touch screen 200, a part or entirety of the shortcut icons 204 may already be within the boundary of the uniform image of the first enclosure 218. Thus, even if the user does not intend to launch an application associated with any of the shortcut icons 204 but wants to just unlock the mobile device 100, the application may be launched since the enlarging of the unlock image of the second enclosure 216 may touch on the shortcut icon of the application (e.g., the Facebook 212).

Figure 11C:
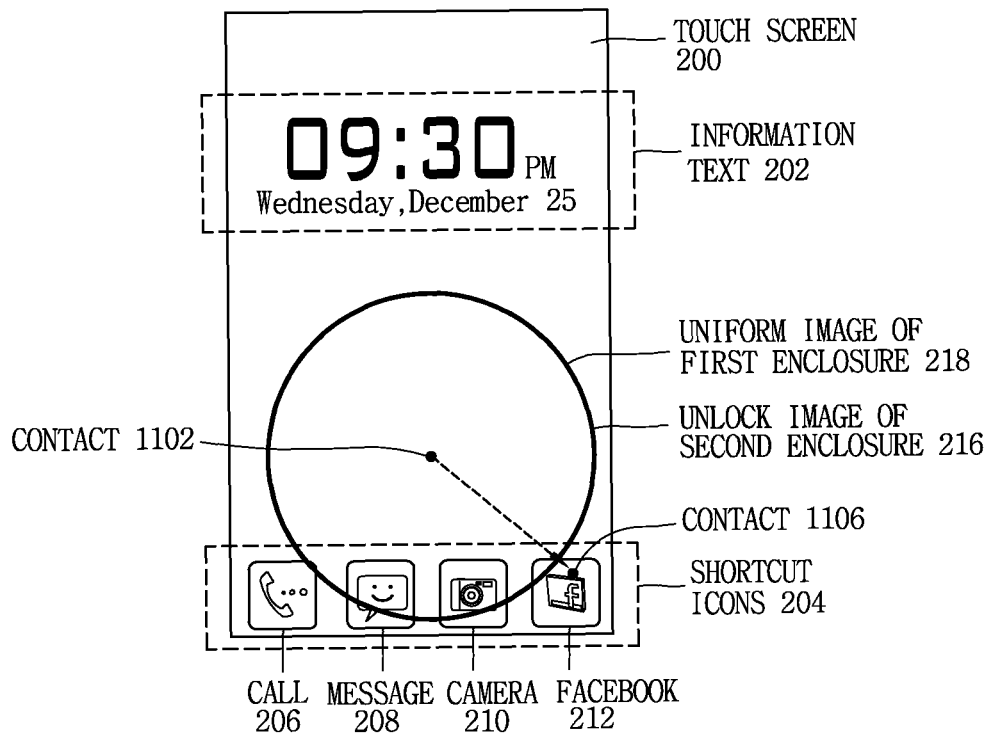
Figure 11D:
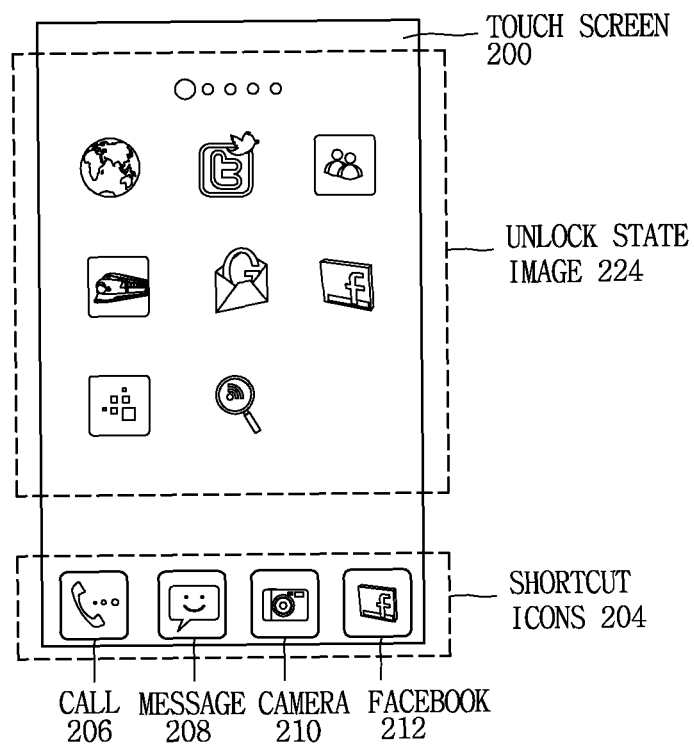

To eliminate such an error, according to one embodiment of the disclosure, the mobile device 100 is configured not to launch or execute any application associated with the shortcut icons 204 even if the shortcut icon of the application is being touched by the unlock image of the second enclosure 216 as long as the initial contact is made on the second area 404 of the touch screen 200. For example, in FIGS. 11B and 11C, although contacts (e.g., a contact 1104 and a contact 1106) are made on the Facebook 212 or its icon, as seen in FIG. 11D, only the unlock state image 224 (e.g., the home screen or last visited screen) are displayed upon the releasing of the contact, and the application of the Facebook 212 is not being launched or executed.

In one embodiment, the optical intensity of the set of shortcut icons 204 are altered (e.g., dimmed) in response to the contact on the touch screen 200 to indicate that the set of shortcut icons 204 are disabled when the contact is made on the second area 404 of the touch screen 200. Further, the home screen or the last visited screen of the mobile terminal are displayed through or within the unlock image of the second disclosure 216 during the movement of the contact. Further, the information text 202 may be blurred or dimmed during the movement of the contact.

FIGS. 12A-12D illustrate an exemplary view of executing an application when a contact is initially made on the third area 402 of the touch screen 200, according to one embodiment. As the contact (e.g., a contact 1202) is made on the touch screen 200, the unlock image of the second enclosure 216 and the uniform image of the first enclosure 218 are displayed on the touch screen 200. Since the contact is made on the third area 402 of the touch screen 200, the mobile terminal 100 is configured to interpret the initial contact by the user as an intention to select and/or launch an application or webpage associated with a selected one of the shortcut icons 204. Thus, according to the configuration, the mobile device 100 launches or executes the application associated with the selected one of the shortcut icons 204 even if the unlock image of the second enclosure 216 is enlarged to reach the uniform image of the first enclosure 218.

Figure 12C:
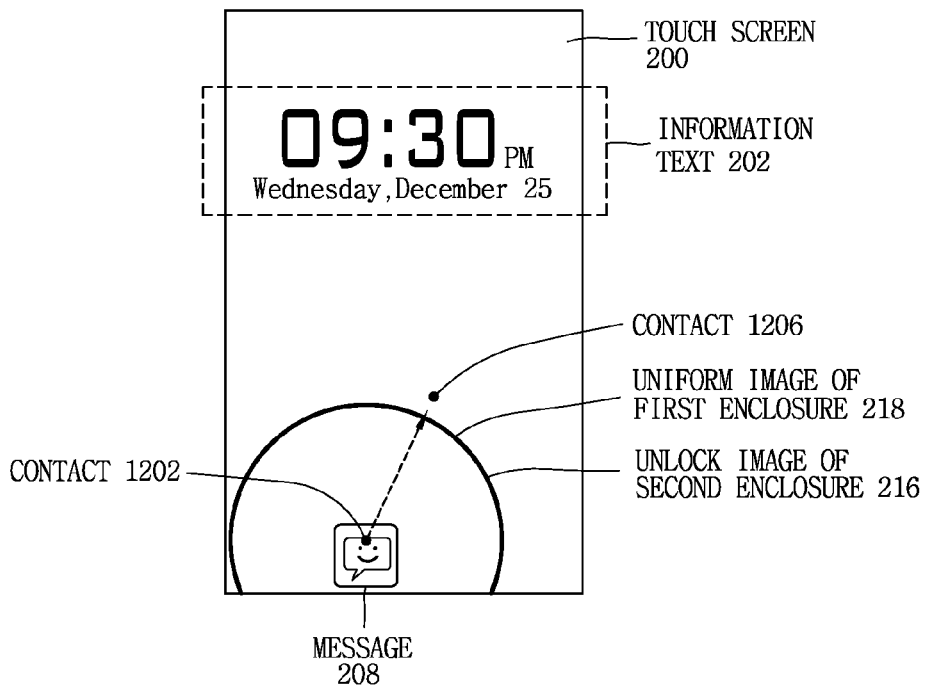
Figure 12D:
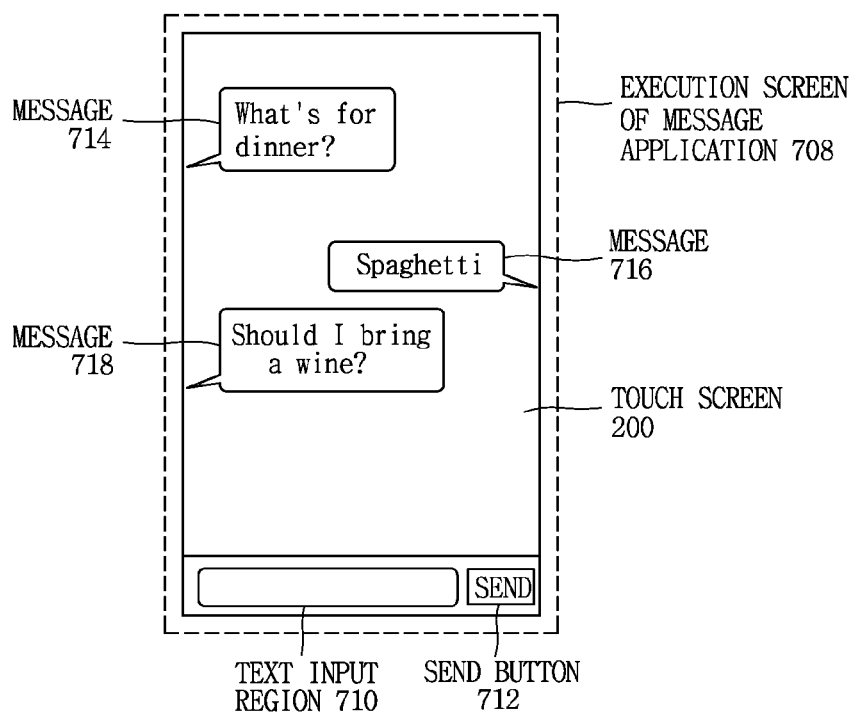

For example, in FIGS. 12A and 12B, the contact (e.g., the contact 1202) is initially made on the message 208 or its icon, and the unlock image of the second enclosure 216 is enlarged according to the movement of the contact (e.g., a contact 1204) while the contact is continuously maintained with the touch screen 200. Then, in FIG. 12C, the unlock image of the second enclosure 216 coincides with the uniform image of the first enclosure 218 as the contact moves beyond the boundary of the uniform image of the first enclosure 218 (e.g., as in a contact 1206). As the contact is released from the position as illustrated in FIG. 12C, the execution screen of the message application 708 is launched or executed as illustrated in FIG. 12D.

In one embodiment, the optical intensity of remaining icons among the set of shortcut icons, such as the call 206, the camera 210, and the Facebook 212, may decrease (e.g., dimmed or disappear) in response to the selection of the message 208. Further, the background screen displayed through and within the unlock image of the second enclosure 216 may be a representative image of the shortcut icon (e.g., the message 208) as in FIG. 8A, a last saved image of data associated with the shortcut icon (e.g., the message 714 and the message 716 which were saved from the most recent session of the message service) as in FIG. 8B, or an updated image of the data (e.g., the list of the messages that include the message 718 which has just been received by the mobile terminal 100 but has not been viewed by the user of the mobile terminal 100, yet) as in FIG. 8C.

Figure 13A:
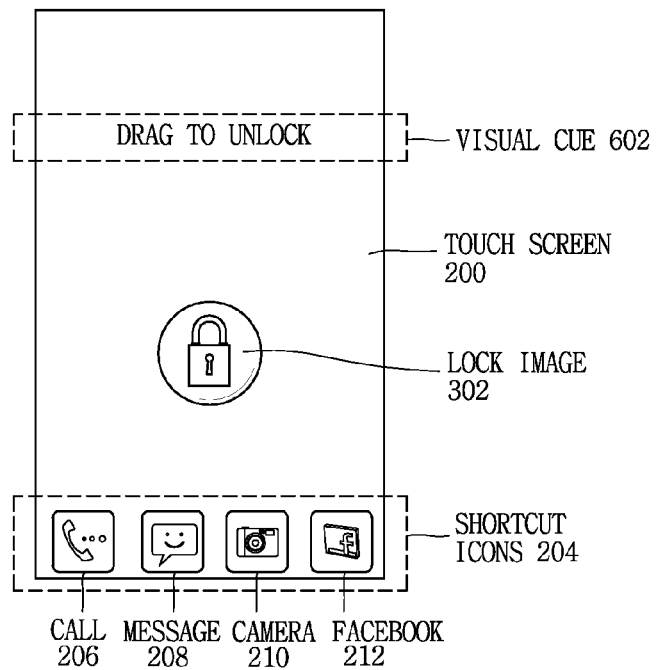
FIGS. 13A-13I illustrate an exemplary implementation of executing an application when a contact is initially made on the third area of the touch screen as illustrated in FIGS. 12A-12D, according to one embodiment.
Figure 13B:
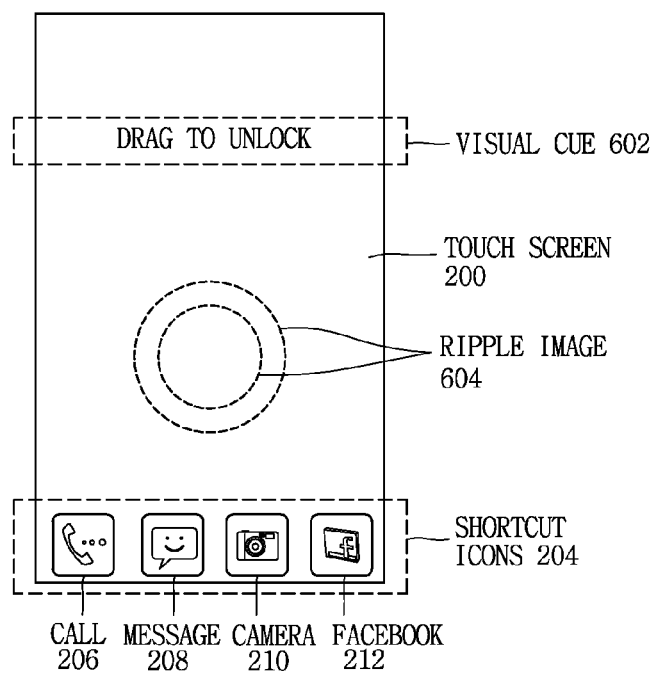

FIGS. 13A-13I illustrate an exemplary implementation of executing an application when a contact is initially made on the third area 402 of the touch screen 200 as illustrated in FIGS. 12A-12D, according to one embodiment. In FIG. 13A, the lock image 302 appears on the touch screen 200 to indicate the locked state of the mobile terminal 100. Further, the visual cue 602 is displayed to provide a user of the mobile terminal 100 a clue to unlock the mobile terminal 100. In FIG.

Figure 13C:
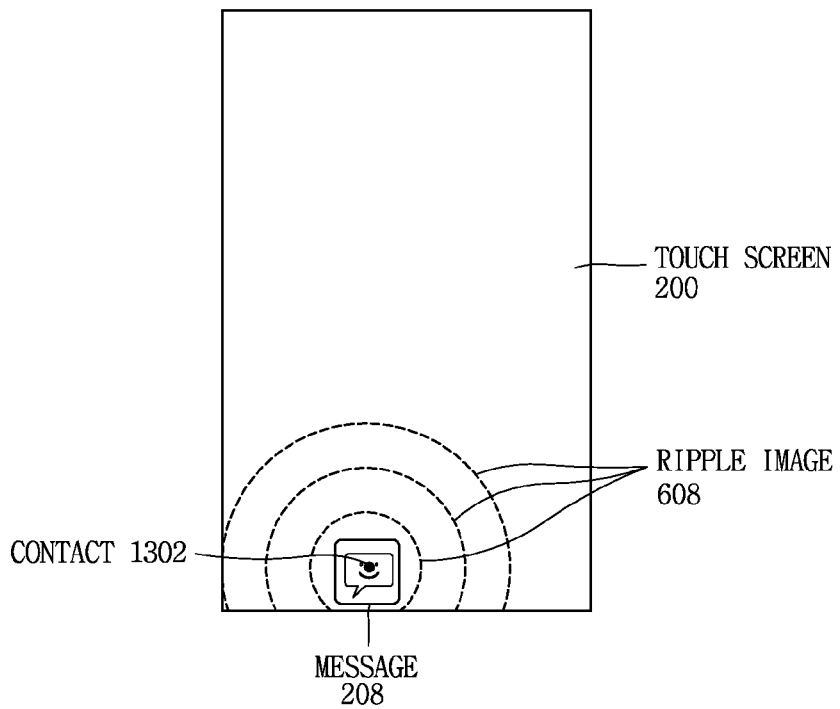
Figure 13D:
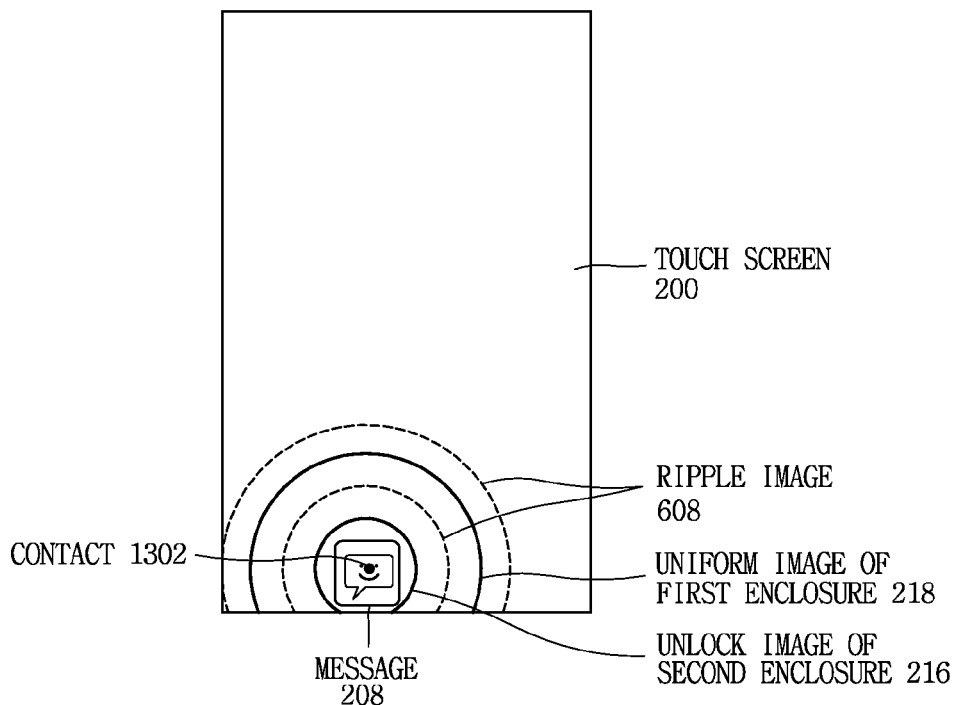

13B, the lock image 302 is displayed for a brief period of time, such as two seconds, and the ripple image 604 is presented on the area of the touch screen 200 where the lock image 302 used to be displayed. In FIG. 13C, when a contact 1302 is made on a shortcut icon of the touch screen 200, such as the message 208, the ripple image 608 is formed around the contact 1302. Further, the rest of the shortcut icons 204 beside the message 208 are dimmed out or become hidden. Further, in FIG. 13D, the unlock image of the second enclosure 216 and the uniform image of the first enclosure 218 are formed around the contact 1302.

Figure 13E:
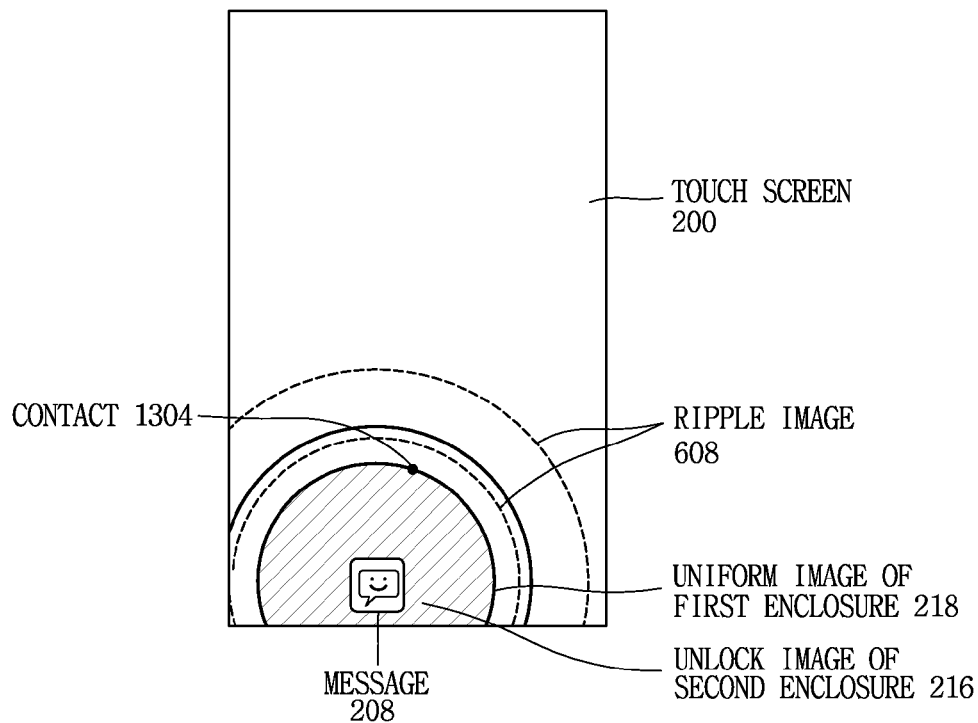
Figure 13F:
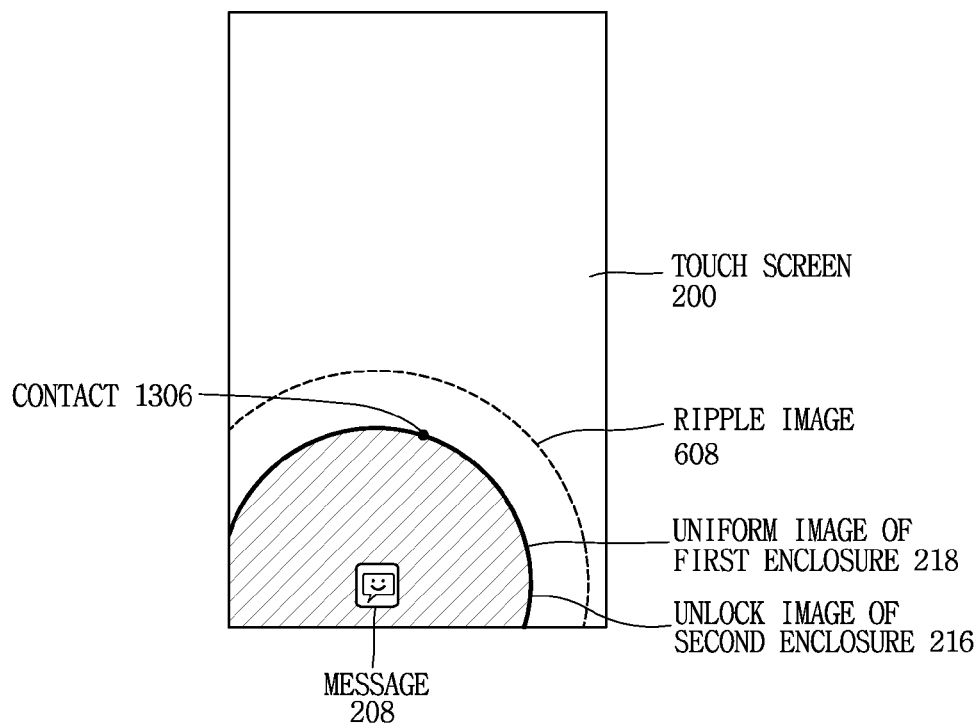
Figure 13G:
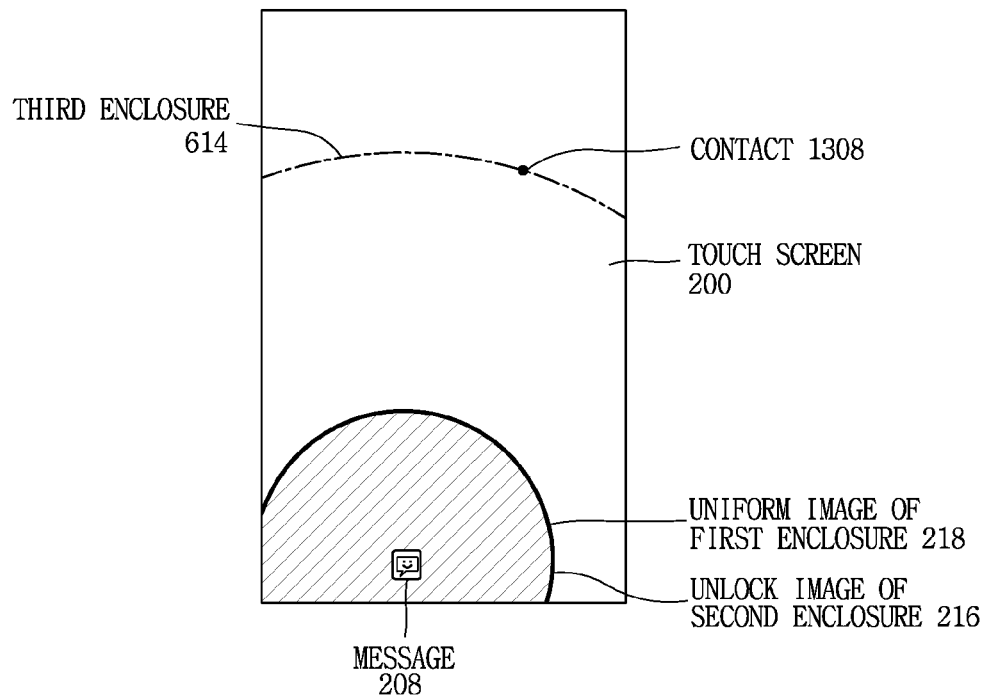
Figure 13H:
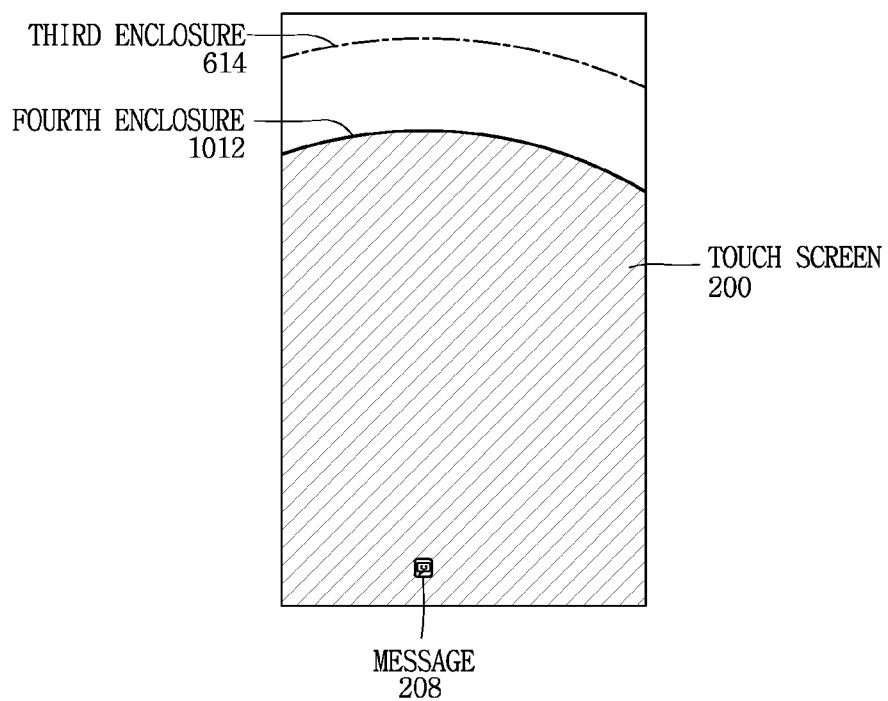
Figure 13I:
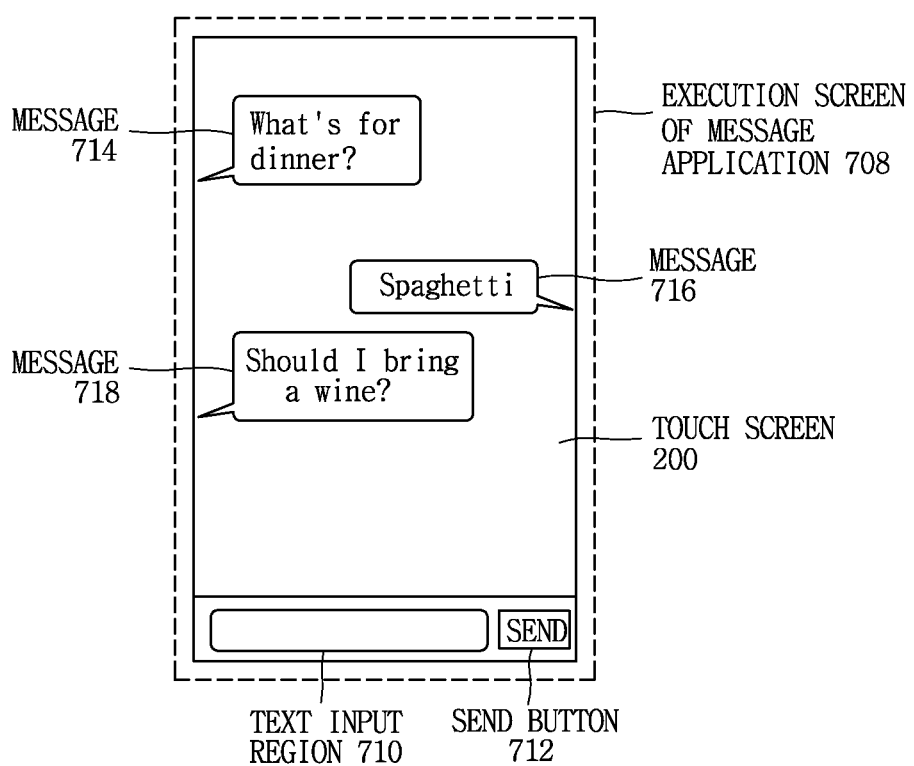

In FIG. 13E, as the unlock image of the second enclosure 216 is dragged to a new location (e.g., a contact 1304), the ripple image 608 is propagated along the direction of the dragging, in this instance, upward. Further, as the unlock image of the second enclosure 216 gets bigger, the size of the message 208 becomes smaller and the rest of the area within the unlock image of the second enclosure 216 may be darkened. In FIG. 13F, as the contact is dragged to a location on the uniform image of the first enclosure 218 (e.g., a contact 1306) on the touch screen 200, the circle encompassing the unlock image of the second enclosure 216 and the uniform image of the first enclosure 218 becomes bolder and/or thicker. In addition, the size of the message 208 gets even smaller. In FIG. 13G, the unlock image of the second 218 remains on the uniform image of the first enclosure 218 even though the contact is dragged beyond the boundary of the uniform image of the first enclosure 218 (e.g., a contact 1308). Then, in FIG. 13H, as the contact is released, a fourth enclosure 1012 encompassing the message 208 gradually expands upward toward the third enclosure 614. In addition, the size of the message 208 becomes much smaller. In FIG. 13I, the execution screen of message application 708 is presented on the touch screen 200. In one exemplary implementation, there may be a brief period of black out between the stage as illustrated in FIG. 13H and the execution screen of message application 708 as illustrated in FIG. 13I.

Figure 14A:
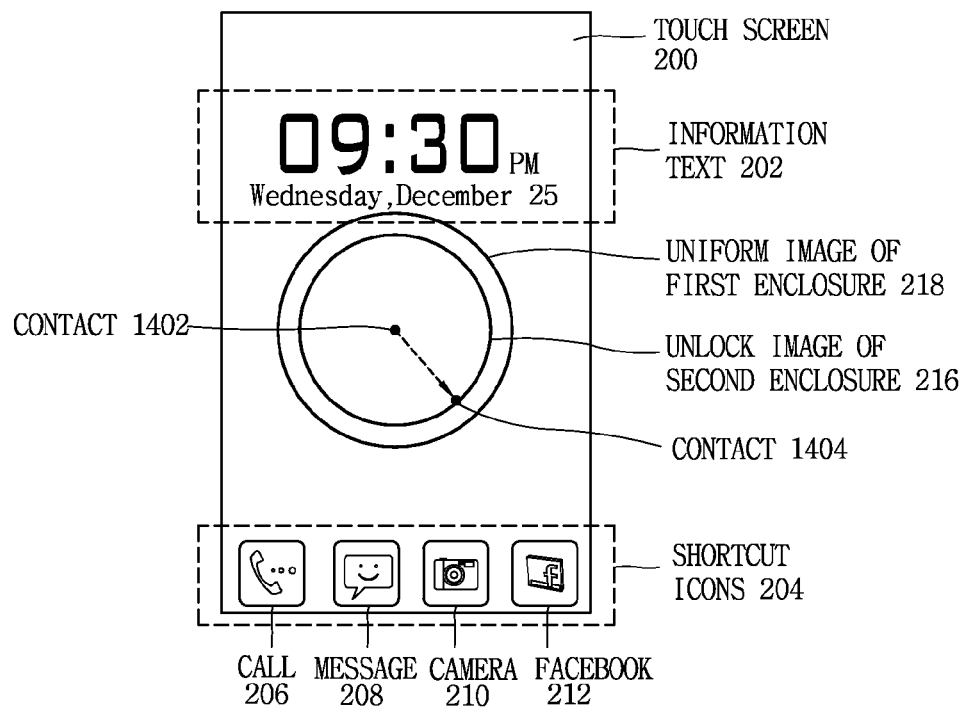
FIGS. 14A-14F illustrate an exemplary view of the mobile terminal which has failed to unlock, according to one embodiment.
Figure 14B:
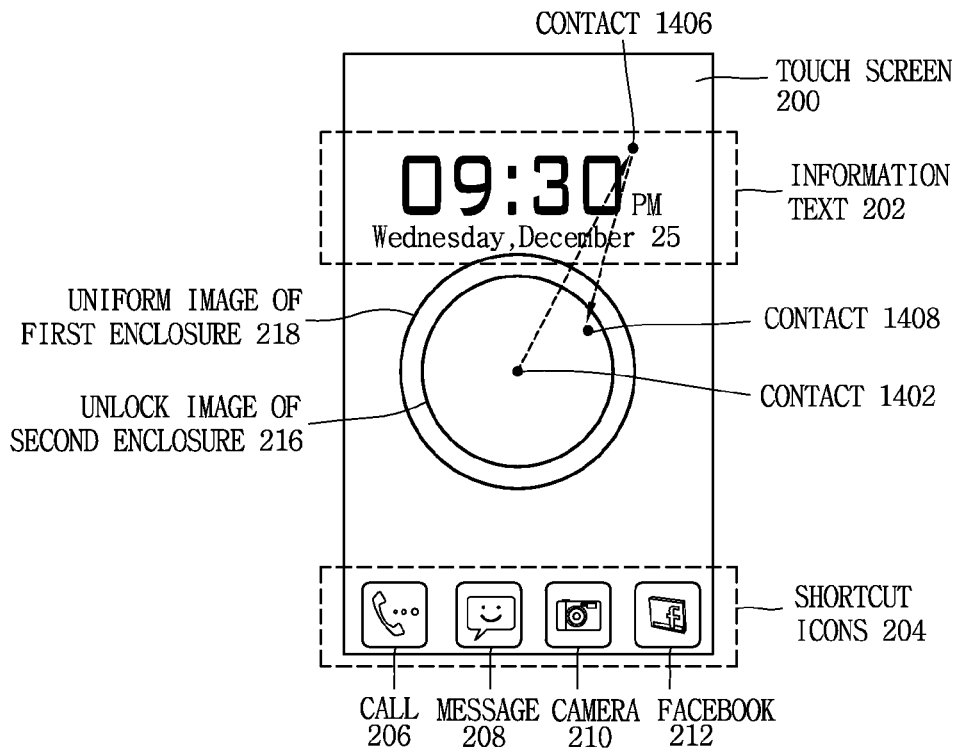
Figure 14C:
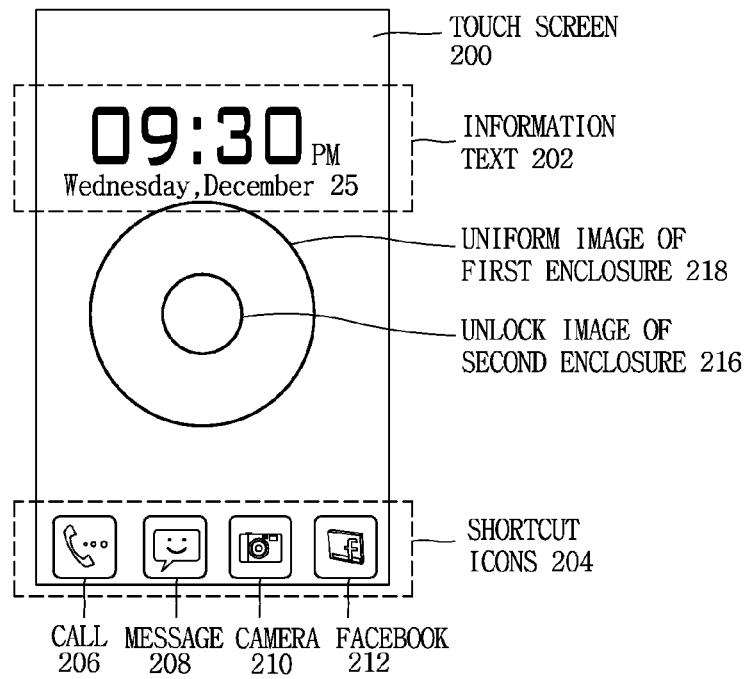
Figure 14D:
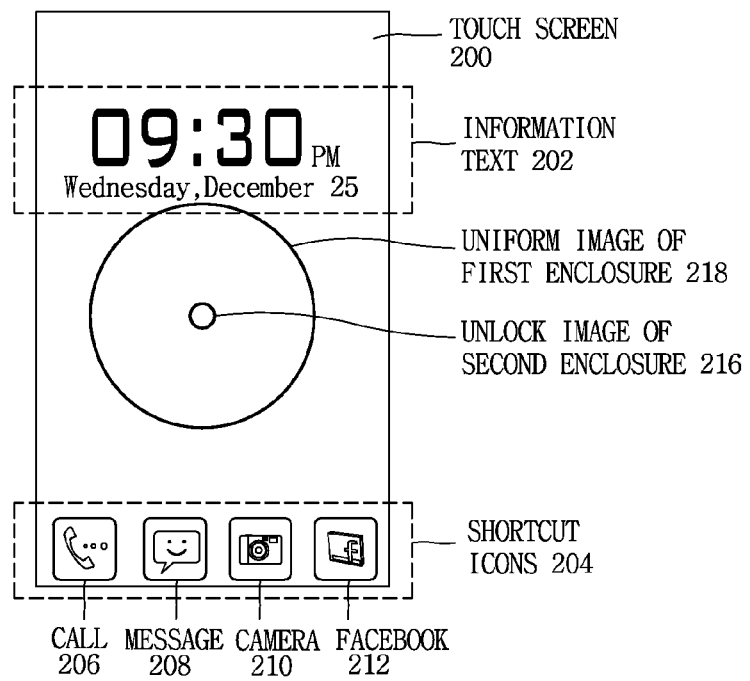

FIGS. 14A-14F illustrate an exemplary view of the mobile terminal 100 that has failed to unlock, according to one embodiment. In one embodiment, the unlock image of the second enclosure 216 may be contracted to its original size if the releasing of the contact takes place within the uniform image of the first enclosure 218. For example, as illustrated in FIG. 14A, if a contact is dragged from its initial position (e.g., a contact 1402) to another position (e.g., a contact 1404) that is within the uniform image of the first enclosure 218 and released, the mobile terminal may fail to unlock. Further, as illustrated in FIG. 14B, even if the contact (e.g., a contact 1406) moves outside the boundary of the uniform image of the first enclosure 218, the mobile terminal 100 may fail to unlock when the contact (e.g., a contact 1408) is released while it is within the uniform image of the first enclosure 218. Once the unlocking of the mobile terminal 100 fails, the unlock image of the second enclosure 216 may be contracted or reduced to its original size, i.e., the size when it first appeared on the touch screen 200 upon the initial contact, as illustrated in FIGS. 14C and 14D.

Figure 14E:
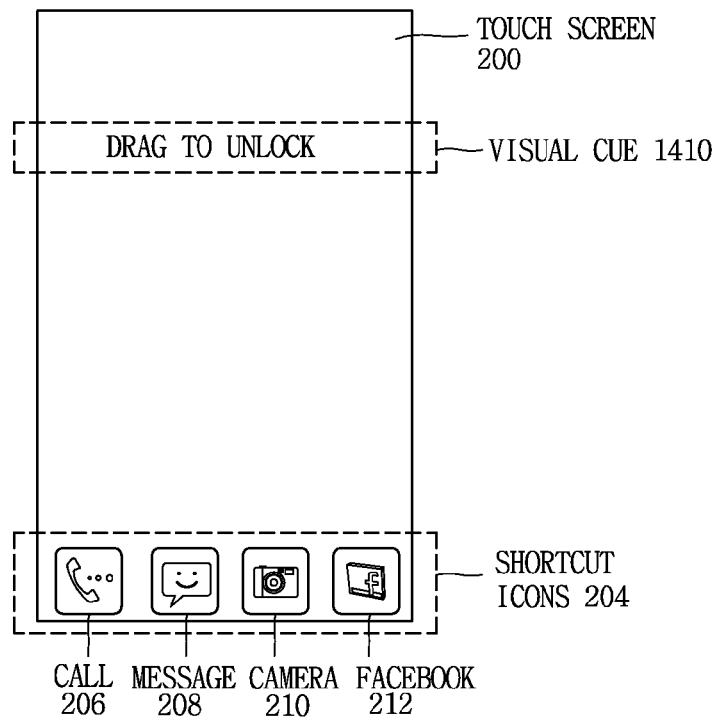
Figure 14F:
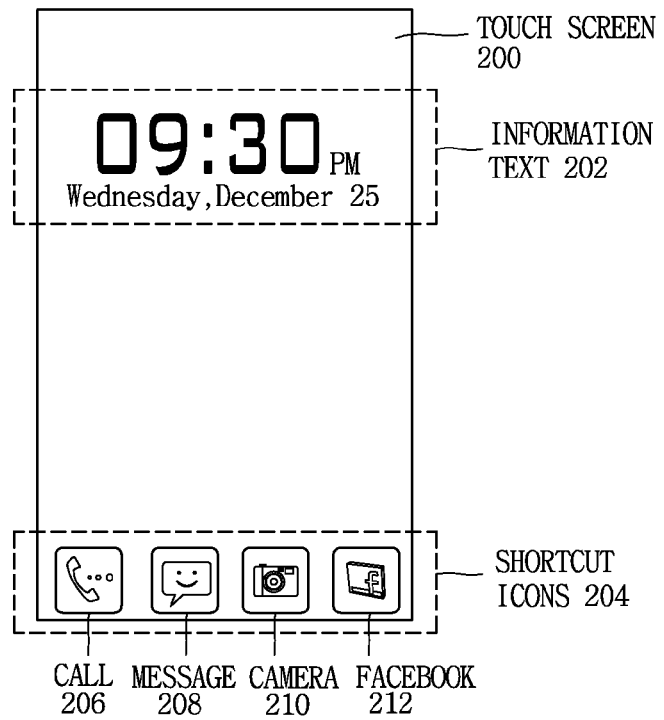

Further, as illustrated in FIG. 14E, a visual cue 1410, which informs the user on the way to unlock the mobile terminal 100, may appear on the touch screen 200. Further, when there is no input or contact detected by the touch screen 200 for a predetermined amount of time (e.g., two seconds), then the visual cue 1410 may be replaced by the information text 202. Moreover, when there is no contact or input detected for more than a set period in this state, the mobile terminal 100 may be configured to turn itself off or to place itself into a deep sleep state.

Figure 15A:
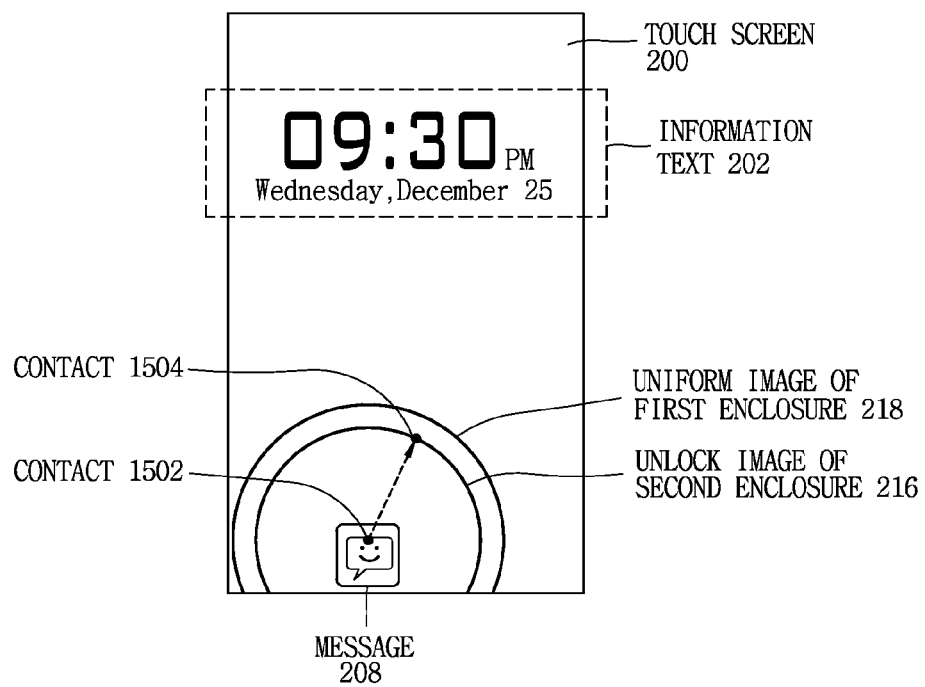
FIGS. 15A-15D illustrate an exemplary view of the mobile terminal which has failed to launch an application, according to one embodiment.
Figure 15B:
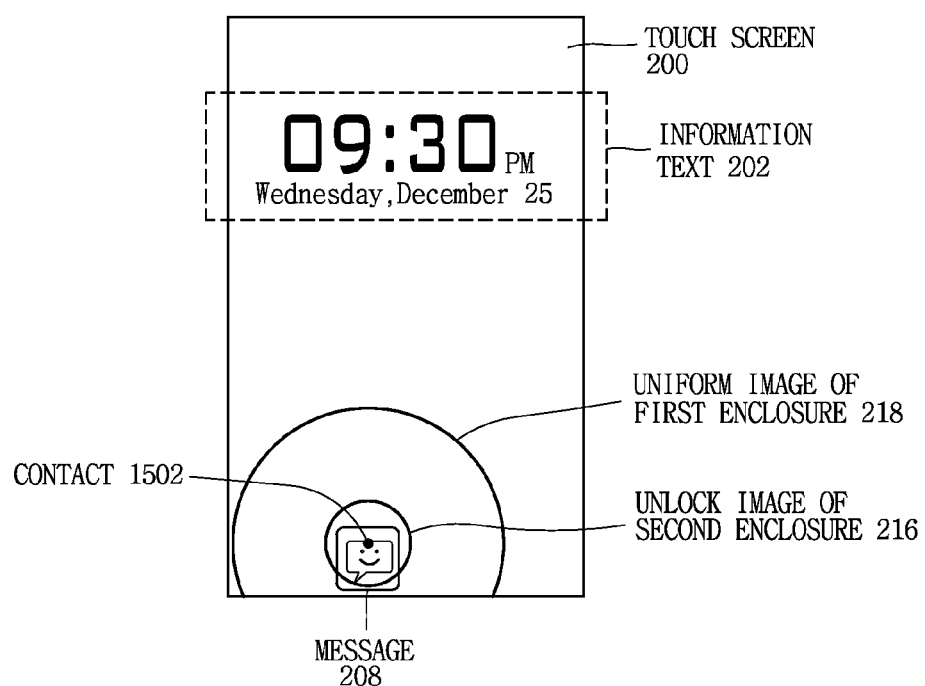

FIGS. 15A-15D illustrate an exemplary view of the mobile terminal 100 that has failed to launch an application, according to one embodiment. In one embodiment, as illustrated in FIG. 15A, if a contact, which selects the message 208, is dragged from its initial position (e.g., a contact 1502) to another position (e.g., a contact 1504) that is within the uniform image of the first enclosure 218 and released, the mobile terminal 100 may fail to launch or execute the message 208. Further, upon the failure, the unlock image of the second enclosure 216 may be contracted or reduced to its original size, i.e., the size when it first appears on the touch screen 200 upon the initial contact, as illustrated in FIG. 15B.

Figure 15C:
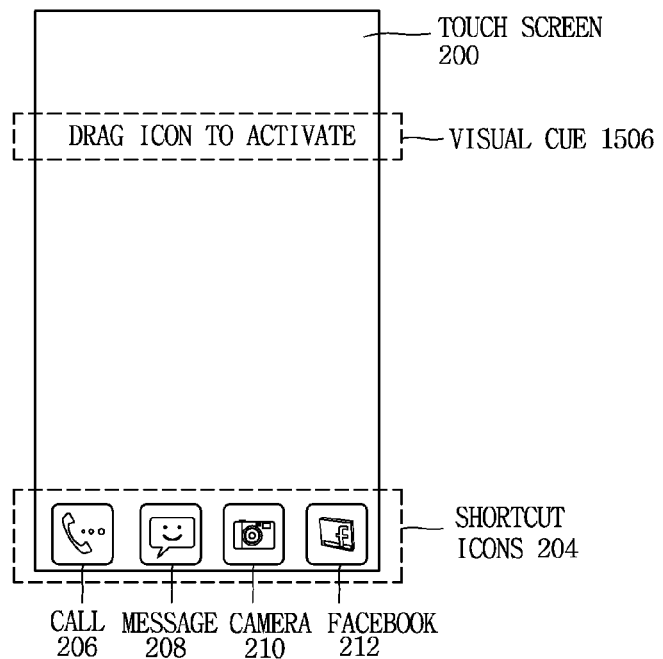
Figure 15D:
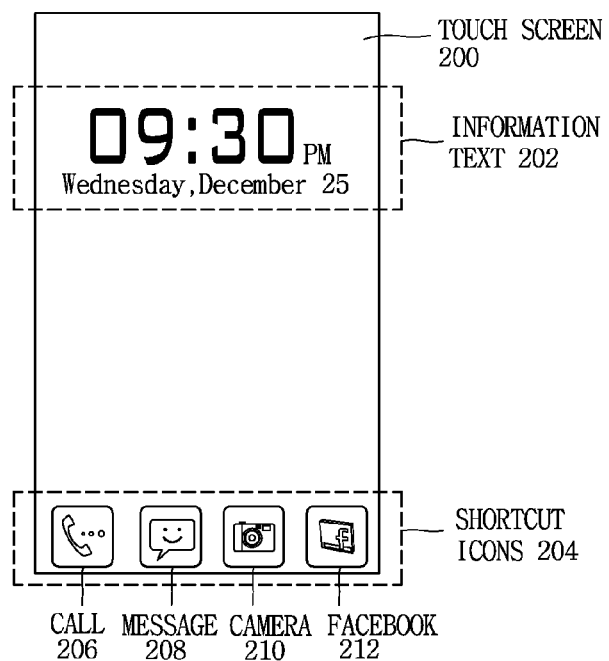

Further, as illustrated in FIG. 15C, a visual cue 1506, which informs the user on the way to activate an application or a website associated with one of the shortcut icons 204, may appear on the touch screen 200. Further, when there is no input or contact detected by the touch screen 200 for a predetermined amount of time (e.g., two seconds), the visual cue 1506 may be replaced by the information text 202 as in FIG. 15D. Moreover, when there is no contact or input detected for more than a set period in this state, the mobile terminal 100 may be configured to turn itself off or to place itself into a deep sleep state.

Figure 16A:
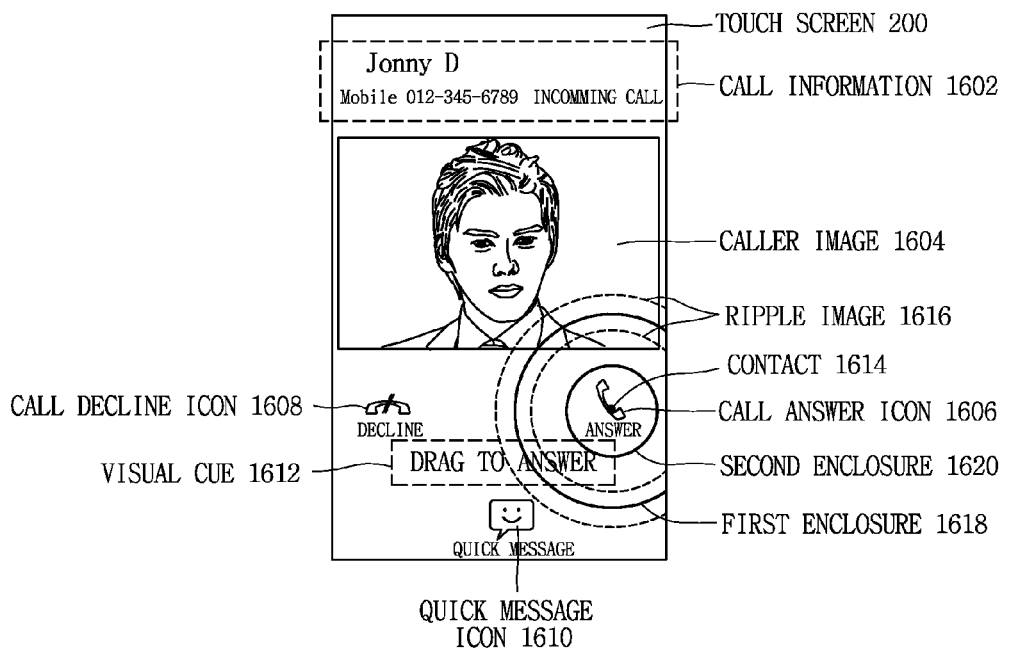
FIGS. 16A-16D illustrate an exemplary view of unlocking the mobile terminal to answer a phone call, according to one embodiment.

FIGS. 16A-D illustrate an exemplary view of unlocking the mobile terminal 100 to answer a phone call, according to one embodiment. In FIG. 16A, a call information 1602 of an incoming call and several options with respect to the incoming call are displayed on the touch screen 200. In one embodiment, the options includes answering the call (e.g., a call answer icon 1606), decline the call (e.g., a call decline icon 1608), or sending a quick message (e.g., a quick message icon 1610). Further, a visual cue 1612, which provide a user a way to answer the incoming call, is displayed on the touch screen 200. Moreover, a caller image 1604 associated with the incoming call is displayed on the touch screen 200. Further, as a contact 1614 on the call answer icon 1606 is made by the user's finger or stylus, a ripple image 1616 is presented on the touch screen 1616. Further, a second enclosure 1620 which surrounds the contact 1614 and a first enclosure 1618 which bounds the second enclosure 1620 are displayed on the touch screen 200 as well.

Figure 16B:
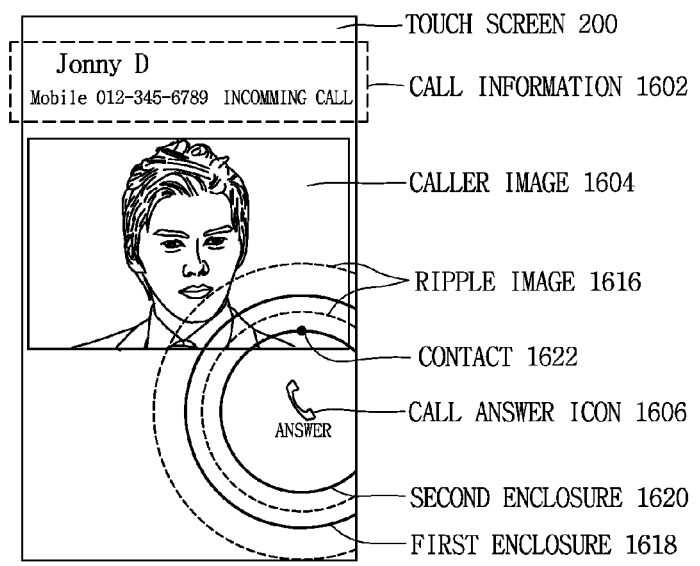
Figure 16C:
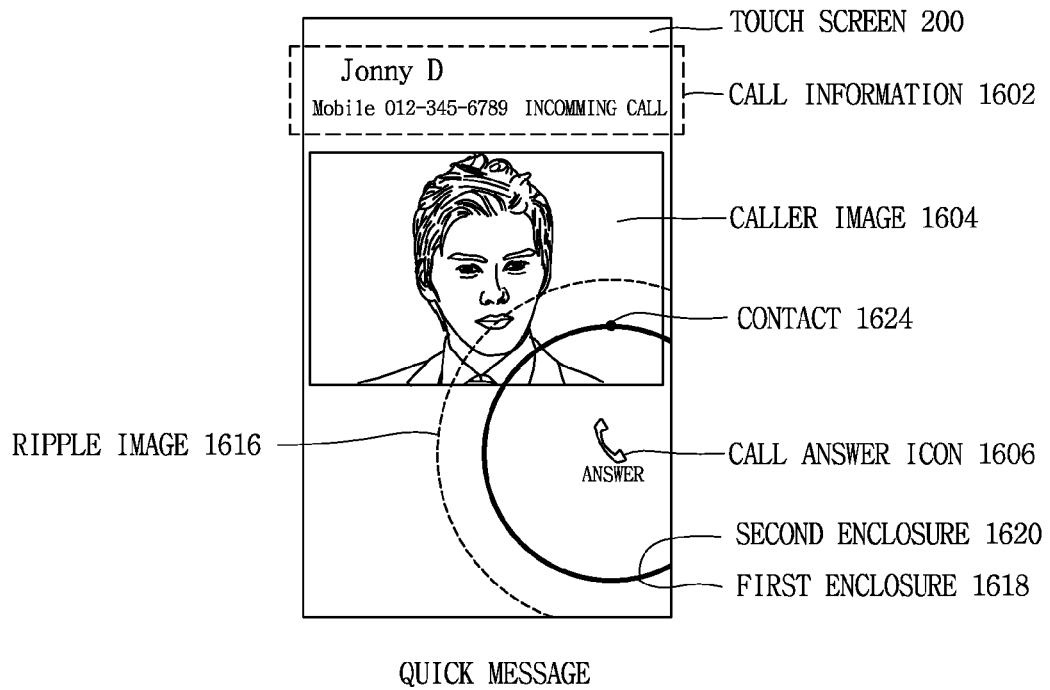
Figure 16D:
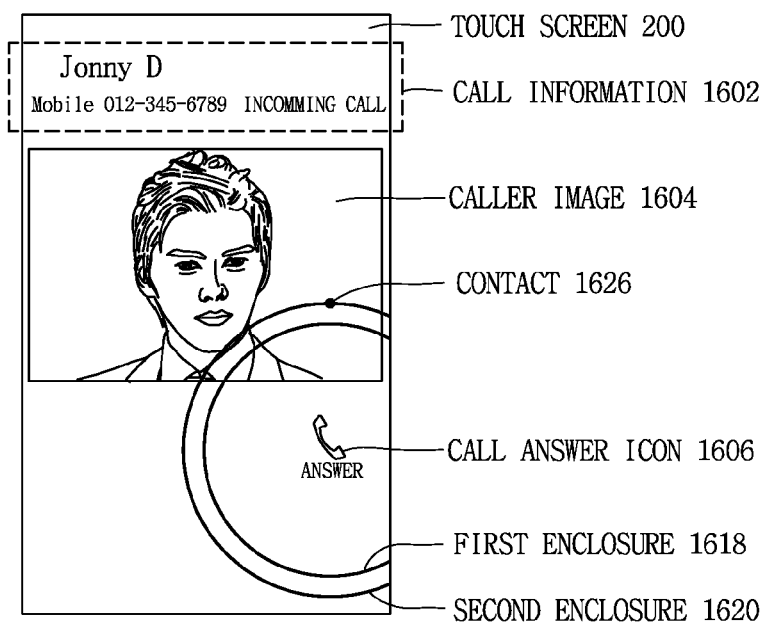

FIG. 16B illustrates the enlargement of the second enclosure 1620 as the contact is dragged to a new location (e.g., a contact 1622). FIG. 16C illustrates the second enclosure 1620 being dragged to meet its threshold, i.e., the first enclosure 1618 at a contact 1624. In one exemplary implementation, as the two enclosures meet, the boundary of the two overlapped enclosures may get thicker, bolder, and/or intensified. In FIG. 16D, the second enclosure 1620 is enlarged beyond the threshold of the first enclosure 1618 when the contact is dragged outside of the first enclosure 1618 at a contact 1626. When the contact is released subsequently, the mobile terminal 100 may be unlocked which enables the user to answer the incoming call.

Figure 17A:
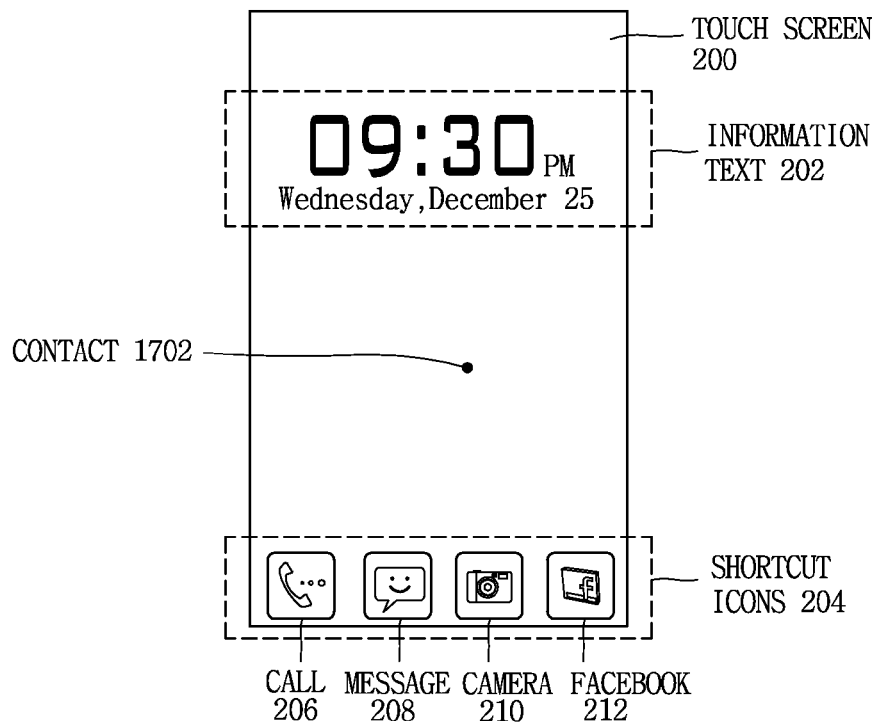
FIGS. 17A-17D illustrate a first exemplary view of unlocking the mobile terminal by moving the unlock image, according to one embodiment.
Figure 17B:
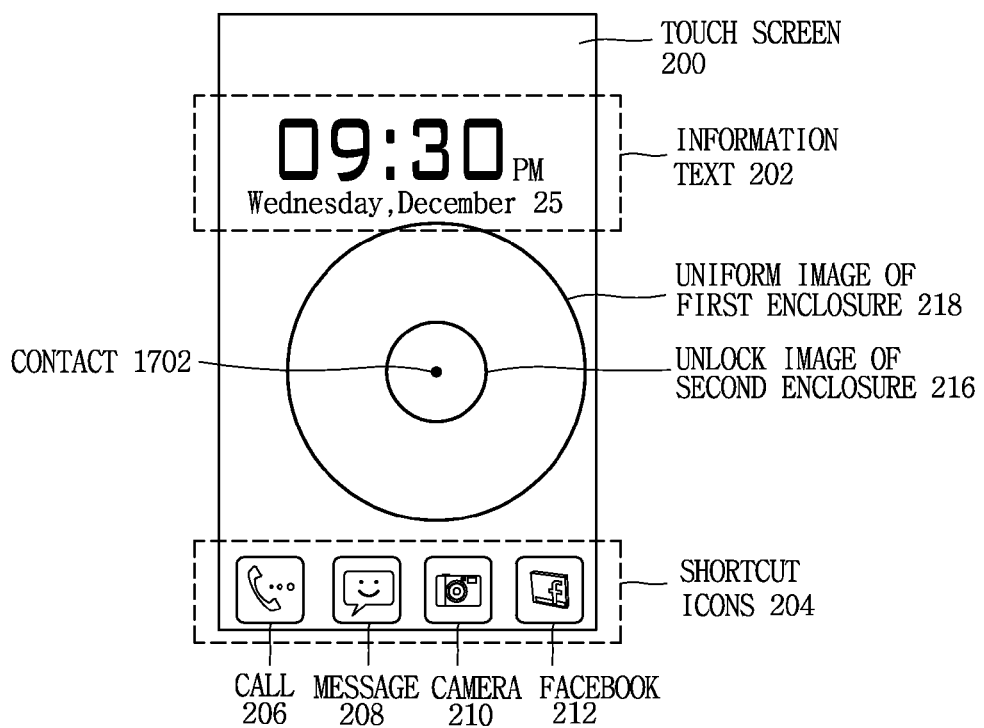

FIGS. 17A-17D illustrate a first exemplary view of unlocking the mobile terminal 100 by moving the unlock image of the second enclosure 216, according to one embodiment. In FIG. 17A, when a contact (e.g., a contact 1702) made by a finger, a stylus, or any touching object is detected by the touch screen 200, the unlock image of the second enclosure 216 and the uniform image of the first enclosure 218 are displayed on the touch screen 200, as illustrated in FIG. 17B. In one embodiment, the contact may be made and detected by the touch screen 200 when the user presses an area on the touch screen 200 and holds it for a while.

Figure 17C:
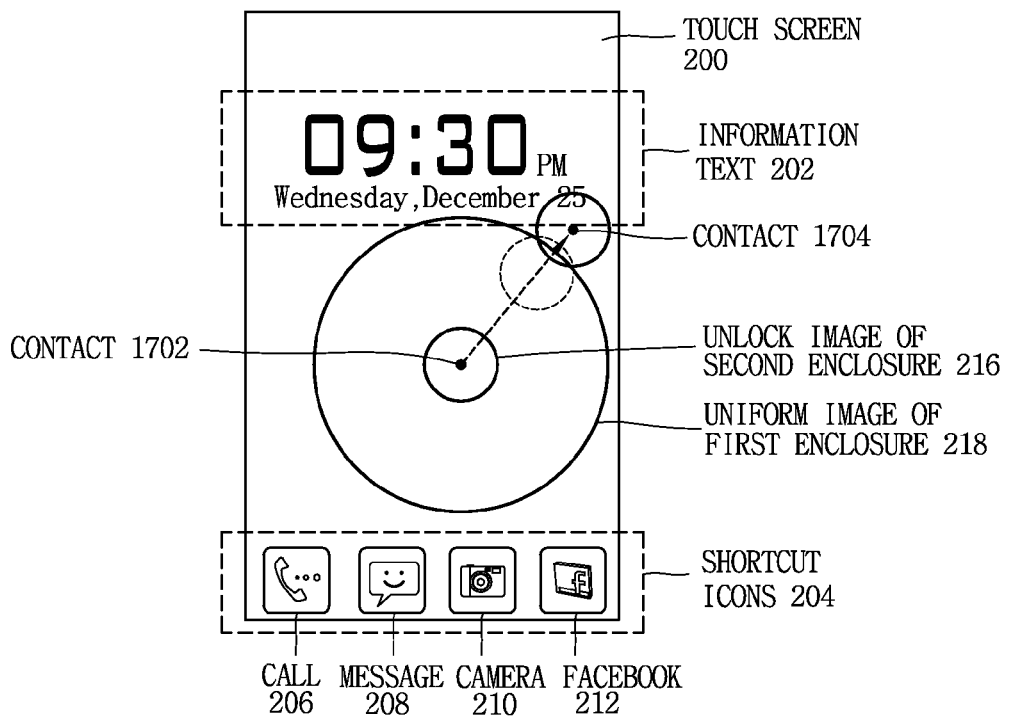
Figure 17D:
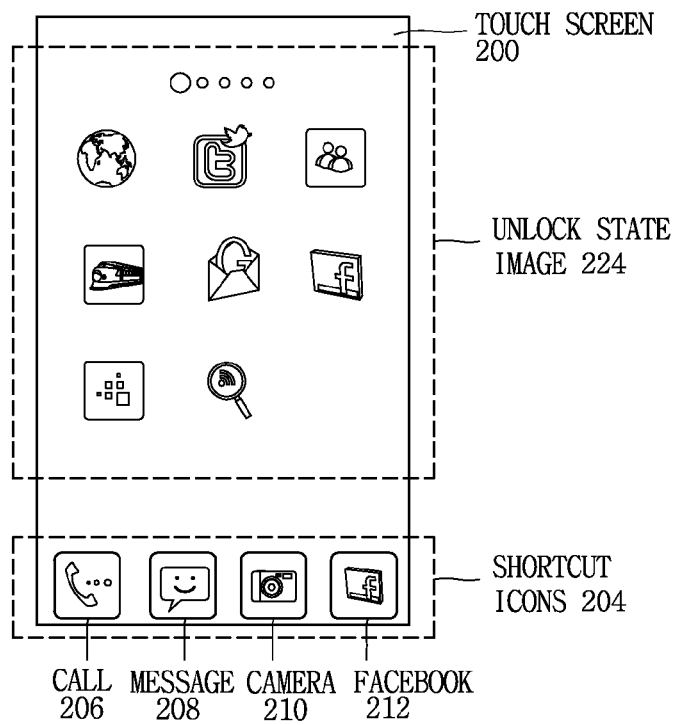

In FIG. 17C, the unlock image of the second enclosure 216 moves according to movement of a contact (e.g., 1704) away from an initial position of the contact (e.g., the contact 1702) while the contact on the touch screen 200 is maintained throughout the movement. Unlike the cases discussed earlier, the size of the unlock image of the second enclosure 216 remains the same as illustrated in FIG. 17C. The size of the uniform image of the first enclosure 218 remains constant as were the cases with the earlier embodiments. In FIG. 17D, when the unlock image of the second enclosure 216 moves outside the boundary of the uniform image of the first enclosure 218 and the contact (e.g., the contact 1704) is released, the mobile terminal 100 is unlocked to display the unlock state image 224 (e.g., the home screen or the last visited screen), as illustrated in FIG. 17D. If the contact is released within the boundary of the uniform image of the first enclosure 218, the unlocking of the mobile terminal 100 may fail to realize.

Figure 18A:
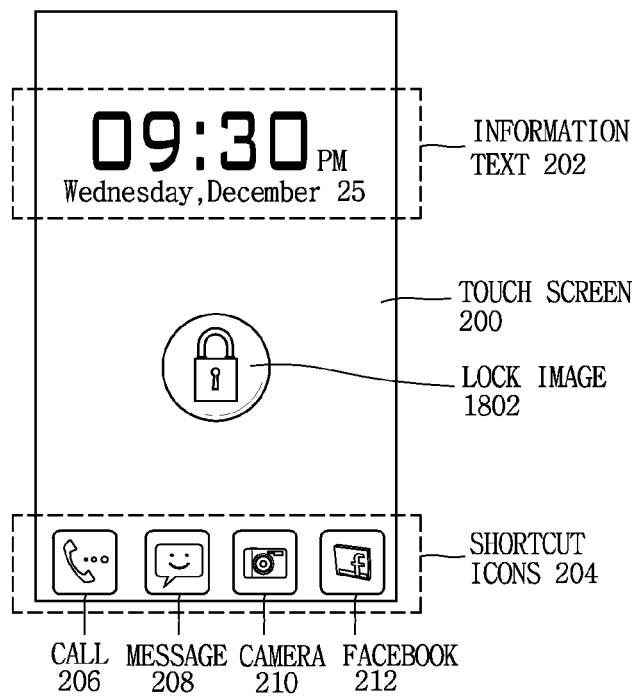
Figure 18B:
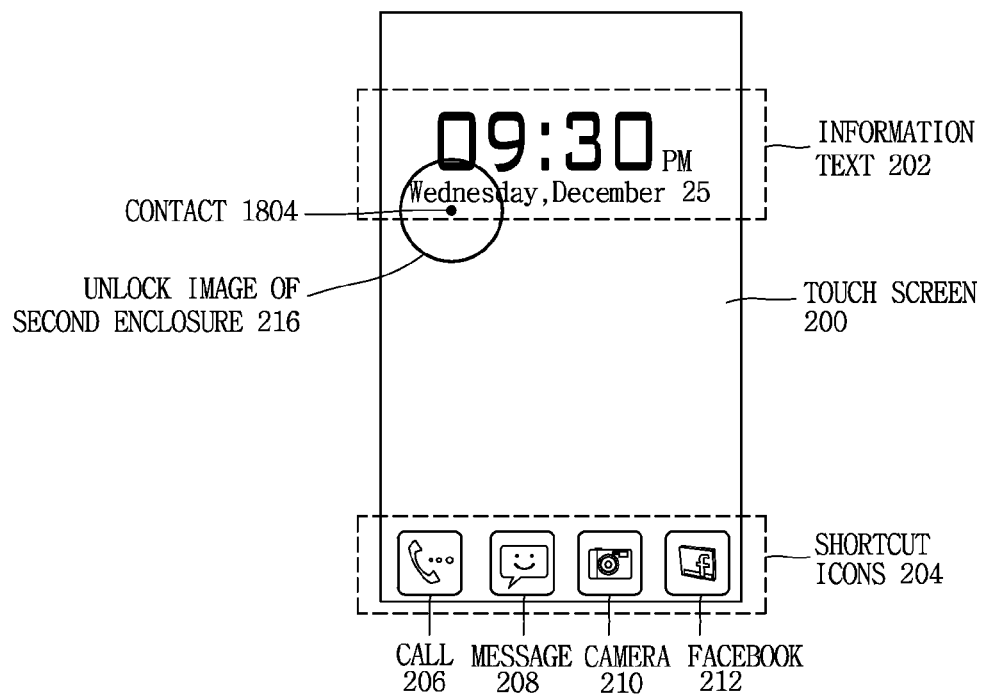

FIGS. 18A-18C illustrate a second exemplary view of unlocking the mobile terminal 100 by moving the unlock image of the second enclosure 216, according to one embodiment. As illustrated in FIG. 18A, in one embodiment, a lock image 1802 is displayed at a predefined area on the touch screen 200 to indicate a lock state of the mobile terminal 100. As the user presses and holds a spot to generate a contact (e.g., a contact 1804) on the touch screen 200, the lock image 1802 disappears from the touch screen 200, and the unlock image of the second enclosure 216 and the uniform image of the first enclosure 218 are displayed on the touch screen 200, as illustrated in FIG. 18B. The unlocking of the mobile terminal 100 may be performed by moving the contact from the initial position (e.g., the contact 1804) to a position outside of the boundary of the uniform image of the first enclosure 218, as illustrated in FIG. 18C. Accordingly, the unlock image of the second enclosure 216 moves away from the initial position of the contact (e.g., the contact 1804) towards the position outside of the uniform image of the first enclosure 218 (e.g., the contact 1806) without altering (e.g., enlarging) its size.

Figure 19A:
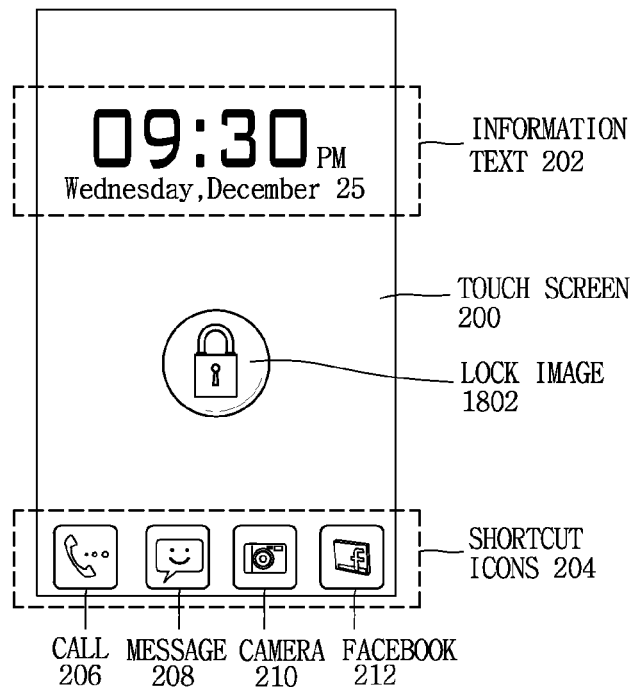
FIGS. 19A-19C illustrate a third exemplary view of unlocking the mobile terminal by moving the unlock image, according to one embodiment.
Figure 19B:
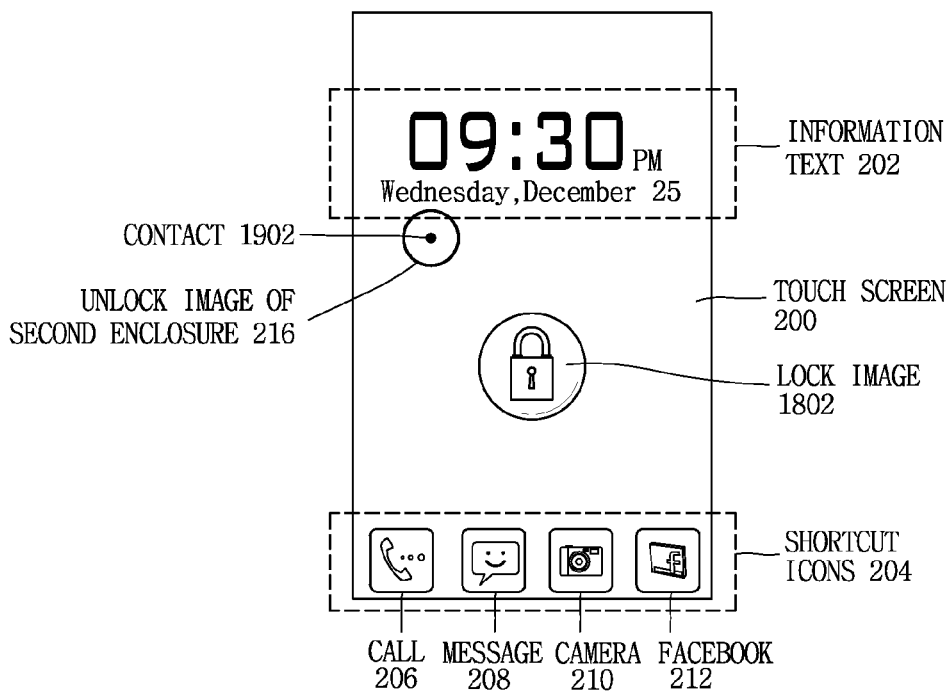
Figure 19C:
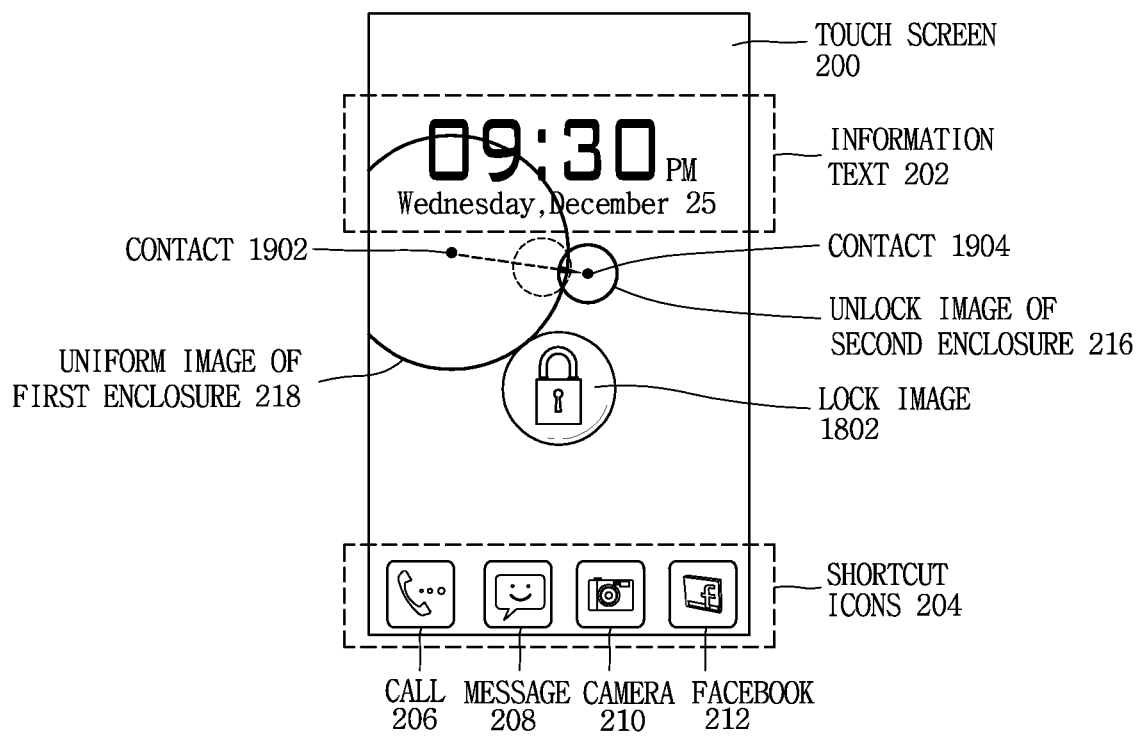

FIGS. 19A-19C illustrate a third exemplary view of unlocking the mobile terminal 100 by moving the unlock image of the second enclosure 216, according to one embodiment. In FIG. 19A, the lock image 1802 is displayed at the predefined area on the touch screen 200 to indicate the lock state of the mobile terminal 100. When the user presses and holds a spot on the touch screen 200 to generate a contact (e.g., a contact 1902) on the touch screen 200, thus launching the unlock image of the second enclosure 216 and the uniform image of the first enclosure 218, the lock image 1802 is maintained on the touch screen 200, as illustrated in FIG. 19B. In one embodiment, the optical intensity of the lock image 1802 may be altered (e.g., dimmed, transparent, etc.) when the contact is made on the touch screen 200 to initiate the unlocking of the mobile terminal 100 and/or to execute one of the shortcut icons 204. The unlocking of the mobile terminal 100 may be performed by moving the contact from the initial position (e.g., the contact 1902) to a position outside of the boundary of the uniform image of the first enclosure 218 (e.g., a contact 1904), as illustrated in FIG. 19C. In the meantime, the lock image 1802 keeps its presence on the touch screen 200 until the unlocking of the mobile terminal 100 is realized.

Figure 20A:
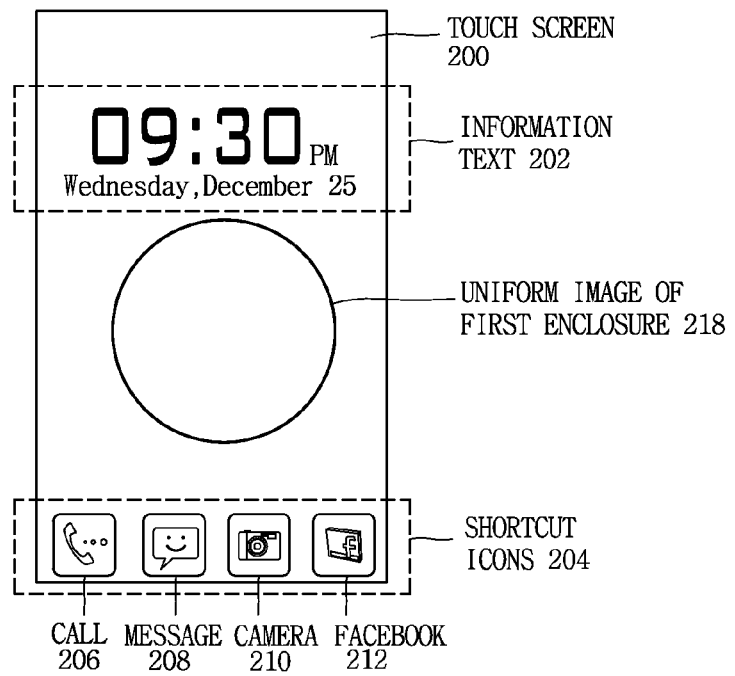
FIGS. 20A-20C illustrate a fourth exemplary view of unlocking the mobile terminal by moving an unlock image, according to one embodiment.
Figure 20B:
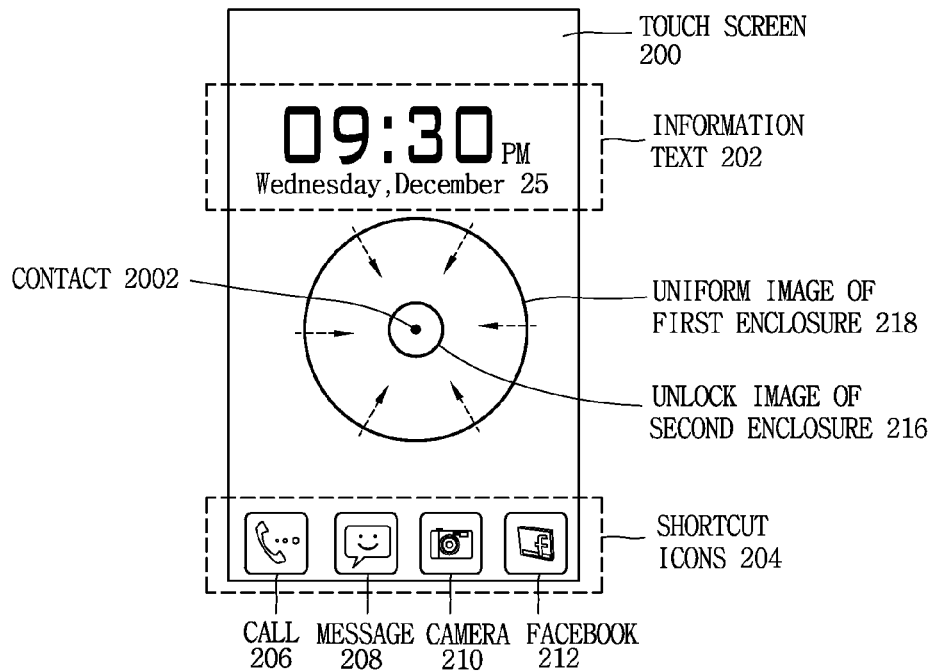
Figure 20C:
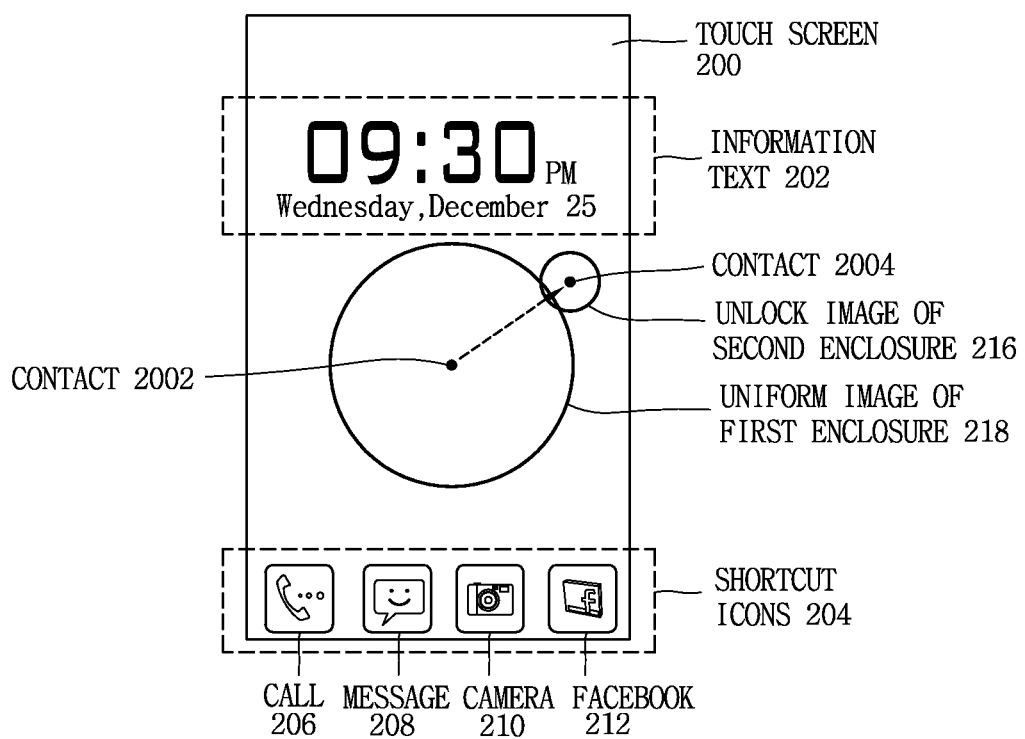

FIGS. 20A-20C illustrate a fourth exemplary view of unlocking the mobile terminal 100 by moving the unlock image of the second enclosure 216, according to one embodiment. In FIG. 20A, the uniform image of the first enclosure 218 is displayed at a predefined area of the touch screen 200 when the mobile terminal 100 is locked. In FIG. 20B, when a contact (e.g., a contact 2002) is initially made, the unlock image of the second enclosure 216 is generated on the touch screen 200. In one embodiment, as the user presses and holds the touch screen 200 at the initial contact, a visual effect of the unlock image of the second enclosure 216 absorbing a flow towards it from outside may appear. Then as the contact moves to a position outside of the uniform image of the first enclosure 218 (e.g., a contact 2004) as illustrated in FIG. 20C, the unlocking of the mobile terminal 100 and/or the launching of a shortcut icon is performed.

Figure 21A:
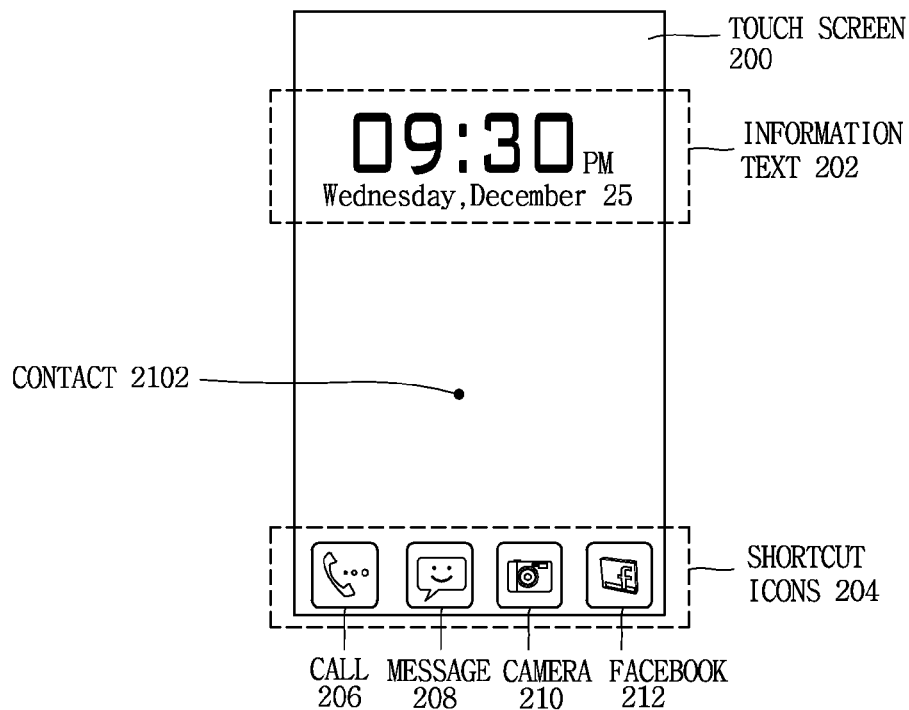
FIGS. 21A-21E illustrate an exemplary view of simultaneously executing an application and unlocking of the mobile terminal, according to one embodiment.
Figure 21B:
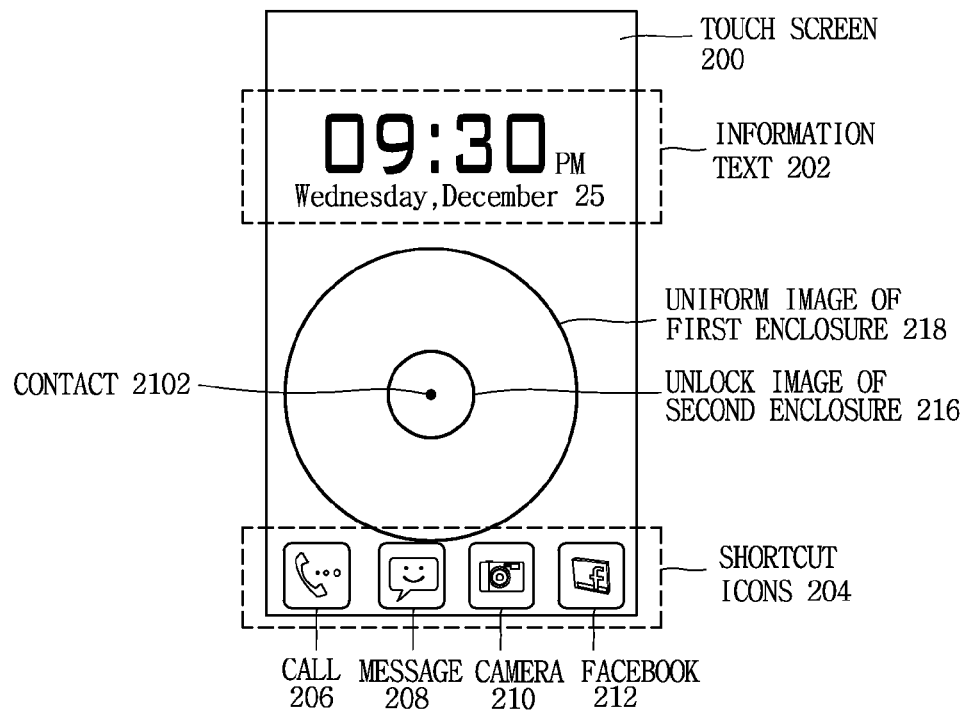
Figure 21C:
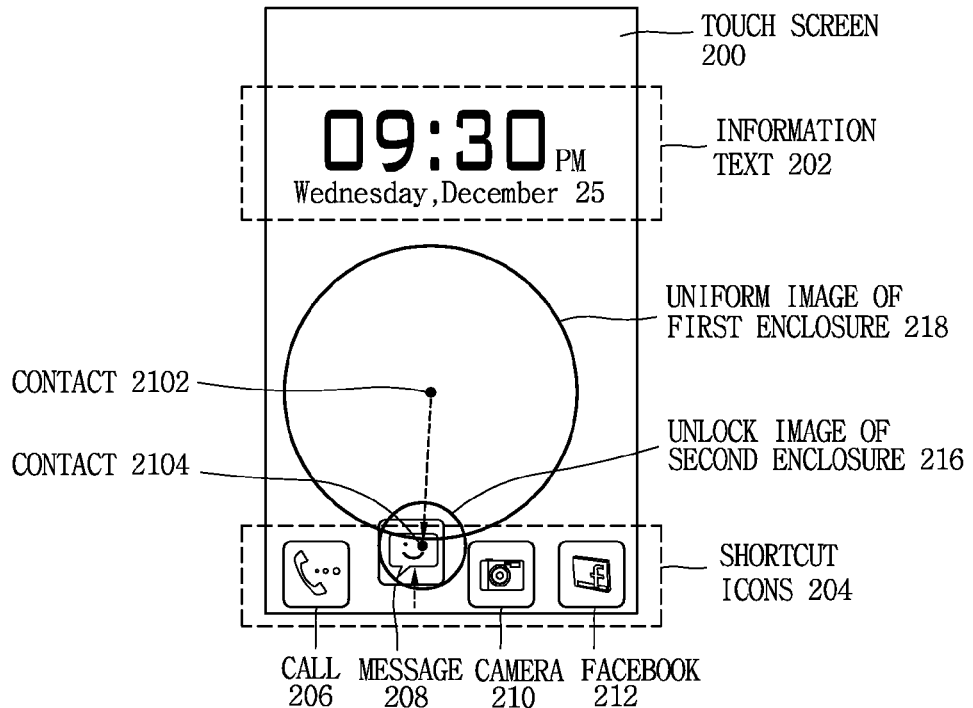
Figure 21D:
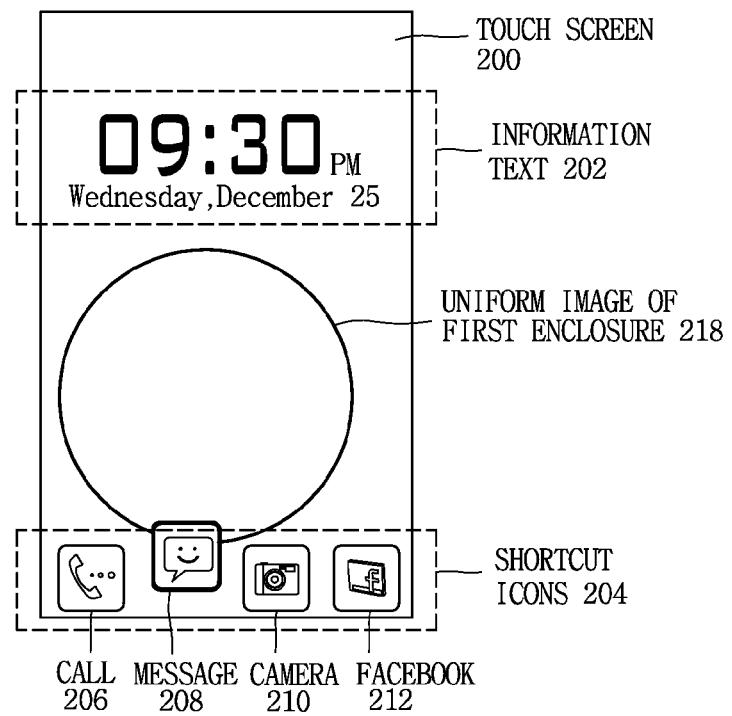
Figure 21E:
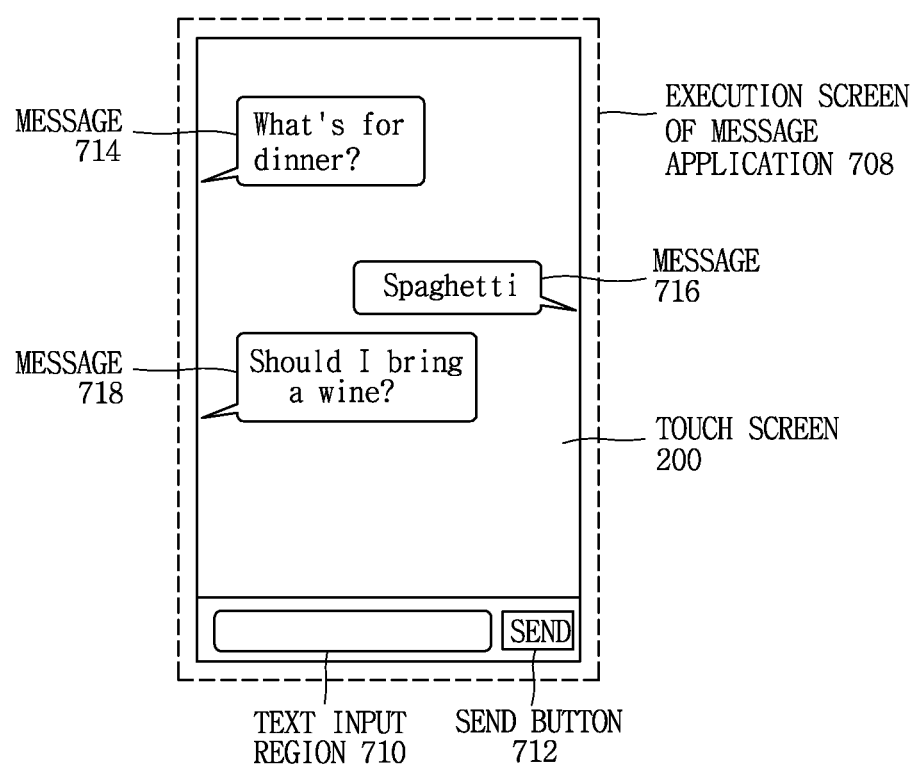

FIGS. 21A-21E illustrate an exemplary view of simultaneously executing an application and unlocking of the mobile terminal 100, according to one embodiment. As illustrated in FIGS. 21A and 21B, the unlock image of the second enclosure 216 and the uniform image of the first enclosure 218 are displayed on the touch screen 200 when a contact (e.g., a contact 2102) is made on the touch screen 200 (e.g., within the first area 406). In FIGS. 21C and 21D, as the contact (e.g., a contact 2104) moves beyond the uniform image of the first enclosure 218 and touches the message 208 or message icon to select the message 208, the message icon may be highlighted to inform the selection. In one exemplary implementation, the message icon may move closer to the uniform image of the first enclosure 218 when it is detected by the mobile terminal 100 that the movement of the contact is in the direction of the message 208. When the contact (e.g., the contact 2104) is released, an execution screen of an application (e.g., or a website) associated with the selected icon (e.g., the message 208) is launched as illustrated in FIG. 21E.

Figure 22A:
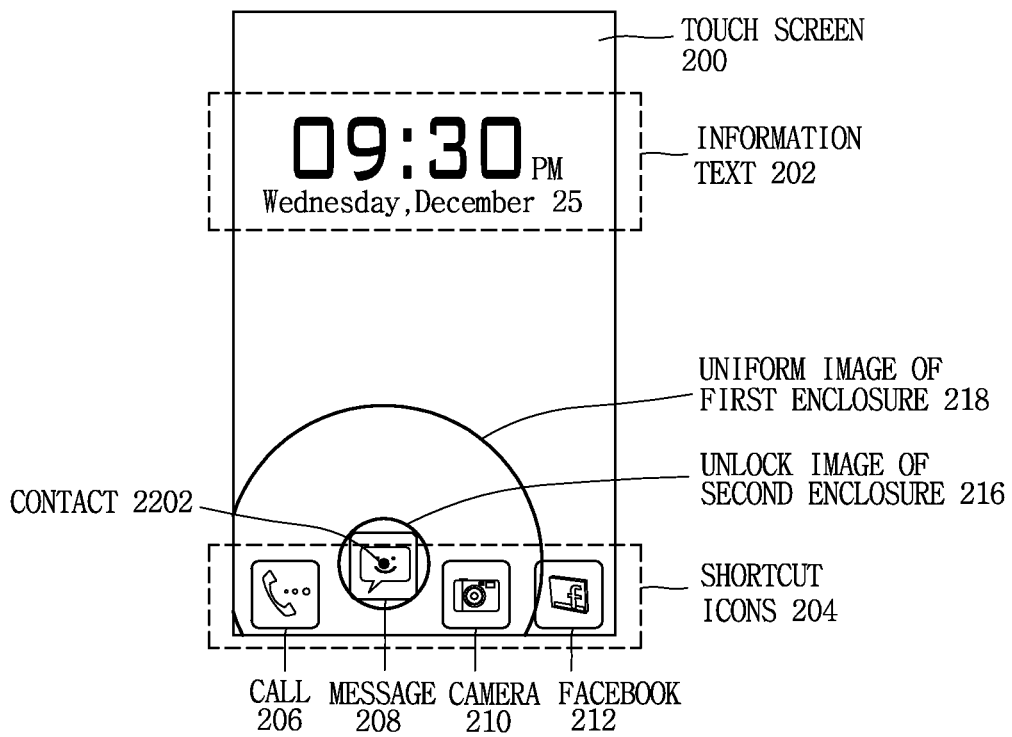
FIGS. 22A-22D illustrate an exemplary view of executing an application, according to one embodiment.
Figure 22B:
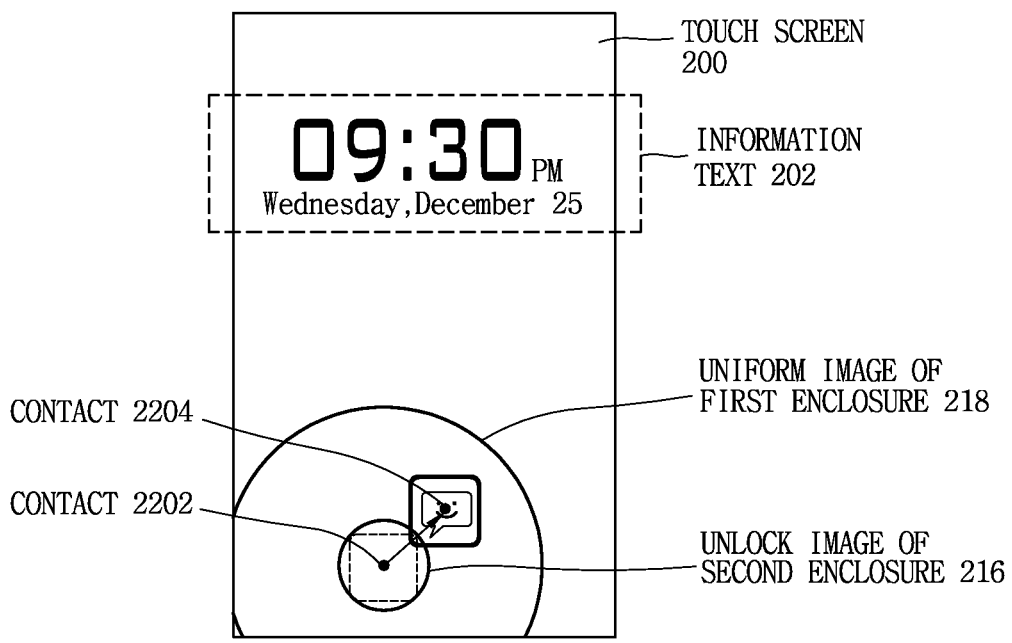
Figure 22C:
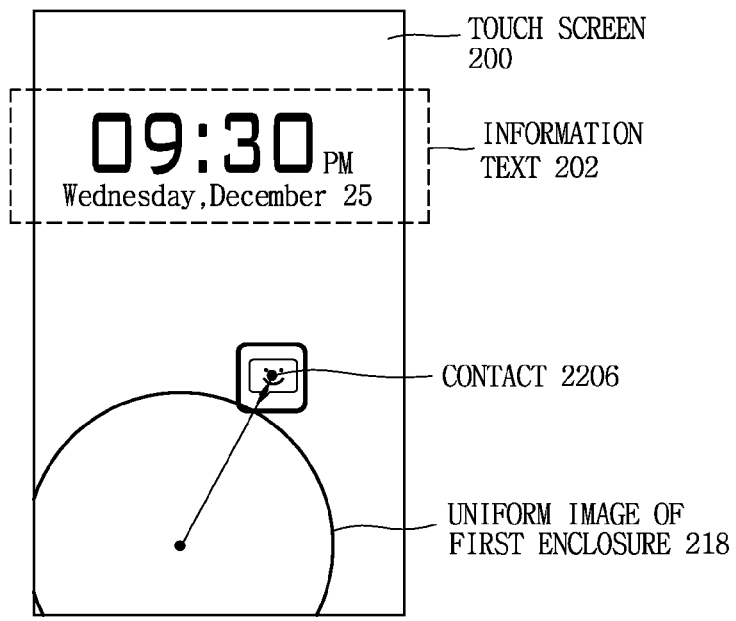
Figure 22D:
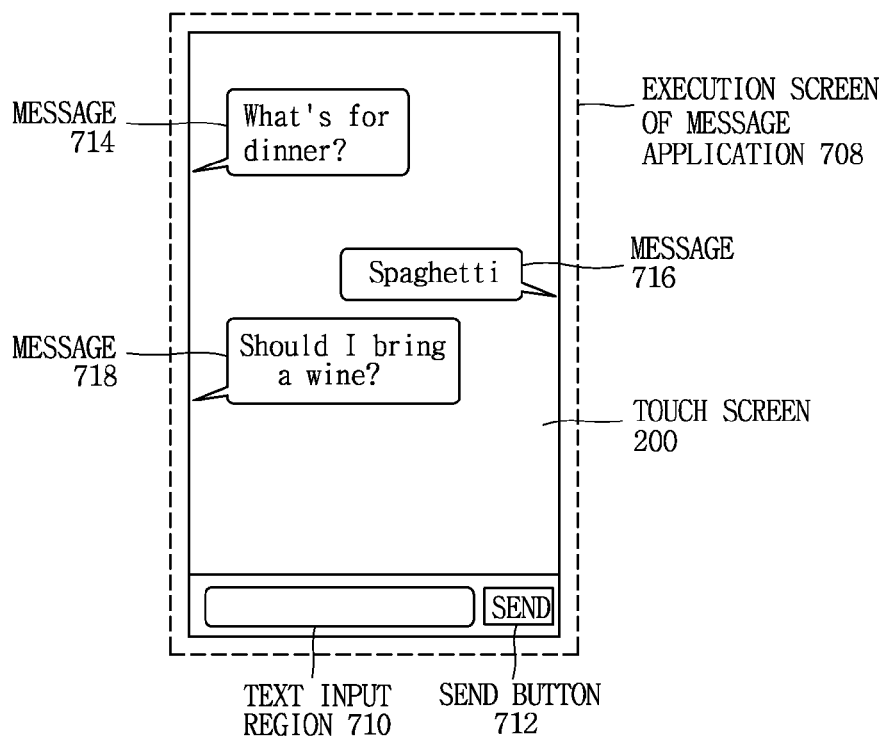

FIGS. 22A-22D illustrate an exemplary view of executing an application, according to one embodiment. In FIGS. 22A and 22B, a contact (e.g., a contact 2202) is initially made on the message 208 or its icon, and the unlock image of the second enclosure 216 moves according to the movement of the contact (e.g., a contact 2204) while the contact is maintained with the touch screen 200. In one embodiment, the position of the message icon or the optical intensity of the message icon (e.g., the message 208) may be altered to confirm the selection thereof. In addition, the remaining shortcut icons which include the call 206, the camera 210, and the Facebook 212 may disappear from the touch screen 200. When the contact (e.g., a contact 2206) is dragged beyond the boundary of the uniform image of the first enclosure 218, and the contact is released from the position as illustrated in FIG. 22C, the execution screen of the message application 608 is launched or executed as illustrated in FIG. 22D. In one embodiment, while the contact is being dragged, the message icon (e.g., the message 208) moves along the movement of the contact, and the unlock image of the second enclosure 216 is phased out from the touch screen 200.

Figure 23:
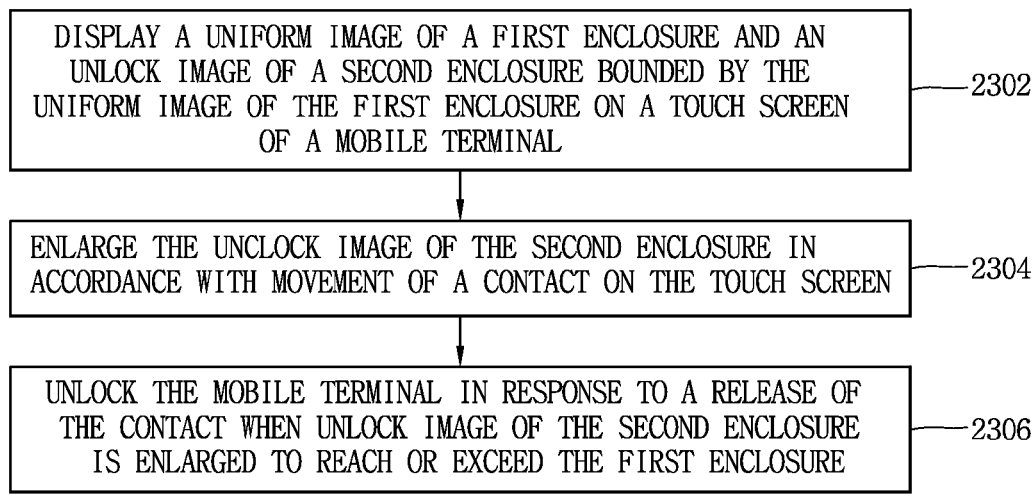
FIG. 23 illustrate an exemplary process flow chart illustrating a process of unlocking a mobile terminal, according to one embodiment.

FIG. 23 illustrate an exemplary process flow chart illustrating a process of unlocking the mobile terminal 100, according to one embodiment. In keeping with the previous examples, particular components described with respect to FIGS. 2A-2F are referenced as performing the process in FIG. 23. It should be noted that the components that are referred to as performing the process are for illustrative purposes only. In some implementations, other components, or a different combination of components within a system or device, may instead perform the process in FIG. 23.

In operation 2302, a uniform image of a first enclosure and an unlock image of a second enclosure bounded by the uniform image of the first enclosure are displayed on the touch screen in response to a contact. As illustrated in FIG. 2C, when a contact (e.g., contact 214) made by a finger, a stylus, or any touching object is detected by the touch screen 200, an unlock image of a second enclosure 216 and a uniform image of a first enclosure 218 are displayed on the touch screen 200. In one embodiment, the unlock image of the second enclosure 216 is bounded by the uniform image of the first enclosure 218. In addition, the unlock image of the second enclosure 216 is formed to substantially surround the initial position of the contact, i.e., the contact 204.

In operation 2304, the unlock image of the second enclosure is enlarged in accordance with movement of a contact of the touch screen. As illustrated in FIGS. 2D and 2E, the unlock image of the second enclosure 216 is enlarged according to movement of a contact (e.g., the contact 220) away from an initial position of the contact (e.g., the contact 214) while the contact on the touch screen 200 is maintained throughout the movement. While the size of the unlock image of the second enclosure 216 is altered as illustrated in the figure, the size of the uniform image of the first enclosure 218 remains constant.

In operation 2306, the mobile terminal 100 is unlocked in response to a release of the contact when the unlock image of the second enclosure 216 extends to reach the uniform image of the first enclosure 218. As illustrated in FIG. 2F, the unlock image of the second enclosure 216 is enlarged enough to completely overlap with the uniform image of the first enclosure 218. In that instance, if the contact (e.g., the contact 222) is released, the mobile terminal 100 is unlocked to display the unlock state image 224.

It is appreciated that the methods disclosed in FIG. 23 may be implemented in a form of a machine-readable medium embodying a set of instructions that, when executed by a machine, cause the machine to perform any of the operations disclosed herein.

The various devices, modules, analyzers, generators, etc. described herein may be enabled and operated using hardware circuitry (e.g., complementary metal-oxide-semiconductor (CMOS) based login circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

What is claimed is:

1. A mobile terminal, comprising:
    a touch screen; and
    a controller configured to:
    display a uniform image of a first enclosure and an unlock image of a second enclosure bounded by the uniform image of the first enclosure on the touch screen in response to detection of a touch input on the touch screen while the mobile terminal is in a lock state, wherein the uniform image of the first enclosure and the unlock image of the second enclosure are not displayed prior to detection of the touch input but appear on the touch screen only after the detection of the touch input on the touch screen;
    enlarge the unlock image of the second enclosure in response to movement of the touch input away from an initial position of the touch input, wherein the unlock image of the second enclosure is continually enlarged while the movement of the touch input away from the initial position of the touch input is maintained; and
    unlock the mobile terminal in response to a release of the touch input when the unlock image of the second enclosure is resized to reach or exceed a boundary of the uniform image of the first enclosure.

2. The mobile terminal of claim 1, wherein the unlock image of the second enclosure is first formed to surround the initial position of the touch input.

3. The mobile terminal of claim 1, wherein the uniform image of the first enclosure takes a shape similar to a shape of the unlock image of the second enclosure.

4. The mobile terminal of claim 1, wherein the unlock image of the second enclosure is a circle, and the uniform image of the first enclosure is a circle concentrically enclosing the unlock image of the second enclosure.

5. A method of controlling a mobile terminal with a touch screen, the method comprising:
    displaying a uniform image of a first enclosure and an unlock image of a second enclosure bounded by the uniform image of the first enclosure on the touch screen in response to detection of a touch input on the touch screen while the mobile terminal is in a lock state, wherein the uniform image of the first enclosure and the unlock image of the second enclosure are not displayed prior to the detection of the touch input but appear on the touch screen only after the detection of the touch input on the touch screen;
    enlarging the unlock image of the second enclosure in response to movement of the touch input away from an initial position of the touch input, wherein the unlock image of the second enclosure is continually enlarged while the movement of touch input away from the initial position of the touch input is maintained; and
    unlocking the mobile terminal in response to a release of the touch input when the unlock image of the second enclosure is resized to reach or exceed a boundary of the uniform image of the first enclosure.

6. The method of claim 5, further comprising displaying a set of shortcut icons at a bottom area of the touch screen.

7. The method of claim 6, wherein the touch screen is divided into a first area, a second area, and a third area with the third area substantially covering a region whose length is a width of the touch screen and whose width is set to include the set of shortcut icons, the second area covering a region whose length is the width of the touch screen and whose width extending from a top end of the third area toward an upper end of the touch screen by a radius of the uniform image of the first enclosure, and the first area covering a region whose length is the width of the touch screen and whose width starting from a top end of the second area to the upper end of the touch screen.

8. The method of claim 7, wherein the unlocking the mobile terminal comprises displaying an unlock state image of the touch screen if the initial position of the touch input belongs to the first area.

9. The method of claim 8, wherein the unlocking the mobile terminal further comprises executing a shortcut icon if the movement of the touch input leads to a selection of the shortcut icon upon the releasing of the touch input.

10. The method of claim 9, further comprising displaying a background screen within the unlock image of the second enclosure in response to detection of the movement of the touch input heading to the shortcut icon.

11. The method of claim 10, wherein the background screen is a representative image of the shortcut icon, a last saved image of data associated with the shortcut icon, or an updated image of the data.

12. The method of claim 7, wherein the unlocking the mobile terminal comprises displaying an unlock state image of the touch screen without executing a shortcut icon even if the movement of the touch input leads to a selection of the shortcut icon upon the releasing of the touch input if the initial position of the touch input belongs to the second area.

13. The method of claim 12, further comprising displaying a background screen of a home screen or a last visited screen of the mobile terminal within the unlock image of the second disclosure during the movement of the touch input.

14. The method of claim 12, further comprising dimming the set of shortcut icons in response to the touch input on the touch screen.

15. The method of claim 7, wherein the unlocking the mobile terminal comprises executing a shortcut icon without displaying an unlock state image of the touch screen upon the releasing of the touch input if the initial position of the touch input belongs to the third area.

16. The method of claim 15, wherein an optical intensity of remaining ones of the set of shortcut icons decreases in response to the selection of the shortcut icon.

17. The method of claim 5, wherein the displaying the uniform image of the first enclosure and the unlock image of the second enclosure is preceded by displaying of a lock image on the touch screen.

18. The method of claim 5, further comprising contracting the unlock image of the second enclosure to its original size if the releasing of the touch input takes place within the uniform image of the first enclosure.

19. The method of claim 18, further comprising presenting a visual cue for the unlocking of the mobile terminal subsequent to the contracting of the unlock image of the second enclosure.

20. A non-transitory computer-readable medium storing instructions that, when executed by a computer comprising a touch screen, cause the computer to:

display a uniform image of a first enclosure and an unlock image of a second enclosure bounded by the uniform image of the first enclosure on the touch screen in response to detection of a touch input on the touch screen while the computer is in a lock state, wherein the uniform image of the first enclosure and the unlock image of the second enclosure are not displayed prior to the detection of the touch input but appear on the touch screen only after the detection of the touch input on the touch screen;

enlarge the unlock image of the second enclosure in response to movement of the touch input away from an initial position of the touch input, wherein the unlock image of the second enclosure is continually enlarged while the movement of the touch input away from the initial position of the touch input is maintained; and unlock the computer in response to a release of the touch input when the unlock image of the second enclosure is resized to reach or exceeds a boundary of the uniform image of the first enclosure.

* * * * *